United States Patent
Clark

(10) Patent No.: US 9,354,491 B2
(45) Date of Patent: *May 31, 2016

(54) PHOTOGRAPHIC SYNCHRONIZATION OPTIMIZATION SYSTEM AND METHOD

(71) Applicant: Lab Partners Associates, Inc., South Burlington, VT (US)

(72) Inventor: James E. Clark, South Burlington, VT (US)

(73) Assignee: Lab Partners Associates, Inc., South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/270,107

(22) Filed: May 5, 2014

(65) Prior Publication Data

US 2014/0241710 A1    Aug. 28, 2014

Related U.S. Application Data

(63) Continuation of application No. 13/401,175, filed on Feb. 21, 2012, now Pat. No. 8,718,461, which is a continuation-in-part of application No. 13/208,686, filed on Aug. 12, 2011, now Pat. No. 8,705,950, which (Continued)

(51) Int. Cl.
| | | |
|---|---|---|
| *G03B 9/70* | (2006.01) | |
| *G03B 15/03* | (2006.01) | |
| *G03B 15/05* | (2006.01) | |
| *G03B 9/40* | (2006.01) | |

(Continued)

(52) U.S. Cl.
CPC ........ *G03B 15/05* (2013.01); *G03B 7/16* (2013.01); *G03B 9/40* (2013.01); *G03B 9/70* (2013.01); *H05B 41/32* (2013.01); *G03B 2215/0557* (2013.01)

(58) Field of Classification Search
USPC .................. 396/56, 180, 187–189, 195, 198; 348/370–371
See application file for complete search history.

(56) References Cited

U.S. PATENT DOCUMENTS

| | | |
|---|---|---|
| 3,039,375 A | 6/1962 | Umbach |
| 3,185,056 A | 5/1965 | Gold et al. |
| 3,205,803 A | 9/1965 | Burgarella et al. |

(Continued)

FOREIGN PATENT DOCUMENTS

| | | |
|---|---|---|
| CA | 2616030 | 1/2013 |
| CA | 2648798 | 9/2013 |

(Continued)

OTHER PUBLICATIONS

Affadavit of James E. Clark: FlashWizard II Synchronizer, signed Mar. 20, 2008; previously submitted in U.S. Appl. No. 11/697,241.

(Continued)

*Primary Examiner* — Minh Phan
(74) *Attorney, Agent, or Firm* — Birch Tree IP Law & Strategy PLLC

(57) ABSTRACT

A system and method for synchronizing a photographic lighting device to image acquisition by a camera using light emission profile information to position a light emission profile at a desired location in an image acquisition window. A light energy balance point of a light emission profile can be used to position the balance point at a desired location in an image acquisition window.

34 Claims, 44 Drawing Sheets

Related U.S. Application Data is a continuation of application No. PCT/US2010/024088, filed on Feb. 12, 2010.

(60) Provisional application No. 61/152,089, filed on Feb. 12, 2009, provisional application No. 61/444,784, filed on Feb. 20, 2011.

(51) Int. Cl.
*H05B 41/32* (2006.01)
*G03B 7/16* (2014.01)

(56) References Cited

U.S. PATENT DOCUMENTS

| | | |
|---|---|---|
| 3,259,042 A | 7/1966 | Kagan |
| RE26,627 E | 7/1969 | Burgarella et al. |
| 3,659,509 A | 5/1972 | Burgarella |
| 3,728,947 A | 4/1973 | Harnden et al. |
| 3,782,258 A | 1/1974 | Boekkooi et al. |
| 3,810,214 A | 5/1974 | Malone et al. |
| 4,047,191 A | 9/1977 | Coppa et al. |
| 4,194,818 A | 3/1980 | Matteson et al. |
| 4,201,434 A | 5/1980 | Tureck |
| 4,209,244 A | 6/1980 | Sahara et al. |
| 4,333,719 A | 6/1982 | Takami et al. |
| 4,344,680 A | 8/1982 | Ishida et al. |
| 4,351,594 A | 9/1982 | Ishida et al. |
| 4,355,309 A | 10/1982 | Hughey et al. |
| 4,368,966 A | 1/1983 | Hagyuda |
| 4,482,895 A | 11/1984 | Weinberg |
| 4,509,845 A | 4/1985 | Mizokami |
| 4,571,049 A | 2/1986 | Tsunefuji et al. |
| 4,573,786 A | 3/1986 | Taniguchi et al. |
| 4,603,954 A | 8/1986 | Egawa et al. |
| 4,636,052 A | 1/1987 | Bowsher |
| 4,643,551 A | 2/1987 | Ohmori |
| 4,693,582 A | 9/1987 | Kawamura et al. |
| 4,712,902 A | 12/1987 | Hosomizu et al. |
| 4,740,804 A | 4/1988 | Shands |
| 4,816,850 A | 3/1989 | Phillipeaux et al. |
| 4,816,855 A | 3/1989 | Kitaura et al. |
| 4,884,094 A | 11/1989 | Kitaura et al. |
| 4,988,584 A | 1/1991 | Shaper |
| 5,016,037 A | 5/1991 | Taniguchi et al. |
| 5,159,375 A | 10/1992 | Taniguchi et al. |
| 5,283,610 A | 2/1994 | Sasaki |
| 5,299,012 A | 3/1994 | Tsuruta et al. |
| 5,359,375 A | 10/1994 | Clark |
| 5,384,611 A | 1/1995 | Tsuji et al. |
| 5,422,543 A | 6/1995 | Weinberg |
| 5,436,531 A | 7/1995 | Weinberg |
| 5,521,708 A | 5/1996 | Beretta |
| 5,640,623 A | 6/1997 | Sasaki |
| 5,692,223 A | 11/1997 | Ichikawa et al. |
| 5,708,833 A | 1/1998 | Kinney et al. |
| 5,713,050 A | 1/1998 | Ozawa |
| 5,721,971 A | 2/1998 | Sasaki |
| 5,734,934 A | 3/1998 | Horinishi et al. |
| 5,754,898 A | 5/1998 | Nakano |
| 5,848,306 A | 12/1998 | Shono |
| 6,006,039 A | 12/1999 | Steinberg et al. |
| 6,029,013 A | 2/2000 | Larkin et al. |
| 6,052,539 A | 4/2000 | Latorre |
| 6,088,542 A | 7/2000 | Yanai et al. |
| 6,127,940 A | 10/2000 | Weinberg |
| 6,167,199 A | 12/2000 | Fukui |
| 6,188,431 B1 | 2/2001 | Oie |
| 6,278,481 B1 | 8/2001 | Schmidt |
| 6,351,610 B1 | 2/2002 | Numako et al. |
| 6,353,711 B1 | 3/2002 | Numako et al. |
| 6,366,737 B1 | 4/2002 | Numako et al. |
| 6,400,907 B1 | 6/2002 | Izukawa |
| 6,404,987 B1 | 6/2002 | Fukui |
| 6,430,369 B2 | 8/2002 | Lee et al. |
| 6,453,154 B1 | 9/2002 | Haber et al. |
| 6,524,237 B1 | 2/2003 | McGowan |
| 6,618,557 B1 | 9/2003 | Ziemkowski |
| 6,625,399 B1 | 9/2003 | Davis |
| 6,683,654 B1 | 1/2004 | Haijima |
| 6,718,135 B2 | 4/2004 | Kawasaki et al. |
| 6,731,952 B2 | 5/2004 | Schaeffer et al. |
| 6,748,165 B2 | 6/2004 | Ogasawara |
| 6,778,764 B2 | 8/2004 | Barghini et al. |
| 6,798,986 B2 | 9/2004 | Hagiuda |
| 6,863,417 B2 | 3/2005 | Hill |
| 6,941,067 B2 | 9/2005 | Muramatsu |
| 7,016,603 B2 | 3/2006 | Clark |
| 7,035,534 B2 | 4/2006 | Shih et al. |
| 7,133,607 B2 | 11/2006 | Clark |
| 7,136,709 B2 | 11/2006 | Arling et al. |
| 7,184,658 B2 | 2/2007 | Squillace |
| 7,362,965 B2 | 4/2008 | Clark |
| 7,437,063 B2 | 10/2008 | Clark |
| 7,446,800 B2 | 11/2008 | Holmes |
| 7,463,304 B2 | 12/2008 | Murray |
| 7,684,692 B2 | 3/2010 | Kashiyama |
| 7,702,228 B2 | 4/2010 | Clark |
| 7,714,908 B2 | 5/2010 | Holmes |
| 7,764,875 B2 | 7/2010 | Clark |
| 7,775,575 B2 | 8/2010 | Clark |
| 7,783,188 B2 | 8/2010 | Clark |
| 7,834,894 B2 | 11/2010 | Swanson et al. |
| 7,877,005 B2 | 1/2011 | Okubo |
| 7,880,761 B2 | 2/2011 | Clark |
| 7,885,533 B2 | 2/2011 | Clark |
| 7,965,335 B2 | 6/2011 | Niblock |
| 7,969,504 B2 | 6/2011 | Matsuda et al. |
| 7,970,267 B1 | 6/2011 | Clark |
| 8,116,620 B2 | 2/2012 | King |
| 8,116,621 B2 | 2/2012 | King |
| 8,121,468 B2 | 2/2012 | Clark |
| 8,130,276 B2 | 3/2012 | Holmes |
| 8,134,576 B2 | 3/2012 | Swanson et al. |
| 8,180,210 B2 | 5/2012 | Clark |
| 8,326,136 B1 | 12/2012 | Clark |
| 8,326,140 B2 | 12/2012 | Clark |
| 8,326,141 B1 | 12/2012 | Clark |
| 8,331,776 B2 | 12/2012 | Clark |
| 8,351,774 B2 | 1/2013 | Clark |
| 8,526,808 B2 | 9/2013 | Clark |
| 8,532,476 B2 | 9/2013 | Clark |
| 8,538,250 B2 | 9/2013 | Clark |
| 8,559,804 B1 | 10/2013 | Clark |
| 8,571,401 B2 | 10/2013 | Clark |
| 8,571,406 B2 | 10/2013 | Clark |
| 8,614,766 B1 | 12/2013 | Clark |
| 8,705,950 B2 | 4/2014 | Clark |
| 8,718,461 B2 | 5/2014 | Clark |
| 8,803,989 B2 | 8/2014 | Clark |
| 8,824,882 B2 | 9/2014 | Clark |
| 8,917,350 B2 | 12/2014 | Clark |
| 2001/0042149 A1 | 11/2001 | Ito et al. |
| 2002/0009296 A1 | 1/2002 | Shaper et al. |
| 2002/0013161 A1 | 1/2002 | Schaeffer et al. |
| 2002/0061192 A1 | 5/2002 | Kawasaki et al. |
| 2002/0067425 A1 | 6/2002 | Iverson |
| 2002/0067923 A1 | 6/2002 | Fujimura |
| 2002/0127019 A1 | 9/2002 | Ogasawara |
| 2002/0191389 A1 | 12/2002 | Hill |
| 2003/0128272 A1 | 7/2003 | Clough et al. |
| 2003/0133018 A1 | 7/2003 | Ziemkowski |
| 2003/0161621 A1 | 8/2003 | Takaiwa |
| 2003/0165335 A1 | 9/2003 | Hagiuda |
| 2003/0193588 A1 | 10/2003 | Yuen et al. |
| 2004/0036774 A1 | 2/2004 | Nichols et al. |
| 2004/0066455 A1 | 4/2004 | Holmes |
| 2004/0101295 A1 | 5/2004 | Clark |
| 2004/0136702 A1 | 7/2004 | Barghini et al. |
| 2004/0145114 A1 | 7/2004 | Ippolito et al. |
| 2004/0234259 A1 | 11/2004 | Muramatsu |
| 2005/0006484 A1 | 1/2005 | Ito |
| 2005/0096753 A1 | 5/2005 | Arling et al. |
| 2005/0174434 A1 | 8/2005 | Chang et al. |
| 2005/0249486 A1 | 11/2005 | Murray |

(56) References Cited

U.S. PATENT DOCUMENTS

| | | |
|---|---|---|
| 2005/0281549 A1 | 12/2005 | Shih et al. |
| 2006/0014563 A1 | 1/2006 | Cheng |
| 2006/0093341 A1 | 5/2006 | Clark |
| 2006/0093348 A1 | 5/2006 | Squillace |
| 2006/0216009 A1 | 9/2006 | Kawamura |
| 2006/0275024 A1 | 12/2006 | McNary |
| 2006/0291016 A1 | 12/2006 | Ishigami et al. |
| 2007/0058959 A1 | 3/2007 | Clark |
| 2007/0070206 A1 | 3/2007 | Clark |
| 2007/0110416 A1 | 5/2007 | Yamaguchi et al. |
| 2007/0160358 A1 | 7/2007 | Kashiyama |
| 2007/0229250 A1 | 10/2007 | Recker et al. |
| 2007/0237510 A1 | 10/2007 | Clark |
| 2007/0273774 A1 | 11/2007 | Holmes |
| 2008/0106630 A1 | 5/2008 | Matsuda et al. |
| 2008/0180531 A1 | 7/2008 | Sekiguchi |
| 2008/0193114 A1 | 8/2008 | Clark |
| 2008/0246777 A1 | 10/2008 | Swanson et al. |
| 2008/0298792 A1 | 12/2008 | Clark |
| 2008/0298793 A1 | 12/2008 | Clark |
| 2009/0034952 A1 | 2/2009 | Clark |
| 2009/0060488 A1 | 3/2009 | Okubo |
| 2009/0066810 A1 | 3/2009 | Holmes |
| 2009/0102679 A1 | 4/2009 | Schoettle |
| 2009/0129765 A1 | 5/2009 | King |
| 2009/0135262 A1 | 5/2009 | Ogasawara |
| 2009/0185797 A1 | 7/2009 | Ogasawara |
| 2009/0278479 A1 | 11/2009 | Platner et al. |
| 2009/0310012 A1 | 12/2009 | Ueda et al. |
| 2010/0008658 A1 | 1/2010 | King |
| 2010/0118177 A1 | 5/2010 | Niblock |
| 2010/0122215 A1 | 5/2010 | MacGregor |
| 2010/0124412 A1 | 5/2010 | King |
| 2010/0158494 A1 | 6/2010 | King |
| 2010/0177212 A1 | 7/2010 | Holmes |
| 2010/0202767 A1 | 8/2010 | Shirakawa |
| 2010/0209089 A1 | 8/2010 | King |
| 2010/0290771 A1 | 11/2010 | Clark |
| 2010/0316364 A1 | 12/2010 | Clark |
| 2011/0001665 A1 | 1/2011 | King |
| 2011/0119409 A1 | 5/2011 | King |
| 2011/0123185 A1 | 5/2011 | Clark |
| 2011/0128390 A1 | 6/2011 | Clark |
| 2011/0129207 A1 | 6/2011 | King et al. |
| 2011/0134141 A1 | 6/2011 | Swanson et al. |
| 2011/0167008 A1 | 7/2011 | King |
| 2011/0268432 A1 | 11/2011 | Clark |
| 2012/0027395 A1 | 2/2012 | Clark |
| 2012/0033959 A1 | 2/2012 | King |
| 2012/0044371 A1 | 2/2012 | King |
| 2012/0045193 A1 | 2/2012 | King |
| 2012/0051726 A1 | 3/2012 | King |
| 2012/0099847 A1 | 4/2012 | Clark |
| 2012/0120281 A1 | 5/2012 | Swanson et al. |
| 2012/0127340 A1 | 5/2012 | Holmes |
| 2012/0127361 A1 | 5/2012 | Clark |
| 2012/0140088 A1 | 6/2012 | Clark |
| 2012/0148221 A1 | 6/2012 | Clark |
| 2012/0181948 A1 | 7/2012 | Clark |
| 2012/0194688 A1 | 8/2012 | Li et al. |
| 2012/0194699 A1 | 8/2012 | Kouno |
| 2012/0207459 A1 | 8/2012 | Clark |
| 2012/0207460 A1 | 8/2012 | Clark |
| 2012/0243859 A1 | 9/2012 | Clark |
| 2013/0089313 A1 | 4/2013 | Clark |
| 2013/0094845 A1 | 4/2013 | Clark |
| 2013/0100340 A1 | 4/2013 | Clark |
| 2013/0121674 A1 | 5/2013 | Clark |
| 2014/0241710 A1 | 8/2014 | Clark |
| 2014/0347508 A1 | 11/2014 | Clark |
| 2014/0369673 A1 | 12/2014 | Clark |
| 2015/0124427 A1 | 5/2015 | Clark |

FOREIGN PATENT DOCUMENTS

| | | |
|---|---|---|
| CN | 2010-10600736.4 | 2/2010 |
| CN | 2007-80020420.4 | 6/2010 |
| CN | 2010-10600736.4 | 12/2012 |
| EP | 0984320 A1 | 3/2000 |
| EP | 07760263.9 | 1/2011 |
| EP | 07760263.9 | 7/2011 |
| EP | 8756458.9 | 7/2011 |
| EP | 11177995.5 | 12/2011 |
| EP | 11177995.5 | 7/2012 |
| EP | 10741797 | 8/2012 |
| EP | 11177995.5 | 8/2012 |
| EP | 11177997.1 | 12/2012 |
| JP | 56-143422 | 11/1981 |
| JP | 59-064821 A | 4/1984 |
| JP | 59-170822 | 9/1984 |
| JP | 63-018874 | 1/1988 |
| JP | 05-093948 | 4/1993 |
| JP | 07-159866 | 6/1995 |
| JP | 2002-244193 A | 8/2002 |
| JP | 2002-318413 | 10/2002 |
| JP | 2003-172970 A | 6/2003 |
| JP | 2003-215672 A | 7/2003 |
| JP | 2003-325451 | 11/2003 |
| JP | 2004-072230 | 3/2004 |
| JP | 2006-149935 | 6/2006 |
| JP | 2007-067870 A | 3/2007 |
| KR | 10-0728117 | 6/2007 |
| WO | 9638925 A1 | 12/1996 |
| WO | PCT/US2003/037271 | 5/2004 |
| WO | 2007012041 A2 | 1/2007 |
| WO | PCT/US2007/066162 | 11/2007 |
| WO | PCT/US2006/028229 | 2/2008 |
| WO | PCT/US2008/065137 | 9/2008 |
| WO | PCT/US2008/065139 | 9/2008 |
| WO | PCT/US2010/024088 | 7/2010 |
| WO | 2010093914 A1 | 8/2010 |
| WO | 2010093927 A1 | 8/2010 |
| WO | 2010093994 A1 | 8/2010 |
| WO | PCT/US2010/024108 | 9/2010 |
| WO | PCT/US2010/024195 | 9/2010 |
| WO | PCT/US2011/044008 | 11/2011 |
| WO | 2012009537 A1 | 1/2012 |
| WO | PCT/US2012/025915 | 6/2012 |
| WO | 2012161772 A1 | 11/2012 |

OTHER PUBLICATIONS

Analog Devices Technical Data Sheet for ADF7020-1 Transceiver IC, Analog Devices, Inc., 2005, pp. 1-44.

ASH Transceiver Impedance Matching; Document Created on Dec. 10, 2001; pp. 1 to 10; http://www.rfm.com/products/apnotes/antennamatch.pdf; last viewed on Dec. 15, 2005.

Declaration of James E. Clark filed on Feb. 18, 2005 in U.S. Appl. No. 10/306,759.

Ken Rockwell: Nikon SU-800 Remote Commander; Nov. 1, 2005, http://www.kenrockwell.com/nikon/su800.htm; last viewed on Jul. 18, 2012.

Ken Rockwell; How to Use Nikon Strobes Wirelessly, for Free!; Dec. 17, 2005; http://web.archive.org/web/20051217091704/http://www.kenrockwell.com/nikon/ittlslave.htm; last viewed at Internet archive on Apr. 1.

Nikon D2x; Sep., 2004; pp. 1 to 12; Nikon Corporation.

Nikon D80 User's Manual; see "Modeling Flash," p. 98; published on Aug. 11, 2006.

Nikon WT-1 Transmitter User's Manual; around Dec. 2003; Nikon Corporation.

Nikon WT-2 Article, Part 1; Nikon Corporation; http://nikonimaging.com/global/technology/scene/11/index.htm; last viewed on Mar. 14, 2008.

Nikon WT-2 Article, Part 2: Nikon Corporation; http://nikonimaging.com/global/technology/scene/11/index_02.htm; last viewed on Mar. 14, 2008.

Phil Askey, Nikon D2H Review: 15. Wireless: Digital Photography Review, Wireless (Review of WT-1 Transmitter); Dec. 2003; http://www.dpreview.com/reviews/NikonD2H/page15.asp; last viewed on Mar. 18, 2008.

(56) References Cited

OTHER PUBLICATIONS

Phil Askey, Nikon D2H Review: 1. Introduction: Digital Photography Review, Nikon D2H Review, Dec. 2003; http://www.dpreview.com/reviews/NikonD2H/; last viewed on Mar. 18, 2008.

Phil Askey, Nikon D2Hs Preview: 1. Introduction: Digital Photography Review (includes Review of WT-2 Transmitter); Feb. 2005; http://www.dpreview.com/articles/nikond2hs/; last viewed Mar. 14, 2008.

PocketWizard MultiMAX Transceiver New Trigger Control Software Features, by LPA Design, Feb. 10, 2001; pp. 1 to 6, United States.

PocketWizard MultiMAX Transceiver Owner's Manual, by LPA Design, May 2001, pp. 1-55 and "Relay Mode" on p. 40, United States.

Quantum FreeWire Transceiver; Jul. 17, 2005; pp. 1 to 7; http://web.archive.org/web/20050717015832/http://www.qtm.com/wireless/freewire.html; last viewed at Internet Archive on Apr. 25, 2008.

Quantum FreeWire Transceiver; Nov. 15, 2004; pp. 1 to 7; http://web.archive.org/web/20041115093657/http://www.qtm.com/wireless/freewire.html; last viewed at Internet Archive on Apr. 25, 2008.

Quantum FreeWire Transceiver; Oct. 7, 2001; pp. 1 to 6; http://web.archive.org/web/20011007140624/http://www.qtm.com/wireless/freewire.html; last viewed at Internet Archive on Apr. 25, 2008.

Rob Galbraith; Casting Light on the PocketWizard MiniTT1 and FlexTT5; Parts 1 to 5; Feb. 16, 2009; http://www.robgalbraith.com/bins/multi_page.asp?cid=7-9884-9903; last viewed on Jul. 12, 2012.

Robert Hanashiro; Equipment Corner—News & Notes for all Those Gear-Heads; Nov. 26, 2001; pp. 1 to 3; http://www.sportsshooter.com/news_story.html?id=594; last viewed on Sep. 17, 2002.

Strobist Blog: PocketWizard FlexTT5 and MiniTT1: Full Review; Feb. 16 to 18, 2009; blog comments, pp. 1 to 40; http://strobist.blogspot.com/2009/02/pocketwizard-flextt5-and-minitt1-full.html; last viewed on Feb. 18, 2009.

Strobist Blog: PocketWizard FlexTT5 and MiniTT1: Full Review; Feb. 16, 2009; pp. 1 to 11; http://strobist.blogspot.com/2009/02/pocketwizard-flextt5-and-minitt1-full.html; last viewed on Feb. 18, 2009.

XE-200 RF Shutter Release for Rebel 2000; http://zenopuseelectronix.com/XE-200.html; last viewed on Sep. 9, 2002.

U.S. Appl. No. 11/305,668, Mar. 8, 2006, Office Action, Now U.S. Pat. No. 7,133,607.

U.S. Appl. No. 11/305,668, Jun. 8, 2006, Response to Office Action, Now U.S. Pat. No. 7,133,607.

U.S. Appl. No. 11/305,668, Jun. 13, 2006, Supplemental Response to Request for Clarification by the Examiner, Now U.S. Pat. No. 7,133,607.

U.S. Appl. No. 11/305,668, Jun. 30, 2006, Notice of Allowance, Now U.S. Pat. No. 7,133,607.

U.S. Appl. No. 11/305,668, Mar. 29, 2007, Request for Correction of Letters Patent, Now U.S. Pat. No. 7,133,607.

U.S. Appl. No. 11/529,203, Aug. 14, 2007, Office Action, Now U.S. Pat. No. 7,362,965.

U.S. Appl. No. 11/529,203, Oct. 16, 2007, Terminal Disclaimer, Now U.S. Pat. No. 7,362,965.

U.S. Appl. No. 11/529,203, Oct. 16, 2007, Response to Office Action, Now U.S. Pat. No. 7,362,965.

U.S. Appl. No. 11/529,203, Oct. 25, 2007, Terminal Disclaimer, Now U.S. Pat. No. 7,362,965.

U.S. Appl. No. 11/529,203, Dec. 14, 2007, Notice of Allowance, Now U.S. Pat. No. 7,362,965.

U.S. Appl. No. 12/104,950, Dec. 31, 2009, Office Action, Now U.S. Pat. No. 7,764,875.

U.S. Appl. No. 12/104,950, Feb. 1, 2010, Response to Office Action, Now U.S. Pat. No. 7,764,875.

U.S. Appl. No. 12/104,950, Mar. 23, 2010, Notice of Allowance, Now U.S. Pat. No. 7,764,875.

U.S. Appl. No. 12/843,254, Jul. 27, 2010, Preliminary Remarks, Now U.S. Pat. No. 8,121,468.

U.S. Appl. No. 12/843,254, Aug. 25, 2011, Office Action, Now U.S. Pat. No. 8,121,468.

U.S. Appl. No. 12/843,254, Aug. 25, 2011, Response to Office Action, Now U.S. Pat. No. 8,121,468.

U.S. Appl. No. 12/843,254, Aug. 25, 2011, Terminal Disclaimer, Now U.S. Pat. No. 8,121,468.

U.S. Appl. No. 12/843,254, Nov. 28, 2011, Notice of Allowance, Now U.S. Pat. No. 8,121,468.

U.S. Appl. No. 13/399,333, Jun. 14, 2012, Office Action, Now U.S. Pat. No. 8,351,774.

U.S. Appl. No. 13/399,333, Sep. 14, 2012, Response to Office Action, Now U.S. Pat. No. 8,351,774.

U.S. Appl. No. 13/399,333, Sep. 14, 2012, Terminal Disclaimers, Now U.S. Pat. No. 8,351,774.

U.S. Appl. No. 13/399,333, Sep. 28, 2012, Notice of Allowance, Now U.S. Pat. No. 8,351,774.

U.S. Appl. No. 13/735,325, Mar. 15, 2013, Office Action, Now U.S. Pat. No. 8,532,476.

U.S. Appl. No. 13/735,325, Mar. 21, 2013, Response to Office Action w/Terminal Disclaimers, Now U.S. Pat. No. 8,532,476.

U.S. Appl. No. 13/735,325, May 14, 2013, Notice of Allowance, Now U.S. Pat. No. 8,532,476.

U.S. Appl. No. 14/021,200, Oct. 8, 2013, Office Action.

U.S. Appl. No. 10/306,759, Aug. 29, 2003, Office Action, Now U.S. Pat. No. 7,016,603.

U.S. Appl. No. 10/306,759, Dec. 18, 2003, Response to Office Action, Now U.S. Pat. No. 7,016,603.

U.S. Appl. No. 10/306,759, Dec. 24, 2003, Examiner Interview Summary, Now U.S. Pat. No. 7,016,603.

U.S. Appl. No. 10/306,759, Mar. 27, 2004, Final Office Action, Now U.S. Pat. No. 7,016,603.

U.S. Appl. No. 10/306,759, Apr. 15, 2004, Examiner Interview Summary, Now U.S. Pat. No. 7,016,603.

U.S. Appl. No. 10/306,759, Apr. 20, 2004, Response to Final Office Action, Now U.S. Pat. No. 7,016,603.

U.S. Appl. No. 10/306,759, Aug. 24, 2004, Office Action, Now U.S. Pat. No. 7,016,603.

U.S. Appl. No. 10/306,759, Feb. 18, 2005, Request for Continued Examination, Now U.S. Pat. No. 7,016,603.

U.S. Appl. No. 10/306,759, Mar. 29, 2005, Office Action, Now U.S. Pat. No. 7,016,603.

U.S. Appl. No. 10/306,759, Apr. 14, 2005, Response to Office Action, Now U.S. Appl. No. 7,016,603.

U.S. Appl. No. 10/306,759, Jun. 29, 2005, Final Office Action, Now U.S. Pat. No. 7,016,603.

U.S. Appl. No. 10/306,759, Aug. 25, 2005, Response to Final Office Action, Now U.S. Pat. No. 7,016,603.

U.S. Appl. No. 10/306,759, Sep. 16, 2005, Notice of Allowance, Now U.S. Pat. No. 7,016,603.

U.S. Appl. No. 10/306,759, Oct. 18, 2005, 312 Amendment, Now U.S. Pat. No. 7,016,603.

U.S. Appl. No. 10/306,759, Dec. 20, 2005, Response to 312 Amendment, Now U.S. Pat. No. 7,016,603.

U.S. Appl. No. 10/306,759, Jan. 4, 2006, Response to 312 Amendment, Now U.S. Pat. No. 7,016,603.

U.S. Appl. No. 10/306,759, Nov. 18, 2006, Certificate of Correction, Now U.S. Pat. No. 7,016,603.

U.S. Appl. No. 11/488/491, Oct. 16, 2007, Office Action.

U.S. Appl. No. 13/016,345, Apr. 26, 2013, Restriction Requirement.

U.S. Appl. No. 13/016,345, Sep. 17, 2013, Office Action.

U.S. Appl. No. 11/490,322, Apr. 20, 2010, Office Action, Now U.S. Pat. No. 7,880,761.

U.S. Appl. No. 11/490,322, Jul. 12, 2010, Response to Office Action, Now U.S. Pat. No. 7,880,761.

U.S. Appl. No. 11/490,322, Sep. 15, 2010, Notice of Allowance, Now U.S. Pat. No. 7,880,761.

U.S. Appl. No. 12/250,914, Jun. 12, 2009, Office Action, Now U.S. Pat. No. 7,702,228.

U.S. Appl. No. 12/250,914, Jun. 29, 2009, Response to Office Action and Terminal Disclaimer, Now U.S. Pat. No. 7,702,228.

U.S. Appl. No. 12/250,914, Oct. 28, 2009, Terminal Disclaimer, Now U.S. Pat. No. 7,702,228.

(56) References Cited

OTHER PUBLICATIONS

U.S. Appl. No. 12/250,914, Dec. 3, 2009, Notice of Allowance, Now U.S. Pat. No. 7,702,228.
U.S. Appl. No. 12/762,811, Dec. 28, 2010, Office Action, Now U.S. Pat. No. 7,970,267.
U.S. Appl. No. 12/762,811, Mar. 28, 2011, Response to Office Action, Now U.S. Pat. No. 7,970,267.
U.S. Appl. No. 12/762,811, Mar. 28, 2011, Terminal Disclaimer, Now U.S. Pat. No. 7,970,267.
U.S. Appl. No. 12/762,811, Apr. 20, 2011, Notice of Allowance, Now U.S. Pat. No. 7,970,267.
U.S. Appl. No. 13/169,413, Dec. 20, 2011, Office Action, Now U.S. Pat. No. 8,180,210.
U.S. Appl. No. 13/169,413, Jan. 16, 2012, Response to Office Action, Now U.S. Pat. No. 8,180,210.
U.S. Appl. No. 13/169,413, Jan. 16, 2012, Terminal Disclaimers, Now U.S. Pat. No. 8,180,210.
U.S. Appl. No. 13/169,413, Mar. 22, 2012, Notice of Allowance, Now U.S. Pat. No. 8,180,210.
U.S. Appl. No. 13/438,500, Jun. 18, 2012, Office Action, Now U.S. Pat. No. 8,559,804.
U.S. Appl. No. 13/438,500, Sep. 14, 2012, Response to Office Action, Now U.S. Pat. No. 8,559,804.
U.S. Appl. No. 13/438,500, Sep. 14, 2012, Terminal Disclaimers, Now U.S. Pat. No. 8,559,804.
U.S. Appl. No. 13/438,500, Jun. 12, 2013, Notice of Allowance, Now U.S. Pat. No. 8,559,804.
U.S. Appl. No. 11/697,241, Nov. 8, 2007, Office Action, Now U.S. Pat. No. 7,437,063.
U.S. Appl. No. 11/697,241, Mar. 10, 2008, Response to Office Action, Now U.S. Pat. No. 7,437,063.
U.S. Appl. No. 11/697,241, Mar. 24, 2008, Examiner Interview Summary, Now U.S. Pat. No. 7,437,063.
U.S. Appl. No. 11/697,241, Jun. 9, 2008, Notice of Allowance, Now U.S. Pat. No. 7,437,063.
U.S. Appl. No. 12/129,447, Apr. 12, 2010, Notice of Allowance, Now U.S. Pat. No. 7,775,575.
U.S. Appl. No. 12/129,447, Apr. 12, 2010, Examiner Amendment, Now U.S. Pat. No. 7,775,575.
U.S. Appl. No. 12/861,445, Sep. 30, 2010, Notice of Allowance, Now U.S. Pat. No. 7,885,533.
U.S. Appl. No. 13/021,951, Nov. 25, 2011, Notice of Allowance, Now U.S. Pat. No. 8,331,776.
U.S. Appl. No. 13/021,951, Feb. 13, 2012, Withdrawal of Notice of Allowance, Now U.S. Pat. No. 8,331,776.
U.S. Appl. No. 13/021,951, Feb. 22, 2012, Office Action, Now U.S. Pat. No. 8,331,776.
U.S. Appl. No. 13/253,596, Nov. 30, 2011, Office Action, Now U.S. Pat. No. 8,326,140.
U.S. Appl. No. 13/253,596, Feb. 29, 2012, Response to Office Action, Now U.S. Pat. No. 8,326,140.
U.S. Appl. No. 13/253,596, May 9, 2012, Final Office Action, U.S. Pat. No. 8,326,140.
U.S. Appl. No. 13/708,326, Mar. 26, 2013, Notice of Allowance, U.S. Pat. No. 8,526,808.
U.S. Appl. No. 14/015,336, Nov. 8, 2013, Office Action.
U.S. Appl. No. 14/015,336, Apr. 7, 2014, Response to Office Action.
U.S. Appl. No. 12/129,402, Apr. 19, 2010, Notice of Allowance, U.S. Pat. No. 7,783,188.
U.S. Appl. No. 13/201,182, May 24, 2013, Restriction Requirement.
U.S. Appl. No. 13/201,182, Nov. 18, 2013, Office Action.
U.S. Appl. No. 13/201,185, Nov. 22, 2013, Office Action.
U.S. Appl. No. 13/208,686, Feb. 6, 2013, Office Action, U.S. Pat. No. 8,705,950.
U.S. Appl. No. 13/208,686, May 6, 2013, Response to Office Action, U.S. Pat. No. 8,705,950.
U.S. Appl. No. 13/208,686, Jul. 15, 2013, Final Office Action, U.S. Pat. No. 8,705,950.
U.S. Appl. No. 13/208,686, Sep. 30, 2013, Notice of Allowance, U.S. Pat. No. 8,705,950.
U.S. Appl. No. 13/208,706, Dec. 26, 2012, Office Action, U.S. Pat. No. 8,571,406.
U.S. Appl. No. 13/208,706, Mar. 26, 2013, Response to Office Action, U.S. Pat. No. 8,571,406.
U.S. Appl. No. 13/208,706, Jul. 2, 2013, Notice of Allowance, U.S. Pat. No. 8,571,406.
U.S. Appl. No. 13/201,281, Sep. 25, 2013, Office Action.
U.S. Appl. No. 13/401,175, May 6, 2013, Office Action.
U.S. Appl. No. 13/401,175, Aug. 6, 2013, Response to Office Action.
U.S. Appl. No. 13/401,175, Sep. 20, 2013, Notice of Allowance.
U.S. Appl. No. 13/401,175, Dec. 16, 2013, Notice to File Corrected Application Papers.
U.S. Appl. No. 13/401,175, Mar. 20, 2014, Reponse to Notice to File Corrected Application Papers.
U.S. Appl. No. 13/401,175, Mar. 20, 2014, Petition to Revive.
U.S. Appl. No. 13/401,175, Apr. 1, 2014, Petition Decision to Revive.
U.S. Appl. No. 13/692,515, Jun. 24, 2013, Notice of Allowance, U.S. Pat. No. 8,571,401.
U.S. Appl. No. 12/705,052, Mar. 27, 2012, Office Action, U.S. Pat. No. 8,326,141.
U.S. Appl. No. 12/705,052, Jun. 27, 2012, Response to Office Action, U.S. Pat. No. 8,326,141.
U.S. Appl. No. 12/705,052, Sep. 5, 2012, Notice of Allowance, U.S. Pat. No. 8,326,141.
U.S. Appl. No. 13/692,550, May 16, 2013, Notice of Allowance, U.S. Pat. No. 8,538,250.
U.S. Appl. No. 13/692,550, Jul. 2, 2013, Supplemental Notice of Allowance, U.S. Pat. No. 8,538,250.
U.S. Appl. No. 12/705,096, Mar. 12, 2012, Office Action, U.S. Pat. No. 8,326,136.
U.S. Appl. No. 12/705,096, Jun. 12, 2012, Response to Office Action, U.S. Pat. No. 8,326,136.
U.S. Appl. No. 12/705,096, Aug. 8, 2012, Notice of Allowance, U.S. Pat. No. 8,326,136.
U.S. Appl. No. 12/705,164, Mar. 29, 2012, Office Action, U.S. Pat. No. 8,614,766.
U.S. Appl. No. 12/705,164, Jun. 29, 2012, Response to Office Action, U.S. Pat. No. 8,614,766.
U.S. Appl. No. 12/705,164, Sep. 7, 2012, Office Action, U.S. Pat. No. 8,614,766.
U.S. Appl. No. 12/705,164, Nov. 29, 2012, RCE, U.S. Pat. No. 8,614,766.
U.S. Appl. No. 12/705,164, Aug. 14, 2013, Notice of Allowance, U.S. Pat. No. 8,614,766.
U.S. Appl. No. 13/183,046, Feb. 13, 2013, Office Action, U.S. Pat. No. 8,600,224.
U.S. Appl. No. 13/183,046, Apr. 29, 2013, Response to Office Action, U.S. Pat. No. 8,600,224.
U.S. Appl. No. 13/183,046, Jul. 31, 2013, Notice of Allowance, U.S. Pat. No. 8,600,224.
U.S. Appl. No. 11/305,668, filed Dec. 16, 2005, Now U.S. Pat. No. 7,133,607.
U.S. Appl. No. 11/529,203, filed Sep. 27, 2006, Now U.S. Pat. No. 7,362,965.
U.S. Appl. No. 12/104,950, filed Apr. 17, 2008, Now U.S. Pat. No. 7,764,875.
U.S. Appl. No. 12/843,254, filed Jul. 26, 2010, Now U.S. Pat. No. 8,121,468.
U.S. Appl. No. 13/399,333, filed Feb. 17, 2012, Now U.S. Pat. No. 8,351,774.
U.S. Appl No. 13/735,325, filed Jan. 7, 2013, Now U.S. Pat. No. 8,532,476.
U.S. Appl. No. 14,201,200, filed Sep. 9, 2013.
U.S. Appl. No. 10/306,759, filed Nov. 26, 2002, Now U.S. Pat. No. 7,016,603.
U.S. Appl. No. 13/016,345, filed Jan. 28, 2011.
U.S. Appl. No. 11/490,322, filed Jul. 20, 2006, Now U.S. Pat. No. 7,880,761.
U.S. Appl. No. 12/250,914, filed Oct. 14, 2008, Now U.S. Pat. No. 7,702,228.
U.S. Appl. No. 12/762,811, filed Apr. 19, 2010, Now U.S. Pat. No. 7,970,267.

(56) References Cited

OTHER PUBLICATIONS

U.S. Appl. No. 13/169,413, filed Jun. 27, 2011, Now U.S. Pat. No. 8,180,210.
U.S. Appl. No. 13/438,500, filed Apr. 3, 2012, Now U.S. Pat. No. 8,559,804.
U.S. Appl. No. 11/697,241, filed Apr. 5, 2007, Now U.S. Pat. No. 7,437,063.
U.S. Appl. No. 12/129,447, filed May 29, 2008, Now U.S. Pat. No. 7,775,575.
U.S. Appl. No. 12/861,445, filed Aug. 23, 2010, Now U.S. Pat. No. 7,885,533.
U.S. Appl. No. 13/021,951, filed Feb. 7, 2011, Now U.S. Pat. No. 8,331,776.
U.S. Appl. No. 13/253,596, filed Oct. 5, 2011, Now U.S. Pat. No. 8,326,140.
U.S. Appl. No. 13/708,326, filed Dec. 7, 2012, Now U.S. Pat. No. 8,526,808.
U.S. Appl. No. 14/015,336, filed Aug. 30, 2013.
U.S. Appl. No. 12/129,402, filed May 29, 2008, Now U.S. Pat. No. 7,783,188.
U.S. Appl. No. 13/201,182, filed Aug. 11, 2011.
U.S. Appl. No. 13/201,185, filed Aug. 11, 2011.
U.S. Appl. No. 13/208,686, filed Aug. 12, 2011, Now U.S. Pat. No. 8,705,950.
U.S. Appl. No. 13/208,706, filed Aug. 12, 2011, Now U.S. Pat. No. 8,571,406.
U.S. Appl. No. 13/201,281, filed Aug. 12, 2011.
U.S. Appl. No. 13/401,175, filed Feb. 21, 2012.
U.S. Appl. No. 13/692,515, filed Dec. 3, 2012, Now U.S. Pat. No. 8,571,401.
U.S. Appl. No. 12/705,052, filed Feb. 12, 2010, Now U.S. Pat. No. 8,326,141.
U.S. Appl. No. 13/692,550, filed Dec. 3, 2012, Now U.S. Pat. No. 8,538,250.
U.S. Appl. No. 12/705,096, filed Feb. 12, 2010, Now U.S. Pat. No. 8,326,136.
U.S. Appl. No. 12/705,164, filed Feb. 12, 2010, Now U.S. Pat. No. 8,614,766.
U.S. Appl. No. 13/183,046, filed Jul. 14, 2011, Now U.S. Pat. No. 8,600,224.
Profoto Pro-B2 User's Manual, dated Jan. 2005.
U.S. Appl. No. 14/456,691, filed Aug. 11, 2014.
U.S. Appl. No. 14/472,320, filed Aug. 28, 2014.
U.S. Appl. No. 14/533,067, filed Nov. 4, 2014.
Nikon SB-900 Speedlight Users Manual. 2008.
U.S. Appl. No. 12/705,164, Nov. 8, 2012, Response to Office Action, U.S. Pat. No. 8,814,766.
U.S. Appl. No. 12/705,164, Nov. 21 2012, Advisory Action and Applicant Initiated Interview Summary, U.S. Pat. No. 8,614,766.
U.S. Appl. No. 13/016,345, May 28, 2013, Response to Restriction Requirement, U.S. Pat. No. 8,803,989.
U.S. Appl. No. 13/016,345, Mar. 17, 2014, Response to Office Action, U.S. Pat. No. 8,803,989.
U.S. Appl. No. 13/016,345, Apr. 10, 2014, Notice of Allowance, U.S. Pat. No. 8,803,989.
U.S. Appl. No. 13/016,345, Jul. 23, 2014, Issue Notification, U.S. Pat. No. 8,803,989.
U.S. Appl. No. 13/021,951, Jul. 20, 2012, Response to Office Action, U.S. Pat. No. 8,331,776.
U.S. Appl. No. 13/021,951, Oct. 5, 2012, Notice of Allowance, U.S. Pat. No. 8,331,776.
U.S. Appl. No. 13/201,182, Aug. 26, 2013, Response to Restriction Requirement.
U.S. Appl. No. 13/201,281, Mar. 24, 2014, Response to Office Action, U.S. Pat. No. 8,917,350.
U.S. Appl. No. 13/201,281, Mar. 24, 2014, Terminal Disclaimer, U.S. Pat. No. 8,917,350.
U.S. Appl. No. 13/201,281, Apr. 21, 2014, Notice of Allowance, U.S. Pat. No. 8,917,350.
U.S. Appl. No. 13/201,281, Dec. 3, 2014, Issue Notification, U.S. Pat. No. 8,917,350.
U.S. Appl. No. 13/208,686, Aug. 16, 2013, Applicant Initiated Interview Summary, U.S. Pat. No. 8,705,950.
U.S. Appl. No. 13/208,686, Sep. 16, 2013, Response to Office Action, U.S. Pat. No. 8,705,950.
U.S. Appl. No. 13/253,596, Feb. 29, 2012, Terminal Disclaimer, U.S. Pat. No. 8,326,140.
U.S. Appl. No. 13/253,596, Jul. 18, 2012, Request for Continued Examination, U.S. Pat. No. 8,326,140.
U.S. Appl. No. 13/253,596, Jul. 18, 2012, Response to Office Action, U.S. Pat. No. 8,326,140.
U.S. Appl. No. 13/253,596, Aug. 9, 2012, Notice of Allowance, U.S. Pat. No. 8,326,140.
U.S. Appl. No. 13/401,175, Jan. 13, 2014, Corrected Notice of Allowability, U.S. Pat. No. 8,718,461.
U.S. Appl. No. 13/401,175, Apr. 16, 2015, Issue Notification, U.S. Pat. No. 8,718,461.
U.S. Appl. No. 14/015,336, Apr. 7, 2014, Terminal Disclaimers, U.S. Pat. No. 8,824,882.
U.S. Appl. No. 14/015,336, May 2, 2014, Notice of Allowance, U.S. Pat. No. 8,824,882.
U.S. Appl. No. 14/456,691, Oct. 23, 2015, Restriction Requirement.
U.S. Appl. No. 14/456,691, Nov. 4, 2015, Response to Restriction Requirement.
U.S. Appl. No. 14/456,691, Dec. 18, 2015, Office Action.
U.S. Appl. No. 14/472,320, Apr. 27, 2015, Office Action.
U.S. Appl. No. 14/472,320, Jul. 30, 2015, Response to Office Action.
U.S. Appl. No. 14/472,320, Jul. 30, 2015, Terminal Disclaimers.
U.S. Appl. No. 14/472,320, Sep. 22, 2015, Notice of Allowance.
U.S. Appl. No. 14/987,589, filed Jan. 4, 2016.

2805

2810

2905

2910

3005

3010

PHOTOGRAPHIC SYNCHRONIZATION OPTIMIZATION SYSTEM AND METHOD

RELATED APPLICATION DATA

This application is a continuation of U.S. patent application Ser. No. 13/401,175, filed Feb. 21, 2012, and titled "Photographic Synchronization Optimization System and Method," which is a continuation-in-part of U.S. patent application Ser. No. 13/208,686, filed Aug. 12, 2011, and titled "Early Photographic Critical Point Synchronization System and Method," which is a continuation of International Application No. PCT/US2010/024088, filed Feb. 12, 2010, and titled "Early Photographic Synchronization System and Method," which claims the benefit of priority of U.S. Provisional Patent Application Ser. No. 61/152,089, filed Feb. 12, 2009, and titled "Early Photographic Synchronization System and Method," each of which is incorporated by reference herein in its entirety. This application also claims the benefit of priority of U.S. Provisional Patent Application Ser. No. 61/444,784, filed Feb. 20, 2011, and titled "Photographic Synchronization Optimization System and Method," which is incorporated by reference herein in its entirety.

This application is also related to commonly-owned and co-pending U.S. patent application Ser. No. 13/201,281 entitled "Early Photographic Synchronization System and Method;" which is incorporated by reference herein in its entirety.

FIELD OF THE INVENTION

The present invention generally relates to the field of synchronizing photographic lighting to image acquisition. In particular, the present invention is directed to a photographic synchronization optimization system and method.

BACKGROUND

Conventional cameras produce a synchronization signal known as an "X-sync" signal. An X-sync signal is initiated when a first shutter of the camera moves to a fully open position during an image acquisition. In one example, a mechanical sensor detects the shutter blade coming to a stop in motion. An X-sync signal can be used to fire a flash device to emit light during an image acquisition. As discussed further below, cameras typically have a maximum shutter speed (e.g., "faster" shutter speed that correlates to a shorter opening of the shutter) at which synchronization using X-sync can occur without "clipping" occurring in the image. This shutter speed defines the maximum X-sync for a given camera. Clipping is when flash lighting illuminates the imaging sensor (or alternatively film) unevenly due to light emission during a shutter blade traveling across the sensor. Clipping appears as a band of darker exposure in the image (e.g., at the top or bottom of the image).

FIGS. 1 and 2 illustrate timing plots related to one example of a conventional photographic flash synchronization system and method for an exemplary camera having a two blade focal plane shutter system. In this example of FIG. 1, the shutter speed is set at a relatively slower shutter speed setting (i.e., having a longer opening of the shutter) than the example discussed below with respect to FIG. 2. FIG. 1 includes a timing plot 105 showing mirror movement from an initial closed position to an open position (i.e., a position blocking the light path from the camera lens from the shutter mechanism to a position that allows light to pass to the shutter mechanism). FIG. 2 includes a timing plot 205 showing mirror movement from an initial closed position to an open position. Timing plot 110 of FIG. 1 and timing plot 210 of FIG. 2 each show movement of the edge of the first shutter blade to travel across an imaging sensor of the camera in the respective examples to a position in which the first shutter blade allows light to pass to the entire imaging sensor. Timing plot 115 of FIG. 1 and timing plot 215 of FIG. 2 each show movement of the edge of the second shutter blade to travel across the imaging sensor in the respective examples to a position that blocks all light from passing to the imaging sensor. In each of plots 105, 110, 115, 205, 210, 215, the lower horizontal line of the plot represents a fixed position prior to movement, the upper horizontal line of the plot represents a fixed position after movement, and the slanted line there between represents the time of movement.

In the example of FIG. 1, the time 127 between vertical dashed line 120 and vertical dashed line 125 is the time in which both shutter blades are in the fixed open positions allowing light to travel from the camera lens to the imaging sensor of the camera. In this example, during the time between lines 120 and 125 the first and second shutter blades do not obstruct the light to the sensor. In some examples, the first shutter blade of a camera will start movement at a time prior to beginning to allow light to pass to the imaging sensor (i.e., the starting position of the first shutter blade is at a distance from the edge of the imaging sensor) and the first shutter blade fully stops obstructing light from passing to the imaging sensor at a time prior to the first shutter blade stopping movement (e.g., at time 120). A camera may have a distance between the edge of the imaging sensor and the location where the shutter blade comes to a stop (e.g., to prevent damage to the shutter blade due to an instantaneous abrupt stop). Likewise, the second shutter blade of a camera may start movement at a position that is a distance from the edge of the imaging sensor such that it does not start to block light from passing to the imaging sensor until a time after the second shutter blade begins movement (e.g., at time 125) and the second shutter blade fully blocks light from the imaging sensor at a time prior to stopping movement. Dashed lines 130 and 230 mark the time at which the second shutter blade in each example, respectively, stops movement.

In the example of FIG. 2, the time 227 between vertical dashed line 220 and vertical dashed line 225 is the time in which both shutter blades are in the fixed open positions allowing light to travel from the camera lens to the imaging sensor of the camera. In this example, during the time between lines 220 and 225 the first and second shutter blades do not obstruct the light to the sensor.

The time between the first shutter blade of a camera stopping movement and the second shutter blade stopping movement (shown in the example of FIG. 1 as time period 135 and in the example of FIG. 2 as time period 235) may be referred to as the exposure time and is typically measured as the shutter speed of the camera. Plots 140 and 240 show a conventional synchronization signal (commonly referred to as a "synch" signal or an X-Sync signal) of the examples of FIGS. 1 and 2, respectively. Synch signals 140 and 240 are indicated by a voltage change at time 120 and 220, respectively, and a return to prior voltage at time 130 and 230, respectively. A conventional synch signal begins when the first shutter blade stops movement. In one example, a sensor in the camera detects the first shutter blade coming to a stop and causes an electrical signal that initiates an X-sync signal. In one such example, there may be some additional movement of the first shutter blade after the activation of the sensor (e.g., due to the actuation of a mechanical element of the sensor, due to bounce of the blade from the force of slapping open). Such movement after the normal temporal location for the activation of the X-sync signal of a camera is not included in the time determination for the stopping of the movement of the first shutter blade.

Plot 145 shows a plot of light emission over time from a photographic lighting device associated with the camera of the example of FIG. 1. Horizontal dashed line 150 marks the critical level above which the light emission of the lighting device is detectable by the imaging sensor of the camera over ambient light. The hatched area under the curve of the light emission profile represents light emission that contributes to the imaging by the camera sensor. Plot 245 shows a plot of light emission over time from a photographic lighting device associated with the camera of the example of FIG. 2. Horizontal dashed line 250 marks the critical level above which the light emission of the lighting device is detectable by the imaging sensor of the camera over ambient light. The hatched area under the curve of the light emission profile represents light emission that can contribute to the imaging by the camera sensor. Light emission is initiated in response to the synch signal. In the examples of FIGS. 1 and 2, a slight delay is shown between the sync signal and the initiation of light emission by the lighting device (e.g., possibly due to circuitry delay in the lighting device and/or time required to wirelessly transmit a light emission initiation signal to a lighting device that is remote from the camera).

The entire area above line 150 falls between line 120 and line 125 during the time period 127 in which the first and second shutter blades are not moving and the sensor is fully unobstructed by the two shutter blades. Thus, the light emission from the photographic lighting device in the example of FIG. 1 with the relatively longer shutter speed does not contribute to imaging during the time when the shutter blades are traveling across the imaging sensor. This is not true for the example of FIG. 2 with the faster shutter speed. A significant amount of the detectable light emission of the lighting device of plot 245 occurs after the second shutter blade begins movement and obstruction of the imaging sensor. This may cause uneven lighting of different portions of the imaging sensor and cause uneven darkening areas of the resultant image (e.g., referred to as "clipping"). Due to this limitation of the conventional synchronization method, photography with flash lighting is typically limited to shutter speeds that are slower (i.e., longer) than a particular shutter speed. For example, many cameras cannot adequately synchronize flash lighting at shutter speeds greater than $1/200^{th}$ of a second.

One way to allow for shorter shutter speeds includes utilizing rapidly pulsed light bursts of a lighting device to produce a pseudo-continuous light source with a duration that spans from before initial shutter blade movement to well after final shutter blade movement. Such a system utilizes a great deal of extraneous energy before and after the actual image acquisition time period. This may result in excess depletion of lighting power sources. This type of synchronization is often referred to as "FP-sync." It is also known in certain cameras manufactured by Canon as HSS, HS-sync, and/or "high-speed" sync. Herein, this type of synchronization is referred to as "FP-sync" and/or "FP-type sync." FIG. 3 illustrates timing plots associated with one such example of an FP-type sync process. Plot 310 shows the movement of the first shutter blade of a camera similar to plots 110 and 210 discussed above. Plot 315 shows the movement of the second shutter blade of a camera similar to plots 115 and 215 discussed above. Dashed line 320 marks the time of the first shutter blade stopping movement. Dashed line 325 marks the time of the second shutter blade starting movement. The time 327 between lines 320 and 325 marks the time period in which the first and second shutter blades are not moving and are in the fully open position allowing light to pass to the imaging sensor of the camera. Dashed line 330 marks the time of the second shutter blade stopping movement after the edge of the second shutter blade has traveled across the imaging sensor. The time 335 between lines 320 and 330 represents the shutter speed. Plot 340 shows a conventional sync signal as a voltage change starting at time 320 to time 330. Plot 345 shows a photographic light emission profile intensity curve. Dotted line 350 indicates the start of movement of the first shutter blade. Light emission begins at a time prior to the first shutter blade beginning movement. The light emission reaches a peak and the lighting device is rapidly pulsed such that a pseudo-continuous light emission level begins prior to the first shutter blade beginning movement. This light emission is held at this level until a time after line 330 (i.e., after the second shutter blade fully obstructs light from passing to the imaging sensor). This ensures a near constant light emission above ambient light during all times that the imaging sensor is either partially or fully unobstructed by the shutter blades. However, plot 345 shows significant light emission over an extended period of time. Such light emission may utilize a great amount of energy and possibly deplete lighting device power supplies.

SUMMARY OF THE DISCLOSURE

In one implementation, a method for synchronizing a photographic lighting device to image acquisition by a camera is provided. The method includes identifying a balance point of a light emission profile for a photographic lighting device associated with a camera; determining a desired location for the balance point within an image acquisition window of the camera; and determining a starting time of light emission initiation for a photographic lighting device, the determining a starting time of light emission initiation using the balance point to position the balance point at the desired location in an image acquisition.

In another implementation, a method for synchronizing a photographic lighting device to image acquisition by a camera is provided. The method includes identifying a light energy balance point of a light emission profile for a photographic lighting device associated with a camera; determining shutter information of the camera; determining a desired location for the light energy balance point within an image acquisition window of the camera; wirelessly communicating a timing value based on the shutter information to one or more remote photographic lighting devices; and determining a starting time of light emission initiation for each of the remote photographic lighting device, the determining a starting time of light emission initiation using the light energy balance point and shutter information to position the light energy balance point at the desired location in an image acquisition.

In yet another implementation, a system for wirelessly synchronizing a photographic lighting device to an image acquisition by a camera is provided. The system includes one or more processing elements; and one or more memory elements, the one or more memory elements configured with information for instructing the one or more processing elements to: identify a balance point of a light emission profile for a photographic lighting device associated with a camera; determine a desired location for the balance point within an image acquisition window of the camera; and determine a starting time of light emission initiation for a photographic lighting device using the balance point to position the balance point at the desired location in an image acquisition.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

A system and method for synchronizing a photographic lighting device to image acquisition by a camera is provided. In one embodiment, light emission by one or more lighting devices is initiated after a first shutter blade movement of a camera begins to allow light to pass from the camera lens to an imaging sensor of the camera and before X-sync associated with the completion of the first shutter blade movement.

As discussed above, there may be some additional movement of the first shutter blade after the normal temporal location for initiation of X-sync. When discussing completion of the first shutter blade movement with respect to the timing of photographic light emission in embodiments of the current disclosure, the stopping of movement being referred to is that of the point of the normal initiation of X-sync for the camera. If there is subsequent movement of the shutter blade, it is not considered in determining the time at which the first shutter blade stops movement for the determination of the time for initiating photographic light emission prior to the completion of the first shutter blade movement.

Figure 4:
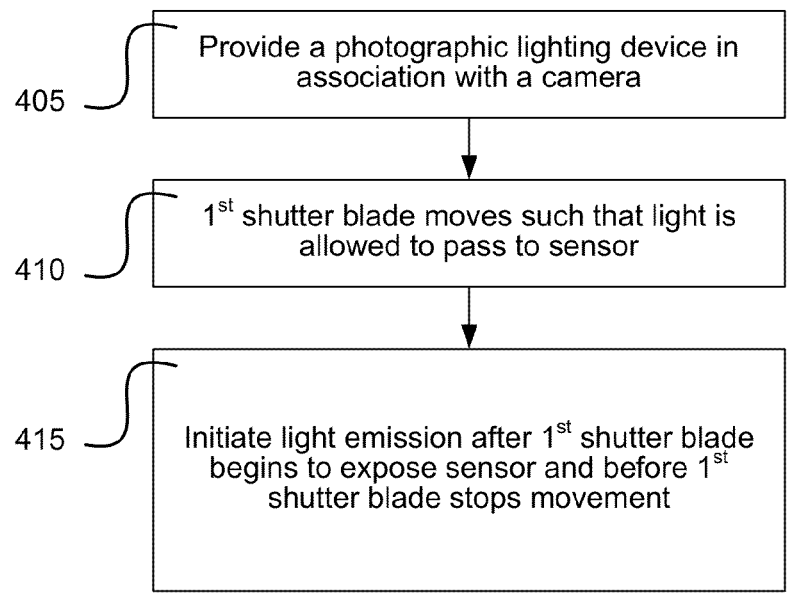
FIG. 4 illustrates one exemplary implementation of a method of synchronizing a photographic lighting device.

FIG. 4 illustrates one implementation of a method of synchronizing a photographic lighting device. At step 405, one or more photographic lighting devices are provided in association with a camera. Any one or more photographic lighting devices may be utilized. Example photographic lighting devices include, but are not limited to, a flash device internal to a camera body (e.g., a pop-up flash of a digital SLR camera), a strobe, a studio flash pack, a speedlight (e.g., a hot shoe mountable flash light), and any combinations thereof. In one example, one or more lighting devices associated with a camera include one or more internal flash devices. In another example, one or more lighting devices associated with a camera include one or more studio-type flash packs (e.g., connected via wire to a camera and/or connected wirelessly to a camera). In yet another example, one or more lighting devices associated with a camera include one or more hot shoe mountable flash devices (e.g., connected directly and/or indirectly to the hot shoe of the camera and/or connected wirelessly to the camera).

At step 410, a first shutter blade of a camera begins to allow light to pass to an imaging sensor of the camera. An imaging sensor has an imaging portion that becomes exposed to light when the shutter of the camera is fully open. The sensor itself may have additional surface area, portions, and/or components that are not exposed to light for image acquisition when the shutter of the camera is fully open. When the term "sensor" is utilized herein with respect to allowing light to pass through the shutter to the sensor device, it refers to the imaging portion of the sensor.

At step 415, light emission of at least one of the one or more lighting devices is initiated after the first shutter blade movement begins to allow light to pass to the imaging sensor and before the first shutter blade movement stops.

In one example, a first shutter blade movement is the movement of a first shutter blade of a focal plane shutter having two shutter blades that move collaboratively to allow light to pass to an imaging sensor. In one such example, a first shutter blade moves to start allowing light to pass (e.g., at the beginning of image acquisition) and a second shutter blade moves to begin to obstruct light from passing to the sensor (e.g., to end image acquisition). In another example, a first shutter blade movement is the first movement of a leaf shutter mechanism having two or more shutter blades that move together from a position that blocks light from passing to an imaging sensor to a position that allows light to pass. As the one or more shutter blades begin the first movement an opening is created in the center area of the shutter mechanism and the one or more shutter blades move outwardly to a fully open position. For purposes of the discussion of shutter blades herein, the one or more shutter blades of such a shutter mechanism moving together in this first movement will be referred to herein as the first shutter blade. The two or more shutter blades then begin a second movement together to close such that light is obstructed from passing to the imaging sensor. For purposes of the discussion of shutter blades herein, the one or more shutter blades of such a shutter mechanism moving together in this second movement will be referred to herein as the second shutter blade.

Initiation of light emission as used herein refers to initiation of light emission for exposing the image acquisition. Such light emission does not include incidental light emission, such as optical light utilized by certain photographic equipment for focus assist, optical wireless communication, and other non-exposure uses of light. Initiation of light emission may occur in a variety of ways. Ways to initiate light emission include, but are not limited to, generation of a light emission initiation signal, initiating light emission of a lighting device directly or indirectly connected to the camera via a wired electrical connection (e.g., connected directly to a camera hot shoe, connected via a wire to a camera hot shoe, connected via a wire to a synchronization connector of the camera), initiating light emission of a lighting device built into the camera, wirelessly initiating light emission of a remote lighting device, and any combinations thereof. In one example, the process of initiating the emission of light from a lighting device includes a determination that light emission should be initiated at a given time as set forth in various embodiments and implementations herein, generation of a light emission initiation signal, communication of the initiation signal to the lighting device, and the actual initiation of light emission by the lighting device.

A delay may exist between the generation of a light emission initiation signal and the initiation of light emission by a lighting device. Examples of such delay include, but are not limited to, delay due to electronic circuitry between a generator of a light emission initiation signal and a light generating element of lighting device, delay due to wireless transmission of a light emission initiation signal, and any combinations thereof. Additionally, upon light emission initiation there may be additional delay before light is emitted from the device. Such a delay may be due to charging time of a light generating element of the lighting device.

Figure 5:
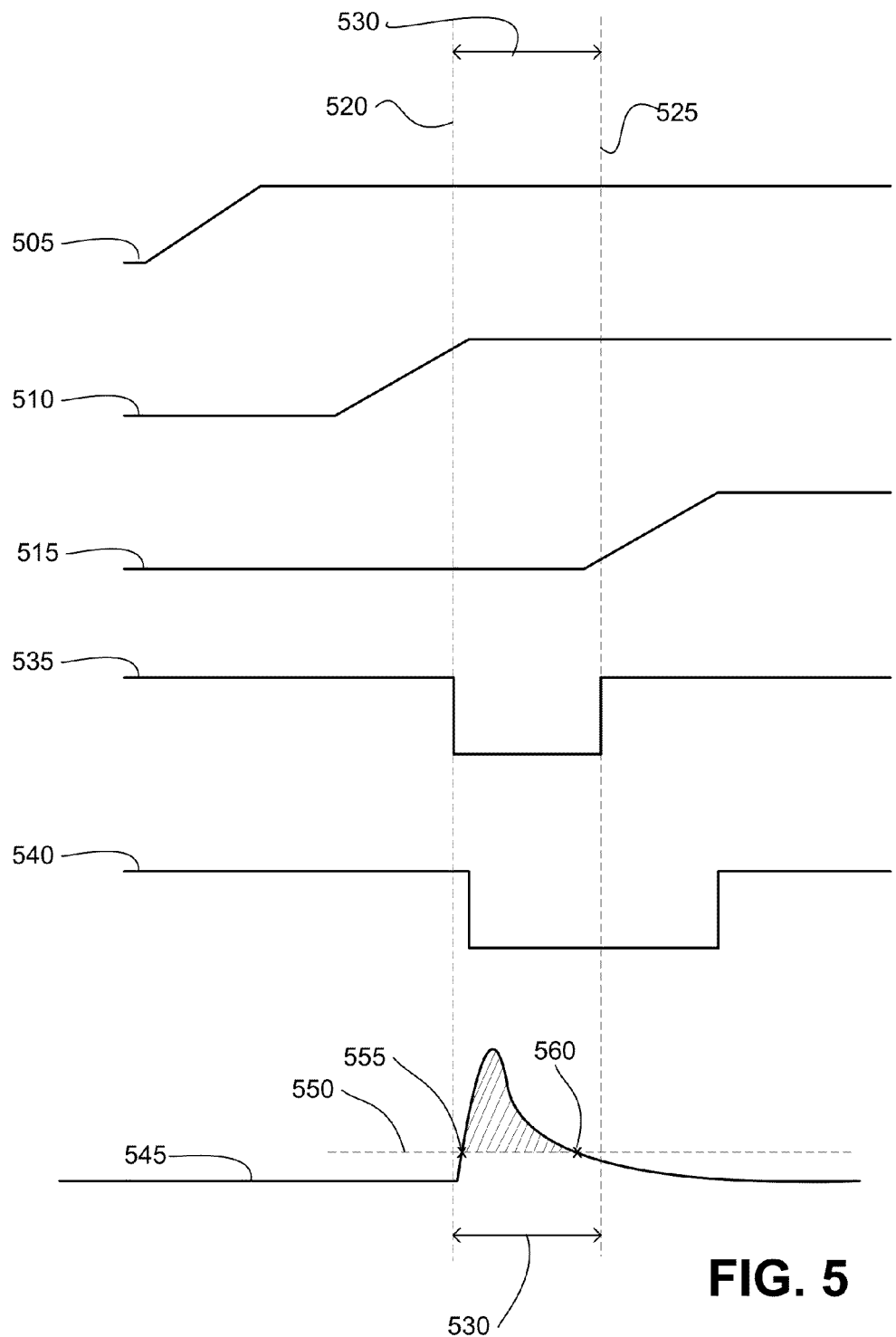
FIG. 5 illustrates one example of timing plots associated with an exemplary synchronization where light emission is initiated after a first shutter blade begins to allow light to pass to an imaging sensor and before the first shutter blade stops movement.

FIG. 5 illustrates one example of timing plots associated with an exemplary synchronization where light emission is initiated after a first shutter blade begins to allow light to pass to an imaging sensor and before the first shutter blade stops movement. Plot 505 shows the movement of a mirror of a camera from an initial closed position (represented by the initial horizontal line) to a position (represented by the second horizontal portion of the plot) that allows light to pass to a shutter mechanism of the camera. Plot 510 shows the movement of an edge of a first shutter blade from an initial position (represented by the initial horizontal portion of the plot) that blocks light from an imaging sensor of the camera to a second stopped position (represented by the second horizontal portion of the plot) that allows light to pass the first shutter blade to the imaging sensor. A diagonal portion connecting the two horizontal portions represent the movement of the first shutter blade from a position fully obstructing light through a time where the imaging sensor is partially blocked by the first shutter blade to a time where the first shutter blade is no longer obstructing light to the imaging sensor. Initiation of the movement of a first shutter blade may occur in a variety of ways. In one example, a first shutter blade occurs as a result of a magnet that holds the shutter blade in place being released. In such an example, a magnet may be released by a magnet release signal. Plot 515 shows the movement of an edge of a second shutter blade from an initial position (represented by the initial horizontal portion of the plot) to a second stopped position (represented by the second horizontal portion of the plot) at which the second shutter blade fully blocks light from the lens to the imaging sensor. A diagonal portion of the plot connecting the two horizontal portions represents the movement of the second shutter blade from a position that does not obstruct light to the sensor through a time where the partially obstructs light to the sensor to a time of fully blocking light to the sensor. Dashed line 520 marks the time at which the edge of the first shutter blade clears the imaging sensor such that it no longer blocks light to the imaging sensor. This time occurs prior to the first shutter blade stopping movement. Dashed line 525 marks the time at which the leading edge of the second shutter blade starts to obstruct light from passing to the imaging sensor. This time occurs at a point after the second shutter blade has begun movement. The time 530 between time 520 and 525 is the time that the imaging sensor is fully unobstructed by the shutter blades. Plot 535 shows an optional voltage change plot associated with time period 530. Plot 540 shows a voltage change plot of a conventional X-Sync signal of the camera that begins with a voltage change at the time of the first shutter blade stopping movement and ends with a voltage change at the time of the second shutter blade stopping movement.

Plot 545 shows a light emission intensity profile of a lighting device. Dashed line 550 marks the intensity level above which the light emission of the lighting device is detectable by the imaging sensor over ambient lighting. Initial critical point 555 is the point on the light emission profile at which the light emission is first detectable by the imaging sensor above the ambient light. Terminal critical point 560 is the point on the light emission profile at which the light emission is last detectable by the imaging sensor above the ambient light. The hashed area under the light emission curve represents the light emission that is detectable by the imaging sensor. Light emission is initiated after the first shutter blade begins to allow light to pass to the imaging sensor and before the first shutter blade stops movement.

Several possible benefits may arise from initiation of light emission after a first shutter blade begins to allow light to pass to the sensor but before the first shutter blade stops movement. In one exemplary aspect, selection of the time of light emission initiation may allow the light emission intensity during the time that the imaging sensor is exposed to light from the camera lens to be balanced across the time from the first shutter blade beginning to expose the imaging sensor to the second shutter blade fully blocking the imaging sensor. In another exemplary aspect, light emission may be initiated such that darkened portions of a resulting image are minimized. In another exemplary aspect, light emission during shutter blade travel across the imaging sensor may be minimized (e.g., eliminated). In yet another exemplary aspect, no light emission energy may be wasted prior to the imaging sensor being exposed to the light.

In the example of FIG. 5, the early initiation of light emission is such that initial critical point 555 occurs soon enough after time 520 that terminal critical point 560 occurs prior to time 525. The entire portion of the light emission that is detectable over ambient light occurs during time period 530. No detectable light over ambient light occurs while either the first shutter blade or the second shutter blade is partially obstructing light to the imaging sensor.

Initiation of light emission synchronized to image acquisition such that the light emission is initiated after a first shutter blade begins to allow light to pass to the imaging sensor and before the first shutter blade stops movement may be useful in any of a variety of image acquisition environments. Examples of such environments include, but are not limited to, a camera having a built-in flash, a camera having a built-in wireless functionality with one or more remote lighting devices, a camera having an external wireless functionality with one or more remote lighting devices, and any combinations thereof. Many direct and indirect wiring implementations are known for connecting via wired electrical connection a camera and a lighting device. Examples of wireless functionalities for wirelessly connecting a camera to a remote lighting device include, but are not limited to, an optical wireless functionality (e.g., infrared), a radio frequency wireless functionality, and any combinations thereof.

Various wireless implementations of synchronizing the initiation of light emission are described below. In one exemplary aspect, wireless synchronization of a remote lighting device with a camera includes the use of a wireless communication device having a transmitter (and possibly a receiver) associated with the camera side and a wireless communication device having a receiver (and possibly a transmitter) associated with the lighting device side. Example associations of a wireless communication device include, but are not limited to, a wireless communication functionality at least partially internal to a camera; a wireless communication functionality externally connected to the internal circuitry of a camera (e.g., via a hot shoe connector), a wireless communication functionality at least partially internal to a lighting device; a wireless communication functionality externally connected to the internal circuitry of a lighting device (e.g., via a hot shoe connector), and any combinations thereof. Examples of such associations are described in detail below (e.g., with respect to FIGS. 33 to 36. A wireless communication functionality may include circuitry and/or machine executable instructions of an early synchronizer system, such as early synchronizer system 3700 of FIG. 37 for initiating emission of light by a photographic lighting device at a time with respect to image acquisition as described by any of the aspects of embodiments and implementations herein.

A light emission initiation signal may be wirelessly transmitted as a transmission signal from a camera side transmitter to a lighting device receiver. Exemplary implementations of wireless transmission signals are described below (e.g., with respect to FIGS. 16 to 18). A light emission initiation signal may include instructions for initiating light emission at the desired time as described herein. Calibration of the timing of the initiation may impact the information in the instructions. A timing delay factor can be utilized in the instructions for setting the time of light emission initiation. A timing delay factor may be based on the time between a predictor event and/or signal and the desired time of light emission initiation. Example relations that may impact a timing delay factor include, but are not limited to, a relationship to a time of a first shutter blade clearing the imaging sensor such that it no longer obstructs light to the sensor, a relationship to a time of a first shutter blade stopping movement, a relationship to a time of an initial critical point of a flash profile of a lighting device, a relationship to a time of a terminal critical point of a flash profile of a lighting device, a time of a predictor event and/or signal, a time of the starting of movement of a second shutter blade, and any combinations thereof. Values for any of these times may be stored in memory of an early synchronizer system for one or more cameras and imaging conditions (e.g., shutter speed) and used to generate the timing delay factor. In one example, a delay factor is an absolute time value (e.g., in relation to a prior event and/or signal, such as a predictor event and/or signal). In such an example, an early synchronizer system at the camera side or the lighting device side may generate the absolute time value for initiating light emission based on information from the camera and communicate a light emission initiation signal to the lighting device. In another example, a delay factor is an offset value from one or more other events (e.g., the reception of the light emission initiation signal transmission). In one such example, an early synchronizer system at the lighting device side includes a delay factor having an offset value. When the transmission signal is received, the early synchronizer system calculates a time for initiation of light emission from the time of reception using the offset value. In another such example, the transmission signal includes information having the delay factor with an offset value. When the transmission signal is received, the early synchronizer system calculates a time for initiation of light emission from the time of reception using the offset value.

In one implementation, a timing delay factor may be modified by the application of an adjustment delay. An adjustment delay may allow a user to modify timing of light emission initiation. An early synchronization system may include an interface for inputting an adjustment value that can be applied to one or more timing delay factors utilized in synchronizing one or more lighting devices. Example interfaces and input devices are described below with respect to exemplary systems of FIGS. 33 to 38.

Multiple light emission initiation signal transmissions may be transmitted at the same time. In one example, remote lighting devices may be grouped into two or more zones (e.g., with different settings, different desired emission initiation times, and/or having different capabilities for processing delays). In one such example, one or more lighting devices may be grouped together because they are not capable of implementing a timing delay factor (e.g., the lighting device and/or associate wireless communication device do not have an associated early synchronization device as described herein). Another grouping may be capable of delay. A camera side wireless communication device having an early synchronization functionality associated therewith may generate two transmission signals, one having a timing delay factor and transmitted on a first frequency prior to X-synch and another configured to provide a direct initiation of a light emission procedure without a delay factor being transmitted on a second frequency for reception at the desired time of light emission initiation.

Figure 6:
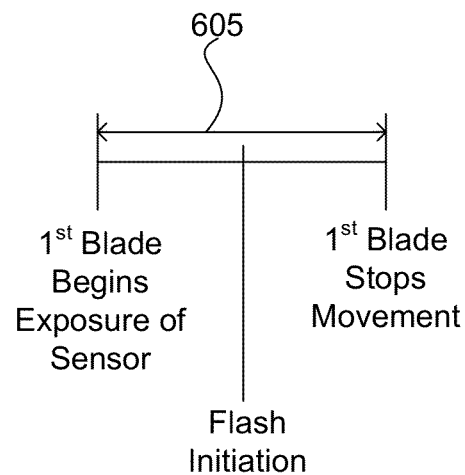
FIG. 6 illustrates one example of a timeline showing initiation of a flash emission during a time after a first shutter blade of a camera begins to allow light to pass to an imaging sensor and before the time that the first shutter blade stops movement.

FIG. 6 illustrates one example of a timeline showing initiation of a flash emission during a time 605 after a first shutter blade of a camera begins to allow light to pass to an imaging sensor and before the time that the first shutter blade stops movement. FIG. 6 is not intended to convey a specific relationship in time duration. As discussed above a light emission initiation signal may be generated to bring about the initiation of a flash emission during time 605. The time between the generation of the light emission initiation signal and light emission initiation may be impacted by any of a variety of factors. Examples of such factors include, but are not limited to, a time required to transmit a light emission initiation signal via electronic wiring and circuitry to a light emission element of a lighting device, a time required to wirelessly transmit a light emission initiation signal to a wireless device associated with a remote lighting device, charging time of a light emission element of a lighting device, and any combinations thereof. Consideration of one or more such factors may be taken in the determination of timing for generation of a light emission initiation signal and/or the timing of wireless transmission of such a signal. In one example, a light emission initiation signal may be wirelessly transmitted in advance of a desired light emission initiation time. In one such example, a wirelessly transmitted initiation signal may include a time coding (e.g., data including a time delay) that the receiving remote device (e.g., the receiving wireless device) may interpret to determine the desired time of light emission initiation.

Figure 7:
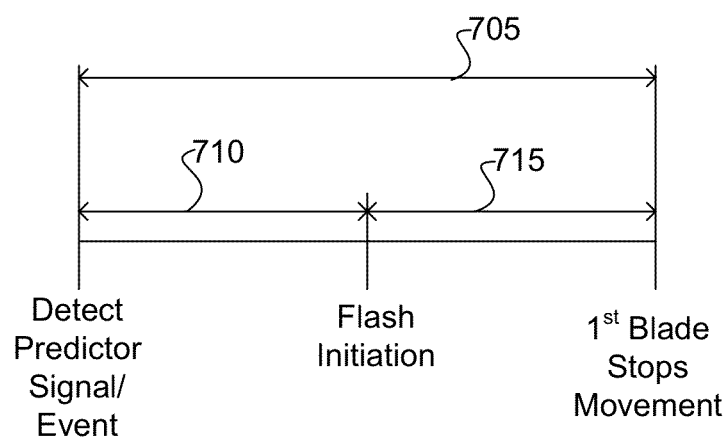
FIG. 7 illustrates one example of a timeline showing detection of a predictor signal and/or predictor event for initiation of a flash emission after a first shutter blade of a camera begins to allow light to pass to an imaging sensor and before the time that the first shutter blade stops movement.

In one embodiment, a signal and/or an event of a camera may be utilized to predict the time for light emission initiation. In one such example, a camera that is not configured for early synchronization may be modified (e.g., via an internal modification and/or an externally added component, such as an external wireless device) to synchronize image acquisition with light emission initiation that occurs after a first shutter blade of the camera starts to allow light to pass to an imaging sensor of the camera and before the first shutter blade stops movement. FIG. 7 illustrates one example of a timeline showing detection of a predictor signal and/or predictor event for initiation of a flash emission after a first shutter blade of a camera begins to allow light to pass to an imaging sensor and before the time that the first shutter blade stops movement. FIG. 7 shows a time of detecting a predictor signal and/or event of a camera. It should be noted that detecting is contemplated to include receiving a predictor signal and/or event. Flash initiation occurs after first shutter blade begins to allow light to pass to the sensor and before the time that the first shutter blade stops movement. In one example, a time 705 between a predictor signal and/or event and a first shutter blade stopping movement may be an approximately fixed time from which a time of flash initiation can be determined to maximize desired image quality. The fixed nature of time 705 may depend on any one or more of a variety of factors. Such factors include, but are not limited to, a camera model, the nature of the detected signal and/or event, a camera setting, and any combinations thereof.

Figure 1:
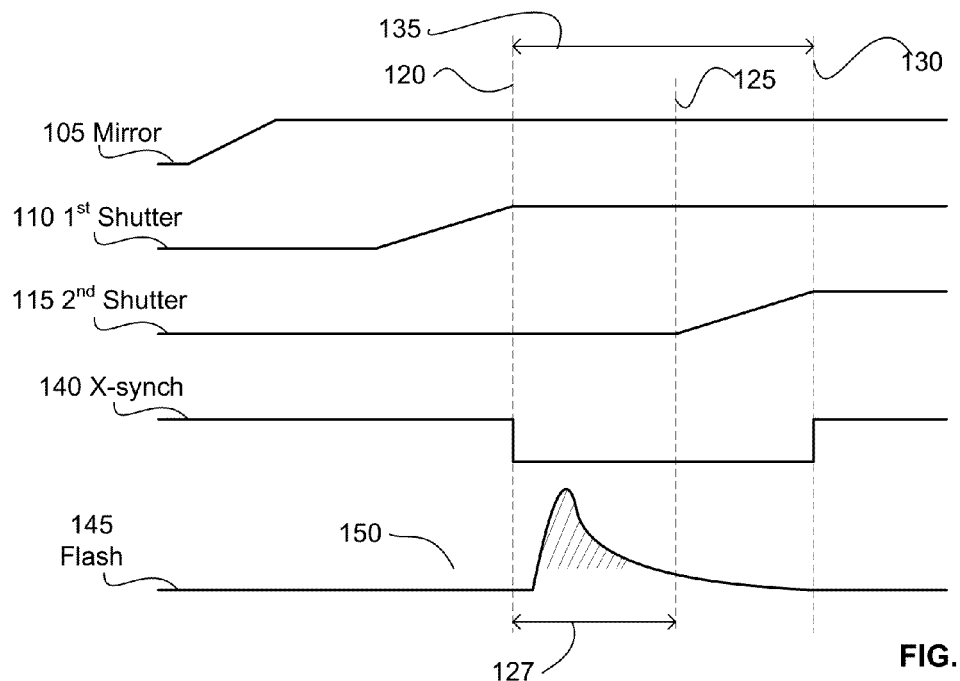
FIG. 1 illustrates a timing plot related to one example of a conventional photographic flash synchronization system and method.
Figure 2:
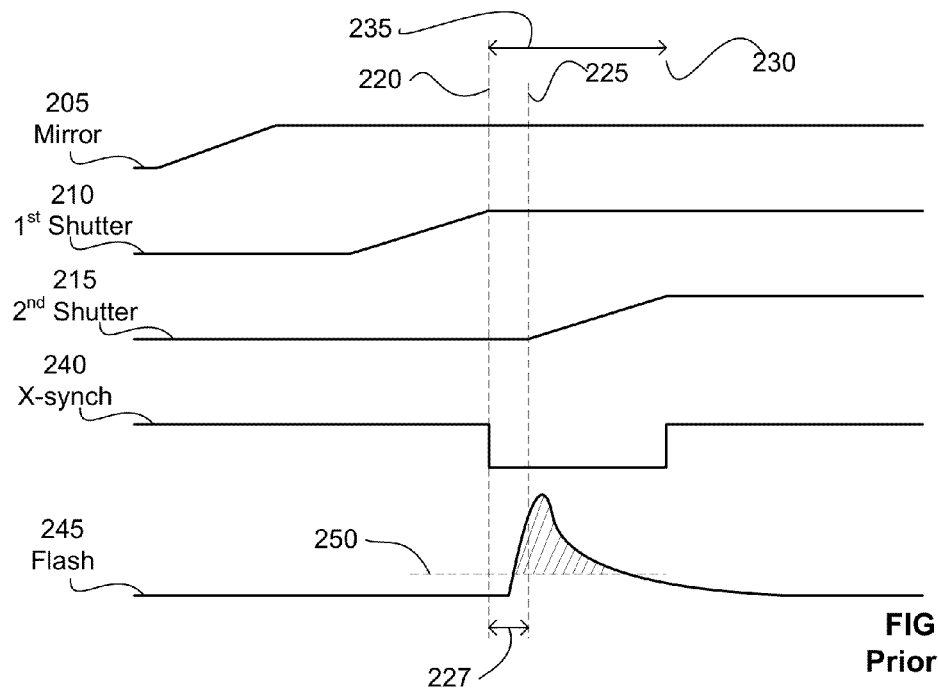
FIG. 2 illustrates a timing plot related to another example of a conventional photographic flash synchronization system and method.
Figure 3:
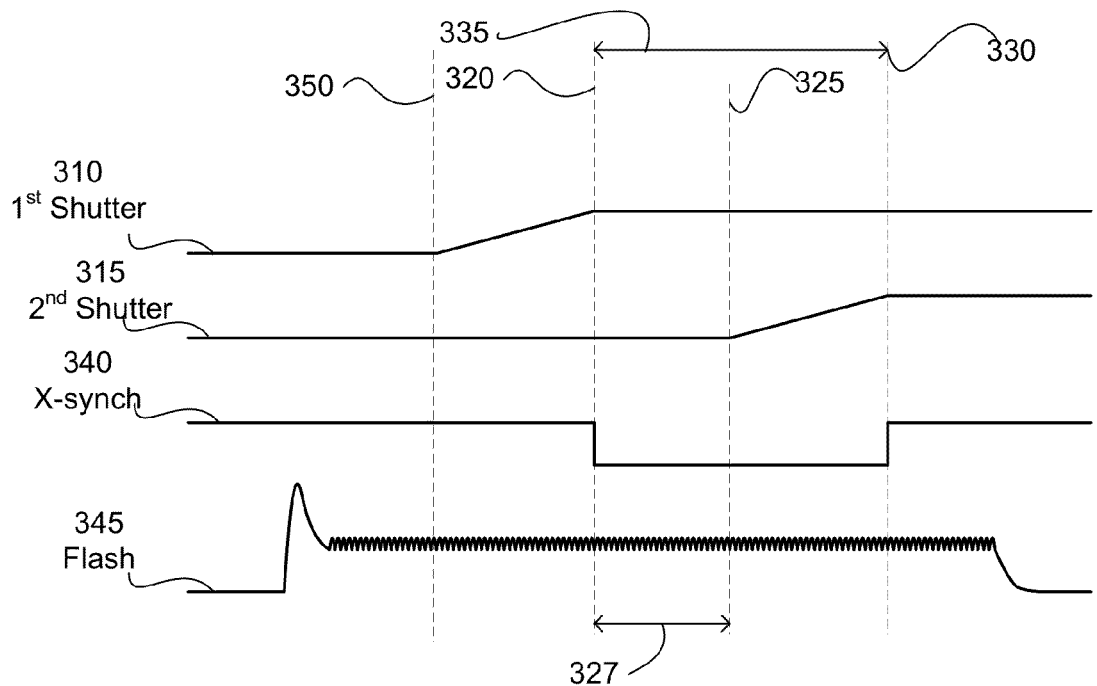
FIG. 3 illustrates a timing plot associated with one example of an FP-type synchronization process.

Example signals and events that may be utilized to predict timing for light emission initiation include, but are not limited to, a flash power level set command, a flash mode set command, a change in voltage on a clock signal of a camera, a magnet release associated with the start of a first shutter blade movement, a magnet release signal associated with the start of a first shutter blade movement, one or more data signals generated by a camera, an FP-sync signal of a camera, and any combinations thereof. In one example, a magnet release signal is utilized as a predictor signal. A magnet release signal may occur via one or more circuit elements of a camera at or about the time that the mirror has moved to an open position. A time period may occur between a magnet release signal (and/or actual magnet release) and the time of a first shutter blade starting to move. This may be due to magnetic decharging effects. An FP-sync mode of a camera is one that generates a flash emission similar to that discussed above with respect to FIG. 3 in which light emission is initiated prior to a first shutter blade beginning movement such that a pseudo-constant light emission occurs from before the first shutter blade allowing light to pass to the sensor to after the second shutter blade fully blocks the sensor. A camera capable of an FP-sync mode may generate an FP-sync signal to initiate light emission prior to first shutter blade movement. In one example, the time between an FP-sync signal and a first shutter blade stopping movement is determined and reliably used to determine the time for desired light emission after a first shutter blade has begun to allow light to pass to the sensor. In yet another example, a change in voltage of a clock signal occurring prior to X-sync is utilized as a predictor signal. In one such example, the time from the initiation of the voltage drop on the clock signal to the time of desired light emission initiation can be reliably utilized in synchronizing light emission. In still another example, a data signal of a camera is utilized as a predictor signal. In one such example, a data signal is a power set command on a data line of the camera occurring prior to X-sync is utilize reliably to initiate flash emission at the desired time.

Calibration of light emission initiation time may occur. In one example, calibration of light emission initiation timing may occur prior to an image acquisition session (e.g., via data determined during manufacturing of a synchronizing device utilized to add early synchronization capability to a camera, via data determined during modification of a camera). In another example, calibration of light emission initiation timing may occur at or near the time of an image acquisition session.

In one implementation of calibration, proper timing of a light emission initiation timing may be determined with a qualitative review of image quality produced with light emission initiated at one or more times during period 705.

In another exemplary implementation, a camera can be tested to determine time period 705 for that camera and a given predictor signal and/or event. In one example, an image acquisition procedure is conducted (e.g., camera trigger is depressed and an image is acquired). A predictor signal and/or predictor event is detected (e.g., a magnet release signal is detected). The timing of a first shutter blade stopping movement is detected (e.g., detecting X-sync signal). The time between the time of the predictor signal and/or predictor event and the time of the first shutter blade stopping movement is determined. That time (e.g., time 705) may be stored for later use (e.g., in a memory element of the camera, in a memory element of a flash synchronizer device, such as a wireless device added to a hot shoe connector of a camera or internally to a camera). Time 705 may be determined for multiple cameras and stored in memory. Data representing a time 705 may be associated with data representing a corresponding camera model. Some cameras produce a data signal that identifies the camera model (e.g., via a hot shoe connector of the camera). That data signal can be detected and used to correlate data representing time 705 to data representing a camera model.

In another example, an image acquisition procedure is conducted with a camera at a shutter speed for which the camera generates an X-sync signal at the time that a first shutter blade of the camera stops movement. Data related to the time of the X-sync signal is detected and recorded (e.g., in a memory). Another image acquisition procedure is conducted with the camera at a shutter speed for which the camera generates an FP-sync signal (e.g., the camera does not generate an X-sync signal). The timing of the FP-sync signal is determined and recorded (e.g., in a memory). The time between the FP-sync signal and the X-sync signal is determined and recorded (e.g., in a memory) as time 705 for that camera.

The determination of time 705 may be made at any time. In one example, time 705 is determined at the time of manufacture of a synchronizing device (e.g., an external device, a device for internal connection in a camera). In another example, time 705 is determined at a time of modification of a camera to perform early synchronization according to any one or more of the implementations or embodiments disclosed herein. In another example, time 705 is determined by a camera user at or about the time of calibration of the early synchronization functionality for use at a particular shutter speed to produce a desired image quality upon light emission and image acquisition.

Referring again to FIG. 7, time period 710 represents the time from the predictor event and/or signal to the desired light emission initiation. Time period 715 represents the time between desired light emission initiation and the time of a first shutter blade stopping movement. Time period 710 and 715 are shown for exemplary purposes only and the actual scale of FIG. 7 is not meant to imply a relative quantitative time duration between time period 710 and 715. Time period 710 and time period 715 may divide time period 705 into any two time durations (e.g., as will have light emission initiation occur to produce desired effects in an acquired image). Time periods 705, 710, and/or 715 may be utilized to calibrate a light emission initiation for desired image quality.

In another exemplary implementation, a camera user may determine a desired value for time period 715 such that light emission initiation occurs at a desired time (e.g., to produce a desired effect on an acquired image). The time period 715 may then be used in conjunction with stored information about time period 705 (and possibly known time delays between light emission signal generation and actual light emission initiation) to initiate light emission at the desired time. In one example, an early synchronizing functionality may detect data from the camera about the camera's model and use that information to correlate to stored values for time period 705. In another example, a user may input camera model data to the early synchronizing functionality via a user input. In one such implementation, a user initiates an image acquisition procedure to acquire an image with the shutter speed of the camera at a particular setting and light emission initiation at a starting value of time period 715. In one example, the fastest desired shutter speed can be used as an initial calibration (e.g., $\frac{1}{500}^{th}$ of a second). In another example, a slower than maximum desired shutter speed can be used as an initial calibration. The user empirically evaluates the desired effect of the time period 715 calibration on image quality. The user may then decrease time period 715 (e.g., via a user input on the synchronization device, a user input on the camera, and/or a user calibration utility that may be used to program a synchronization functionality), for example if the resultant image has darkened areas due to excessive light emission during blade travel across the sensor. The user may also increase time period 715 (e.g., via user input), for example if the resultant image has no darkened areas due to excessive light emission during blade travel across the sensor. The process of reviewing pictures and adjusting time period 715 can be repeated until the desired calibration is acquired. The desired time period 715 calibration can be stored in memory. The data for time period 715 may be associated with data representing the corresponding shutter speed and/or data representing the corresponding lighting device utilized.

In another example, the time period adjusted during calibration could be time period 705. In yet another example, calibration values for any one or more of time periods 705, 710, 715 may be in units that are not time based units (e.g., absolute numerical units, such as from a minimum to maximum offset from the time of the first shutter blade stopping movement).

As discussed above, the timing of light emission initiation can be maximized such that darkened areas of a resultant image are minimized at a given shutter speed (e.g., shutter speeds for which synchronization at conventional sync signals is not possible). Darkened regions are visibly darker regions than other areas of the image. In one such example, calibration can be utilized to have the timing of light emission initiation such that no darkened regions of the image result. In another example, calibration can be utilized to have the timing of light emission initiation such that only minor regions of the edge of an image have darkening. Image acquisition in such an example can occur such that these minor regions do not interfere with the subject of the image (e.g., the sides can be cropped). In yet another example, calibration can occur such that light emission initiation occurs such that the integral of light emission is balanced across the time period between first blade beginning to expose the sensor and the second blade fully blocking the sensor. In such an example, a non-continuous light intensity light source may be utilized to achieve visibly even lighting across the sensor. In still another example, technical clipping of light emission (i.e., an initial critical point occurs prior to a first shutter blade no longer blocking the sensor, a terminal critical point occurring after the second shutter blade begins to obscure the sensor from light) may occur with visibly little impact on the resultant image quality (e.g., no significantly visibly detectable image darkened regions on the resultant image).

Table 1 includes example data for exemplary calibrations conducted on various Canon cameras (listed in first column) using different light devices (e.g., Speedlight, Dynalite strobe, Profoto Acute2 2400, and Elincrhom Style 300RX). To determine when the desired time according to the table to initiate light emission for each camera with each flash at the stated shutter speed, an additional calibration value is utilized: the time from the occurrence of the predictor signal/event to X-sync. The values in Table 1 are subtracted from that value to determine the time from the predictor signal and/or event to the time of light emission initiation. This determined time can be used with other values (e.g., knowledge of time requirements for wireless transmission of a initiation signal, time from the predictor signal and/or event to the start of transmission of the initiation signal transmission, knowledge of the length of the pulse of the wireless transmission) to calculate a time delay value to include with a transmission signal communicated to the lighting device prior to the desired time or light emission initiation. For example, a desirable image quality was determined using a Canon 1D mk II with a Speedlight at $\frac{1}{500}^{th}$ of a second shutter speed by using a value for time period 1115 of 320 microseconds (us). In another example, it is noted that the blade travel time for the Canon 5D Mark II is relatively slow. This allows a calibration value of 1400 microseconds to still have the initiation of light emission occur after the first shutter blade begins to expose the sensor to light.

TABLE 1

Example Calibration Adjustments for Example Cameras and Flashes at Certain Shutter Speeds

| | Flash Model | | | |
|---|---|---|---|---|
| Canon Camera | Speedlight | Dynalite 1000wi | Profoto Acute2 2400 | Elinchrom Style 300RX |
| 1D mk II | −320 us @ 500 th | −400 us @ 500 th | −600 us @ 500 th | −270 us @ 500 th |
| 1D mk III | −190 us @ 500 th | −400 us @ 500 th | −500 us @ 500 th | −160 us @ 500 th |
| 1Ds mk II | | | | |
| 1Ds mk III | | | | |
| 20D | | | | |
| 30D | −270 us @ 400 th | −350 us @ 400 th | −550 us @ 400 th | −270 us @ 400 th |
| 40D | −170 us @ 400 th | −450 us @ 400 th | −750 us @ 400 th | −330 us @ 400 th |
| 50D | −170 us @ 400 th | −450 us @ 400 th | −750 us @ 400 th | −330 us @ 400 th |
| Rebel Xsi | −400 us @ 320 th | −620 us @ 320 th | −700 us @ 320 th | −400 us @ 400 th |
| 5D | | | | |
| 5D mk II | −300 us @ 250 th | −1000 us @ 250 th | −1400 us @ 320 th | −650 us @ 320 th |

In another exemplary implementation, dynamic adjustment of calibration values (e.g., time period 715 values) can be implemented based on a stored value at a given shutter speed. For example, if a value for time period 715 is 300 microseconds at $\frac{1}{500}^{th}$ of a second shutter speed for a given camera and light combination, the values for time period 715 at other shutter speeds can be dynamically assigned (e.g., via a processing element and/or other circuitry of a camera and/or a synchronizing device). In one example, the total calibration value (e.g., the time value of time period 715) can be divided by the number of partial f-stops between the shutter speed for the known calibration value and the shutter speed known to work at X-sync (typically the time that the first shutter blade stops movement). For the above example of 300 microseconds at $\frac{1}{500}^{th}$ of a second. It may be known that a shutter speed of $\frac{1}{250}^{th}$ of a second is the fastest X-sync shutter speed supported by a camera. There may be three partial f-stops between $\frac{1}{500}^{th}$ and $\frac{1}{250}^{th}$ of a second (e.g., $\frac{1}{500}^{th}$, $\frac{1}{400}^{th}$, $\frac{1}{320}^{th}$, $\frac{1}{250}^{th}$). A dynamic assignment of a calibration value of 200 microseconds can be assigned to shutter speeds of $\frac{1}{400}^{th}$, 100 microseconds can be assigned to shutter speeds of $\frac{1}{320}^{th}$ of a second, and zero microseconds can be assigned to $\frac{1}{250}^{th}$ of a second.

Figure 8:
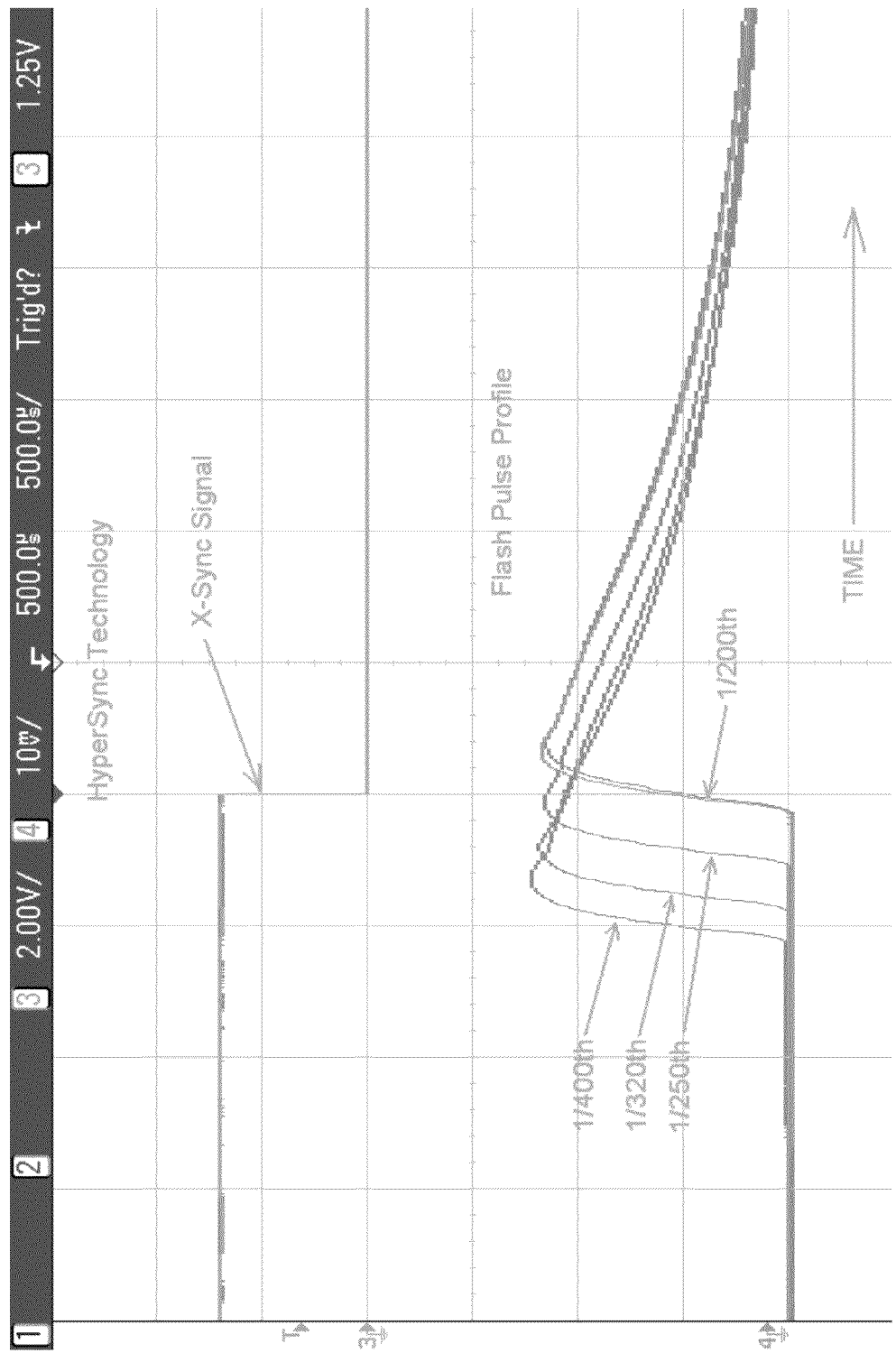
FIG. 8 illustrates timing data for an exemplary camera and flash combination working at $1/200^{th}$, $1/250^{th}$, $1/320^{th}$, and $1/400^{th}$ of a second shutter speeds.

FIG. 8 illustrates timing data for a camera and flash combination working at $\frac{1}{200}^{th}$, $\frac{1}{250}^{th}$, $\frac{1}{320}^{th}$, and $\frac{1}{400}^{th}$ of a second shutter speeds. FIG. 8 shows a flash pulse profile for light emission for each shutter speed initiated at differing calibration values of time period 715. In each case, light emission was initiated after the first shutter blade began to allow light to pass to the sensor but before the x-sync signal. The earlier initiation times for the faster shutter speeds eliminated clipping in the resultant images.

Figure 9:
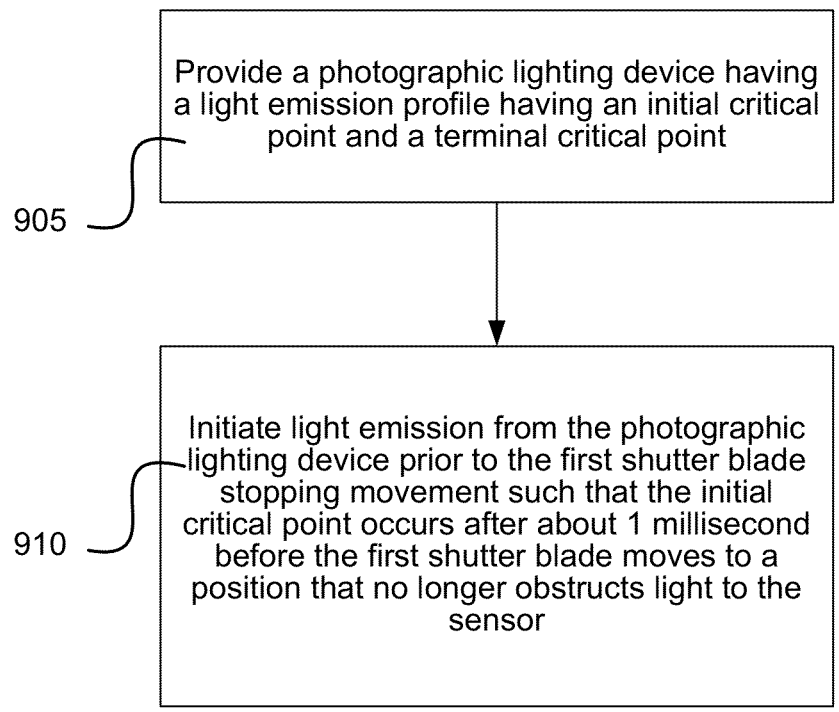
FIG. 9 illustrates another exemplary implementation of a method of early synchronization.

FIG. 9 illustrates another embodiment of a method of early synchronization. At step 905 a photographic lighting device having a light emission profile having an initial critical point and a terminal critical point is provided. Initial and terminal critical points are discussed above. At step 910 a light emission is initiated from the photographic lighting device prior to a first shutter blade of a camera associated with the photographic lighting device stopping movement. The initiation of light emission is such that the initial critical point occurs at a point in time after about 1 millisecond before the first shutter blade moves to a point where the first shutter blade no longer obstructs light to the sensor.

In one example, the initial critical point occurs after 500 microseconds before the first shutter blade moves to a point where the first shutter blade no longer obstructs light to the sensor. In another example, the initial critical point occurs after 250 microseconds before the first shutter blade moves to a point where the first shutter blade no longer obstructs light to the sensor. In yet another example, the initial critical point occurs at approximately the same time as a time when the first shutter blade moves to a point where the first shutter blade no longer obstructs light to the sensor. In still another example, the initial critical point occurs after the time that the first shutter blade moves to a point where the first shutter blade no longer obstructs light to the sensor. In yet still another example, the initial critical point occurs before the first shutter blade stops movement. In a further example, the terminal critical point occurs before 500 microseconds after the second shutter blade moves to a point where the second shutter blade starts to obstruct light from passing to the sensor. In a still a further example, the terminal critical point occurs before 250 microseconds after the second shutter blade moves to a point where the second shutter blade starts to obstruct light from passing to the sensor. In yet a further example, the terminal critical point occurs at about the time that the second shutter blade moves to a point where the second shutter blade starts to obstruct light from passing to the sensor. In still yet a further example, the terminal critical point occurs before the time that the second shutter blade moves to a point where the second shutter blade starts to obstruct light from passing to the sensor. It is contemplated that various implementations exist combining any one or more of the examples of this paragraph to provide an initial time limit for the occurrence of the initial critical point, a terminal time limit for the occurrence of the terminal critical point, and/or a terminal time limit for the occurrence of the initial critical point. For example, in one implementation, the initial critical point occurs after the time that the first shutter blade moves to a point where the first shutter blade no longer obstructs light to the sensor and the terminal critical point occurs before the time that the second shutter blade moves to a point where the second shutter blade starts to obstruct light from passing to the sensor.

Figure 10:
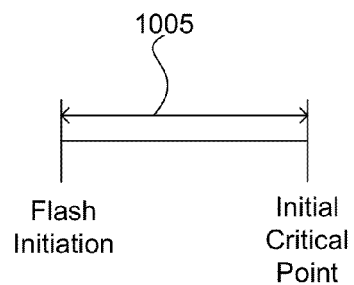
FIG. 10 illustrates a timing plot showing an exemplary time between flash initiation and an initial critical point.

FIG. 10 illustrates a timing plot showing the time 1005 between flash initiation and the initial critical point. This time can be utilized in the calibration processes described above to offset the time of the light emission initiation to have the initial critical point occur at a desired time. In one example, time 1005 is measured for a flash device. The measured time value may be stored in a memory for use in calibration and operation of a early synchronization system (e.g., system 1300). In one example, empirical observation of a resultant image acquisition with varying calibration offset values based on a time 1005 may indicate an optimal location of the initial critical point with respect to the time at which the edge of the first shutter blade fully clears from obstructing the sensor.

Figure 11:
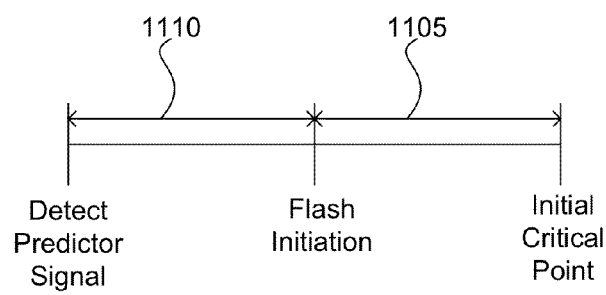
FIG. 11 illustrates a timing plot showing an exemplary time between a desired flash initiation and an initial critical point.

FIG. 11 illustrates a timing plot showing the time 1105 between desired flash initiation and the initial critical point. Time 1110 is the time between a detected predictor signal and desired flash initiation.

Figure 12:
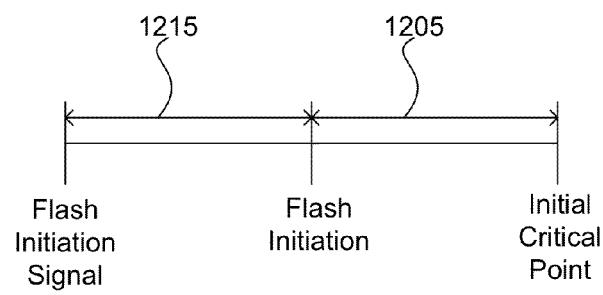
FIG. 12 illustrates a timing plot showing an exemplary time between a desired flash initiation and an initial critical point.

FIG. 12 illustrates a timing plot showing the time 1205 between desired flash initiation and the initial critical point. Time 1215 is the time between the time of generation of a flash initiation signal and the time of desired flash initiation. As discussed above time 1215 may be influenced, for example, by circuitry transmission time and/or wireless transmission time.

Figure 13:
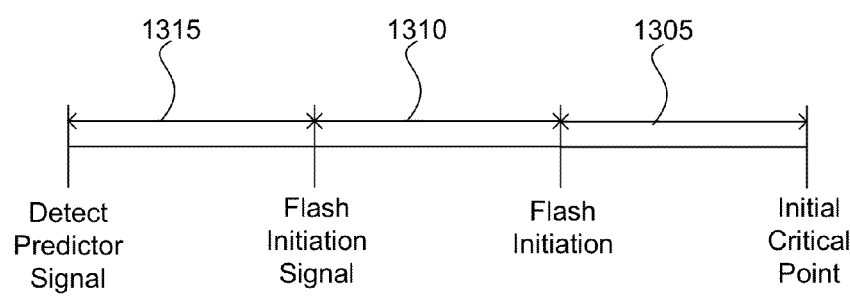
FIG. 13 illustrates a timing plot showing an exemplary time between a desired flash initiation and an initial critical point.

FIG. 13 illustrates a timing plot showing the time 1305 between desired flash initiation and the initial critical point. Time 1310 is the time between a detected predictor signal and desired flash initiation. Time 1315 is the time between the time of generation of a flash initiation signal and the time of desired flash initiation.

In one exemplary implementation, utilization of time period 1005 and calibration information discussed above (e.g., time between predictor signal/event and X-synch, time of calibration offset value, and time to the time of desired light emission initiation from predictor signal/event), the timing of the initial critical point can be positioned at a desired time after 1 ms before first shutter blade clearance of the sensor.

Figure 14:
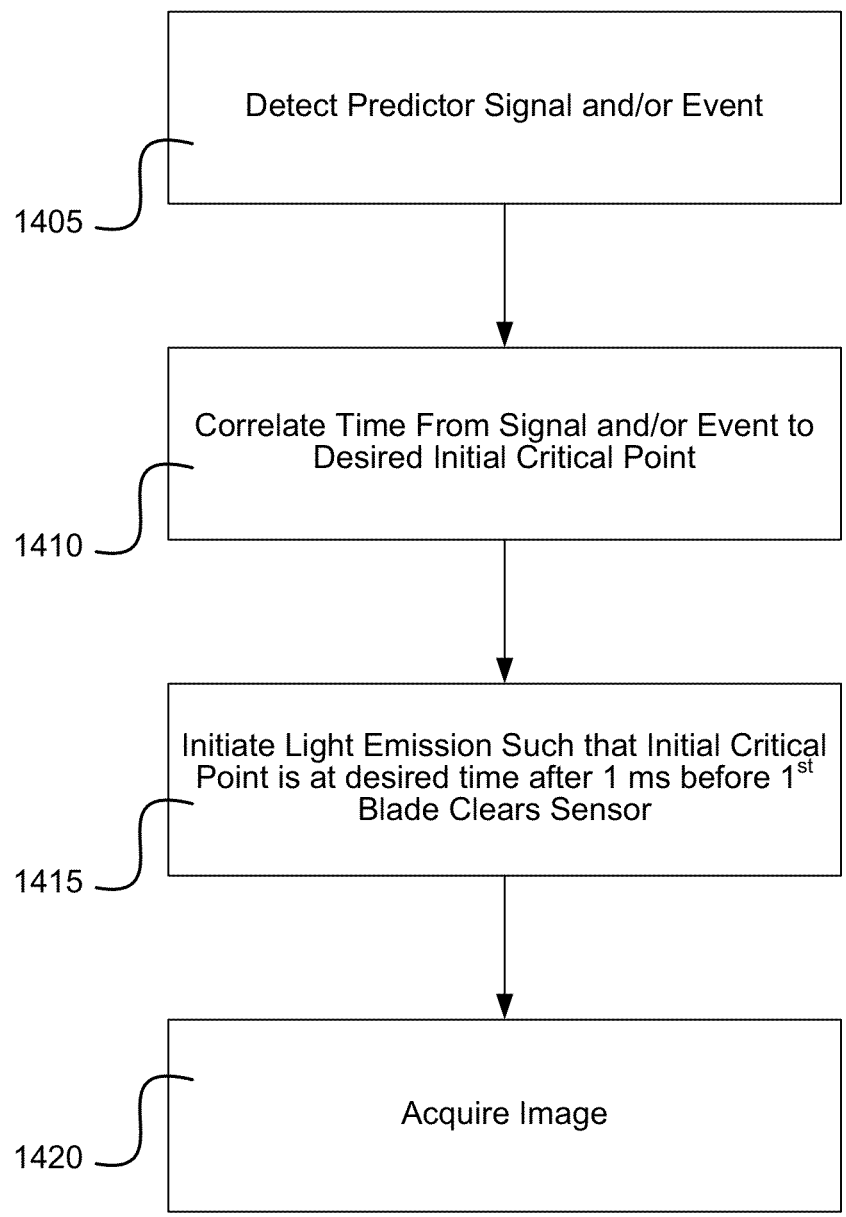
FIG. 14 illustrates another exemplary implementation of a method of synchronizing one or more lighting devices to an image acquisition using a predictor signal and/or event.

FIG. 14 illustrates another implementation of a method of synchronizing one or more lighting devices to an image acquisition using a predictor signal and/or event. At step 1405, a predictor signal and/or event is detected. At step 1410, a time from the time predictor signal and/or event to the desired time of the initial critical point is correlated. In one example, correlation of a time of an initial critical point includes determining the time from the predictor signal and/or event occurrence to the occurrence of the initial critical point, and subtracting out a known value for the time from the initiation of light emission for the lighting device and the time at which the lighting device creates light at the initial critical point. In another example, correlation of the time of the initial critical point includes referencing a table having time values (e.g., including time delay values) for a lighting device that provides the time from the occurrence of the predictor signal and/or event to the time of desired light emission initiation. Other ways of correlating the appropriate time of light emission initiation will be apparent to those of ordinary skill from the disclosure herein. At step 1415, a light emission is initiated such that the initial critical point is at a desired time after 1 millisecond before the first shutter blade clears the imaging sensor. At step 1420, an image is acquired using the one or more lighting devices.

Figure 15:
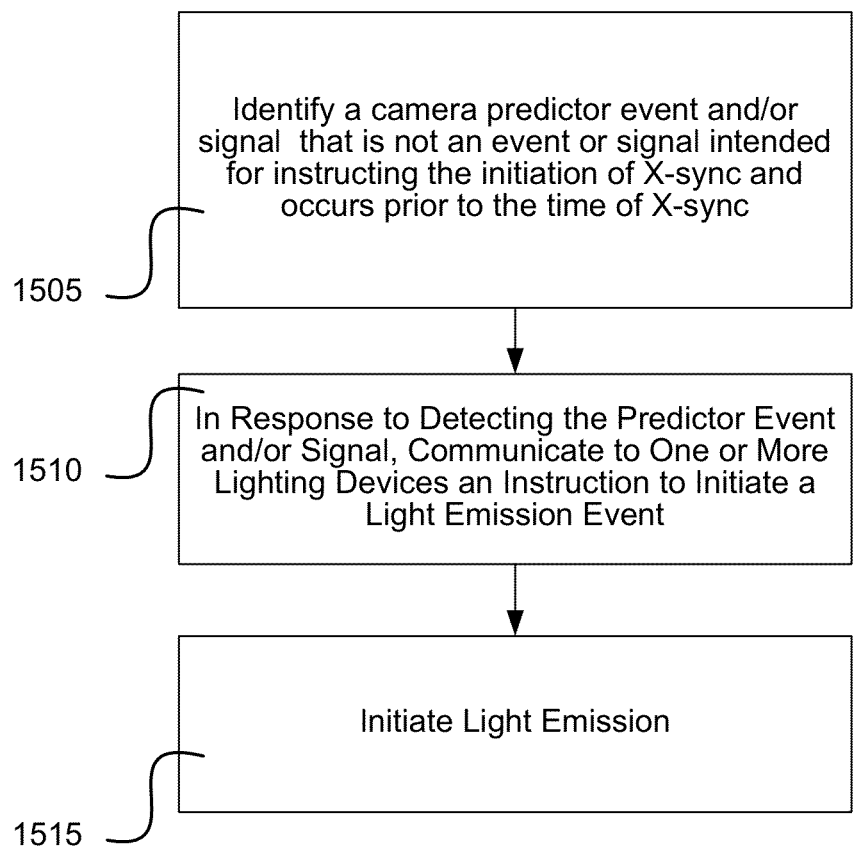
FIG. 15 illustrates yet another exemplary implementation of a method of synchronizing a given type of image exposure light emission of one or more lighting devices to an image acquisition.

FIG. 15 illustrates yet another implementation of a method of synchronizing a given type of image exposure light emission of one or more lighting devices to an image acquisition. At step 1505, a camera predictor event and/or signal is identified that is not an event or signal intended for instructing the initiation of X-sync and occurs prior to the time of X-sync. In one example, the predictor event and/or signal occurs prior to a first shutter blade of the camera moving to a point that allows light to pass to an imaging portion of the sensor. At step 1510, based upon the occurrence of the predictor event and/or signal, an instruction for initiating the light emission is communicated to the photographic lighting device. At step 1515, light emission is initiated. In one example, light emission is initiated after a first shutter blade begins to expose an imaging portion of an imaging acquisition sensor of a camera and before X-sync associated with stopping of the first shutter blade movement. In another example, light emission is initiated such that an initial critical point of a flash profile of a lighting device occurs at a point in time after about 1 millisecond before the first shutter blade moves to a position that no longer obstructs light to the imaging portion of the sensor.

As discussed above, various camera predictor events and signals are available for use in synchronizing. In one example, a camera predictor event and/or signal is a serial data communication of the camera. In one such example, a serial data communication is a power set command. In another example, a serial data communication is a mode set command. In a further example, a camera predictor event and/or signal is a drop in a voltage of a clock signal of the camera. In yet another example, a camera predictor event and/or signal is the initiation of a shutter magnet release signal. In still another example, a camera predictor event and/or signal is the initiation of an FP-sync signal and the initiating light emission does not include an FP-type flash emission.

Communicating an instruction for initiating light emission to a photographic lighting device can occur in a variety of ways. As discussed above, light emission initiation can occur in many environments. In one example, such communicating includes delivering the instruction internal to the camera to an internal lighting device. This may be done by a wired electrical connection. In another example, such communicating includes delivering the instruction via a hot shoe connector of the camera to the photographic lighting device, the photographic lighting device being positioned in the hot shoe connector. In still another example, such communicating includes wirelessly transmitting the instruction to the photographic lighting device. Various wireless transmission functionalities and processes are discussed herein with respect to other implementations and, as appropriate, are useful here. In one such example of wireless transmitting, a wireless communication device is connected to the camera (e.g., via a hot shoe connector, via a USB connector, via a proprietary connector, etc.) and provides a wireless communication functionality to the camera for wirelessly transmitting an instruction to a remote lighting device. In another such example, a wireless communication functionality is internal to the camera and is utilized for wirelessly transmitting an instruction to a remote lighting device.

Wireless communication of the instruction can occur at a variety of times. In one example, the instruction is wirelessly transmitted prior to the first shutter blade moving to a position that no longer obstructs light to the imaging portion of the sensor. In another example, the instruction is received by a wireless communications receiver associated with the photographic lighting device prior to the first shutter blade moving to a position that no longer obstructs light to the imaging portion of the sensor. In yet another example, the instruction is wirelessly transmitted prior to the occurrence of the normal flash initiation event or signal. In still another example, the instruction is received by a wireless communications receiver associated with the photographic lighting device prior to the occurrence of the normal flash initiation event or signal.

An instruction for initiating light emission includes information for a lighting device to determine the proper time for actual light emission. As discussed above, various factors may influence the timing of actual light emission with respect to the transmission and receipt of an instruction for initiating the emission. The light emission may occur at a time that is delayed from the receipt of the instruction by a lighting device (e.g., by a wireless receiving device associated with the lighting device). In one example, the instruction includes a pre-calculated time for initiating light emission. In another example, the instruction includes a delay factor.

Figure 16:
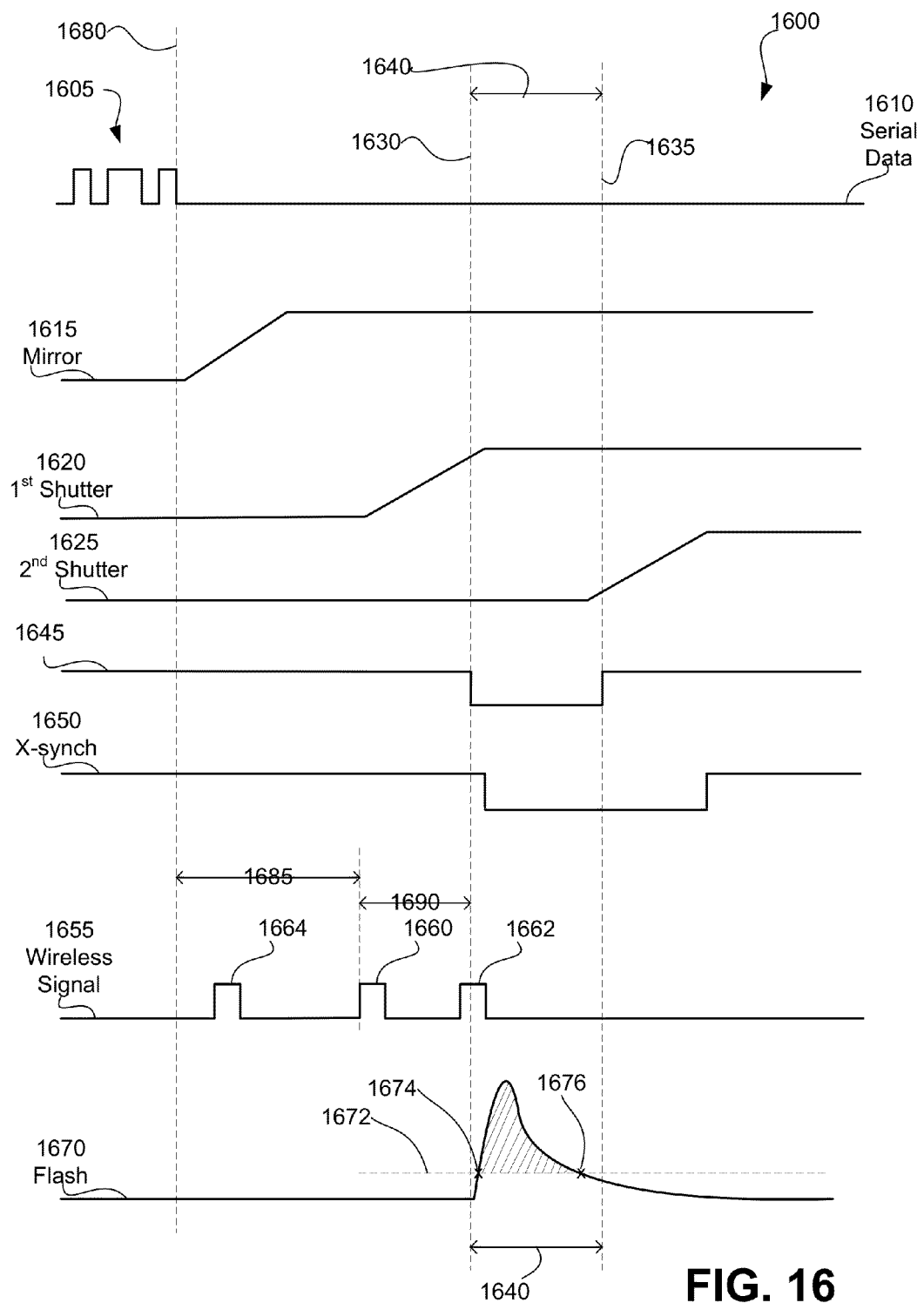
FIG. 16 illustrates an exemplary implementation of a method of synchronizing one or more lighting devices to an image acquisition of a camera.

FIG. 16 illustrates an exemplary implementation of a method of synchronizing one or more lighting devices to an image acquisition of a camera. The method is shown with the aid of various plots 1600 over time from the left of the plots to the right. The method utilizes a predictor signal 1605 that is a serial data transmission of a serial data output of a camera represented in voltage plot 1610. In one example, predictor signal 1605 is a series of data communications of a power set command. In one such example, the power set command occurs prior to the start of movement of the first shutter blade. Plot 1615 represents the physical movement of a mirror of a camera from an initial closed position (represented by the initial lower horizontal line) to a position (represented by the second upper horizontal portion of the plot) that allows light to pass to a shutter mechanism of the camera. Plot 1620 shows the movement of an edge of a first shutter blade from an initial position (represented by the initial horizontal portion of the plot) that blocks light from an imaging sensor of the camera to a second stopped position (represented by the second horizontal portion of the plot). In the stopped position, the first shutter blade does not block light from passing to the imaging sensor. A diagonal portion connecting the two horizontal portions represents the movement of the first shutter blade from a position fully obstructing light through a time where the imaging sensor is partially blocked by the first shutter blade to a time where the first shutter blade is no longer obstructing light to the imaging sensor. Initiation of the movement of a first shutter blade may occur in a variety of ways. In one example, a first shutter blade occurs as a result of a magnet that holds the shutter blade in place being released. In such an example, a magnet may be released by a magnet release signal. Plot 1625 shows the movement of an edge of a second shutter blade from an initial open position (represented by the initial horizontal portion of the plot) to a second stopped position (represented by the second horizontal portion of the plot) at which the second shutter blade fully blocks light from the lens to the imaging sensor. A diagonal portion of the plot connecting the two horizontal portions represents the movement of the second shutter blade from a position that does not obstruct light to the sensor through a time where the shutter blade partially obstructs light to the sensor to a time of fully blocking light to the sensor. Dashed line 1630 marks the time at which the edge of the first shutter blade clears the imaging sensor such that it no longer blocks light to the imaging sensor. In this example, this time occurs prior to the first shutter blade stopping movement. Dashed line 1635 marks the time at which the leading edge of the second shutter blade starts to obstruct light from passing to the imaging sensor. In this example, this time occurs at a point after the second shutter blade has begun movement. The time 1640 between dashed lines 1630 and 1635 is the time that the imaging sensor is fully unobstructed by the shutter blades. Plot 1645 shows an optional voltage change plot associated with time period 1640. Plot 1650 shows a voltage change plot of a conventional X-Sync signal of the camera that begins with a voltage change at about the time of the first shutter blade stopping movement and ends with a voltage change at the time of the second shutter blade stopping movement.

Plot 1655 represents a wireless transmission signal used to communicate synchronization information from a camera to one or more photographic lighting devices according to any one of the implementations for initiating light emission described herein. Plot 1655 includes representations for a first synchronization transmission 1660, and a second synchronization transmission 1662, a data transmission 1664. First synchronization transmission 1660 is a transmission including instructions for synchronizing the initiation of light emission by a photographic lighting device according to any one or more of the embodiments and implementations of timing of emission initiation discussed herein. Second synchronization transmission 1662 is an optional transmission. In this example, second synchronization transmission 1662 is for receipt by one or more lighting devices not associated with a functionality for early synchronization with time delay factors. Second synchronization transmission 1662 provides such a device with a wireless light emission initiation direct signal such that the time of initiation is at about the time of receipt of the wireless transmission (e.g., at the time of X-sync or another predetermined time). In one example, transmissions 1660 and 1662 are configured to have light emission initiation by their corresponding lighting devices occur at the same time. In another example, transmissions 1660 and 1662 are configured to have light emission initiation at different times. Data transmission 1664 is also an optional transmission. An early transmitted data transmission can provide information about the image acquisition (e.g., other than timing information), information about the camera, and any combinations thereof to a remote lighting device. In this example, data transmission 1664 transmits information regarding power settings obtained from the power set command 1605.

Plot 1670 shows a light emission intensity profile of a lighting device. Dashed line 1672 marks the intensity level above which the light emission of the lighting device is detectable by the imaging sensor over ambient lighting. Initial critical point 1674 is the point on the light emission profile at which the light emission is first detectable by the imaging sensor above the ambient light. Terminal critical point 1676 is the point on the light emission profile at which the light emission is last detectable by the imaging sensor above the ambient light. The hashed area under the light emission curve represents the light emission that is detectable by the imaging sensor. Light emission is initiated after the first shutter blade begins to allow light to pass to the imaging sensor and before the first shutter blade stops movement.

In this implementation, the predictor signal 1605 is detected. In one example, the occurrence is measured from the last data bit at the time represented by the dotted line 1680. Based on the occurrence of predictor signal 1605, first synchronization transmission 1660 is communicated to a lighting device. First synchronization transmission 1660 includes instructions for initiating light emission of the lighting device such that light emission is initiated as shown in plot 1670. In this example, light emission is initiated prior to X-sync and after the first shutter blade begins to expose the sensor. The initial critical point 1674 and terminal critical point 1676 each occur within the time window 1640. As discussed above, light emission can be initiated such that critical point 1674 occurs at any of a variety of times with respect to an X-sync time and/or the time represented by line 1630. It is contemplated that the examples discussed above could apply to the timing of initial critical point 1674.

As is shown with respect to FIG. 16, first synchronization transmission initiates at a time 1685 after the occurrence of predictor signal 1605 and at a time 1690 before the first shutter blade clears the sensor (i.e., the time shown by line 1630). The instructions for initiating light emission included in synchronization transmission 1660 may utilize the total time between time 1680 and time 1630, the time 1685, the time 1690, a time delay factor, known delays due to transmission, known delays due to excitation of lighting device, and/or other factors in determining the time 1685 for transmission after predictor signal 1605 and/or in determining a time delay factor included in the instructions for when the light emission initiation occurs after receipt of the transmission 1660. Various calibration procedures were discussed above. Additional calibration procedures are discussed further below (e.g., with respect to FIGS. 19 and 20).

Figure 17:
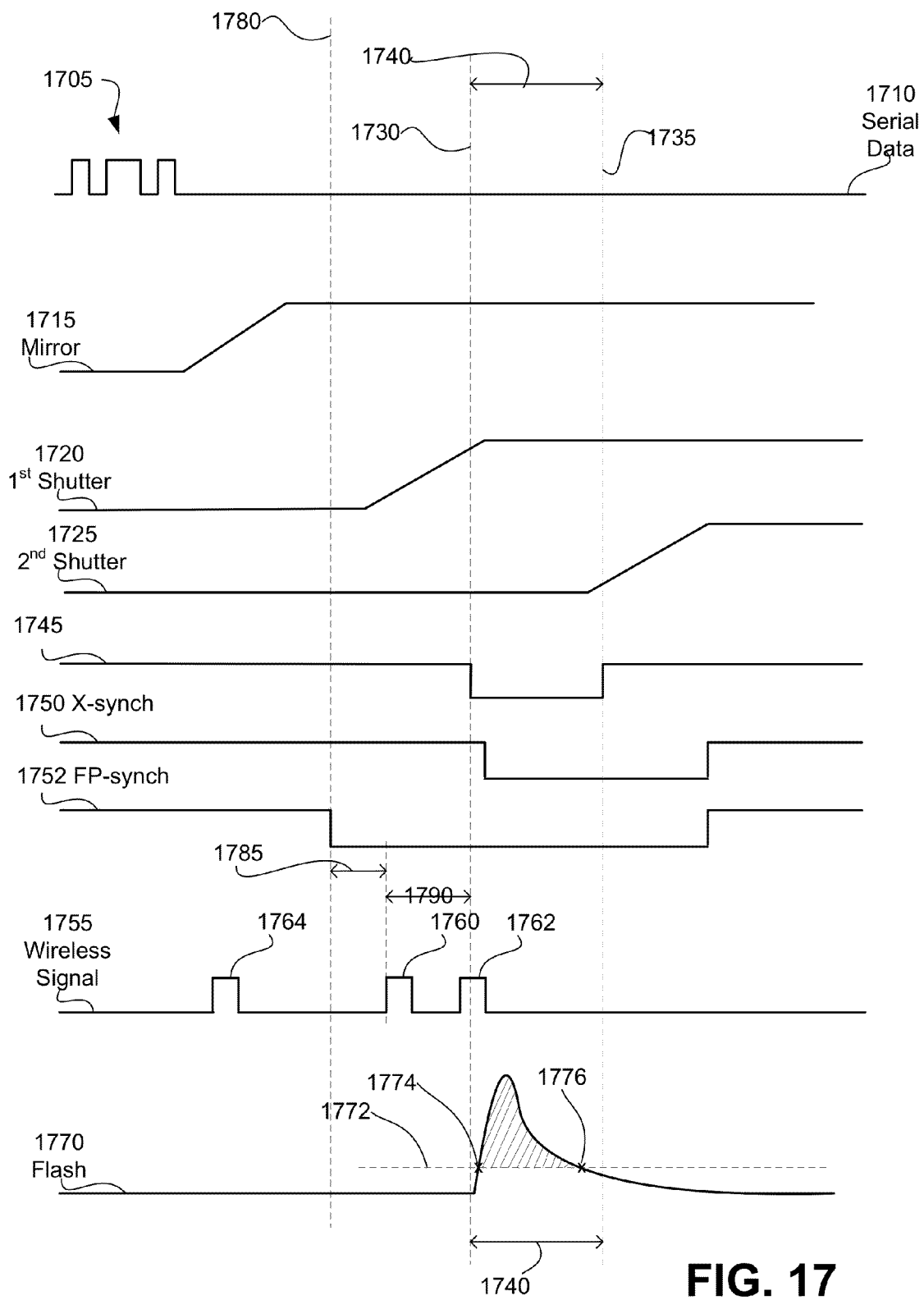
FIG. 17 illustrates another exemplary implementation of a method of synchronizing one or more lighting devices to an image acquisition of a camera.

FIG. 17 illustrates an exemplary implementation of a method of synchronizing one or more lighting devices to an image acquisition of a camera. The method is shown with the aid of various plots 1700 over time from the left of the plots to the right. The method utilizes an FP-sync signal as discussed below as a predictor signal. Data signal 1705 is a serial data transmission of a serial data output of a camera represented in voltage plot 1710. Plot 1715 represents the physical movement of a mirror of a camera from an initial closed position (represented by the initial lower horizontal line) to a position (represented by the second upper horizontal portion of the plot) that allows light to pass to a shutter mechanism of the camera. Plot 1720 shows the movement of an edge of a first shutter blade from an initial position (represented by the initial horizontal portion of the plot) that blocks light from an imaging sensor of the camera to a second stopped position (represented by the second horizontal portion of the plot). In the stopped position, the first shutter blade does not block light from passing to the imaging sensor. A diagonal portion connecting the two horizontal portions represents the movement of the first shutter blade from a position fully obstructing light through a time where the imaging sensor is partially blocked by the first shutter blade to a time where the first shutter blade is no longer obstructing light to the imaging sensor. Initiation of the movement of a first shutter blade may occur in a variety of ways. In one example, a first shutter blade occurs as a result of a magnet that holds the shutter blade in place being released. In such an example, a magnet may be released by a magnet release signal. Plot 1725 shows the movement of an edge of a second shutter blade from an initial open position (represented by the initial horizontal portion of the plot) to a second stopped position (represented by the second horizontal portion of the plot) at which the second shutter blade fully blocks light from the lens to the imaging sensor. A diagonal portion of the plot connecting the two horizontal portions represents the movement of the second shutter blade from a position that does not obstruct light to the sensor through a time where the shutter blade partially obstructs light to the sensor to a time of fully blocking light to the sensor. Dashed line 1730 marks the time at which the edge of the first shutter blade clears the imaging sensor such that it no longer blocks light to the imaging sensor. In this example, this time occurs prior to the first shutter blade stopping movement. Dashed line 1735 marks the time at which the leading edge of the second shutter blade starts to obstruct light from passing to the imaging sensor. In this example, this time occurs at a point after the second shutter blade has begun movement. The time 1740 between dashed lines 1730 and 1735 is the time that the imaging sensor is fully unobstructed by the shutter blades. Plot 1745 shows an optional voltage change plot associated with time period 1740. Plot 1750 shows a voltage change plot of a conventional X-Sync signal of the camera that begins with a voltage change at about the time of the first shutter blade stopping movement and ends with a voltage change at the time of the second shutter blade stopping movement. Plot 1752 shows a voltage change plot of a conventional FP-sync signal of the camera that begins with a voltage change at a time represented by line 1780 that occurs prior to the first shutter blade starting to expose the imaging sensor. In one exemplary aspect of some systems having an FP-sync signal, there is no X-sync signal generated by the camera. In such a situation, the timing of X-sync (and timing of light emission initiation with respect thereto) can be determined using other indications, such as determination of the time of stopping of the first shutter blade movement. Other options will be apparent to those of ordinary skill from the disclosure herein.

Plot 1755 represents a wireless transmission signal used to communicate synchronization information from a camera to one or more photographic lighting devices according to any one of the implementations for initiating light emission described herein. Plot 1755 includes representations for a first synchronization transmission 1760, and a second synchronization transmission 1762, a data transmission 1764. First synchronization transmission 1760 is a transmission including instructions for synchronizing the initiation of light emission by a photographic lighting device according to any one or more of the embodiments and implementations of timing of emission initiation discussed herein. Second synchronization transmission 1762 is an optional transmission. In this example, second synchronization transmission 1762 is for receipt by one or more lighting devices not associated with a functionality for early synchronization with time delay factors. Second synchronization transmission 1762 provides such a device with a wireless light emission initiation direct signal such that the time of initiation is at about the time of receipt of the wireless transmission (e.g., at the time of X-sync or another predetermined time). In one example, transmissions 1760 and 1762 are configured to have light emission initiation by their corresponding lighting devices occur at the same time. In another example, transmissions 1760 and 1762 are configured to have light emission initiation at different times. Data transmission 1764 is also an optional transmission. An early transmitted data transmission can provide information about the image acquisition (e.g., other than timing information), information about the camera, and any combinations thereof to a remote lighting device. In this example, data transmission 1764 transmits information regarding power settings obtained from the power set command 1705.

Plot 1770 shows a light emission intensity profile of a lighting device. Dashed line 1772 marks the intensity level above which the light emission of the lighting device is detectable by the imaging sensor over ambient lighting. Initial critical point 1774 is the point on the light emission profile at which the light emission is first detectable by the imaging sensor above the ambient light. Terminal critical point 1776 is the point on the light emission profile at which the light emission is last detectable by the imaging sensor above the ambient light. The hashed area under the light emission curve represents the light emission that is detectable by the imaging sensor. Light emission is initiated after the first shutter blade begins to allow light to pass to the imaging sensor and before the first shutter blade stops movement.

In this implementation, the data signal 1705 is detected. In this example, this signal 1705 is utilized to provide data for data transmission 1764. The initiation of the FP-sync signal (as indicated by the voltage drop at time zzz80) is utilized as the predictor signal. Based on the occurrence of predictor signal, first synchronization transmission 1760 is communicated to a lighting device. First synchronization transmission 1760 includes instructions for initiating light emission of the lighting device such that light emission is initiated as shown in plot 1770. In this example, light emission is initiated prior to X-sync and after the first shutter blade begins to expose the sensor. The initial critical point 1774 and terminal critical point 1776 each occur within the time window 1740. As discussed above, light emission can be initiated such that critical point 1774 occurs at any of a variety of times with respect to an X-sync time and/or the time represented by line 1730. It is contemplated that the examples discussed above could apply to the timing of initial critical point 1774.

As is shown with respect to FIG. 17, first synchronization transmission initiates at a time 1785 after the occurrence of the FP-sync predictor signal and at a time 1790 before the first shutter blade clears the sensor (i.e., the time shown by line 1730). The instructions for initiating light emission included in synchronization transmission 1760 may utilize the total time between time 1780 and time 1730, the time 1785, the time 1790, a time delay factor, known delays due to transmission, known delays due to excitation of lighting device, and/or other factors in determining the time 1785 for transmission after predictor signal and/or in determining a time delay factor included in the instructions for when the light emission initiation occurs after receipt of the transmission 1760. Various calibration procedures were discussed above. Additional calibration procedures are discussed further below (e.g., with respect to FIGS. 19 and 20).

Figure 18:
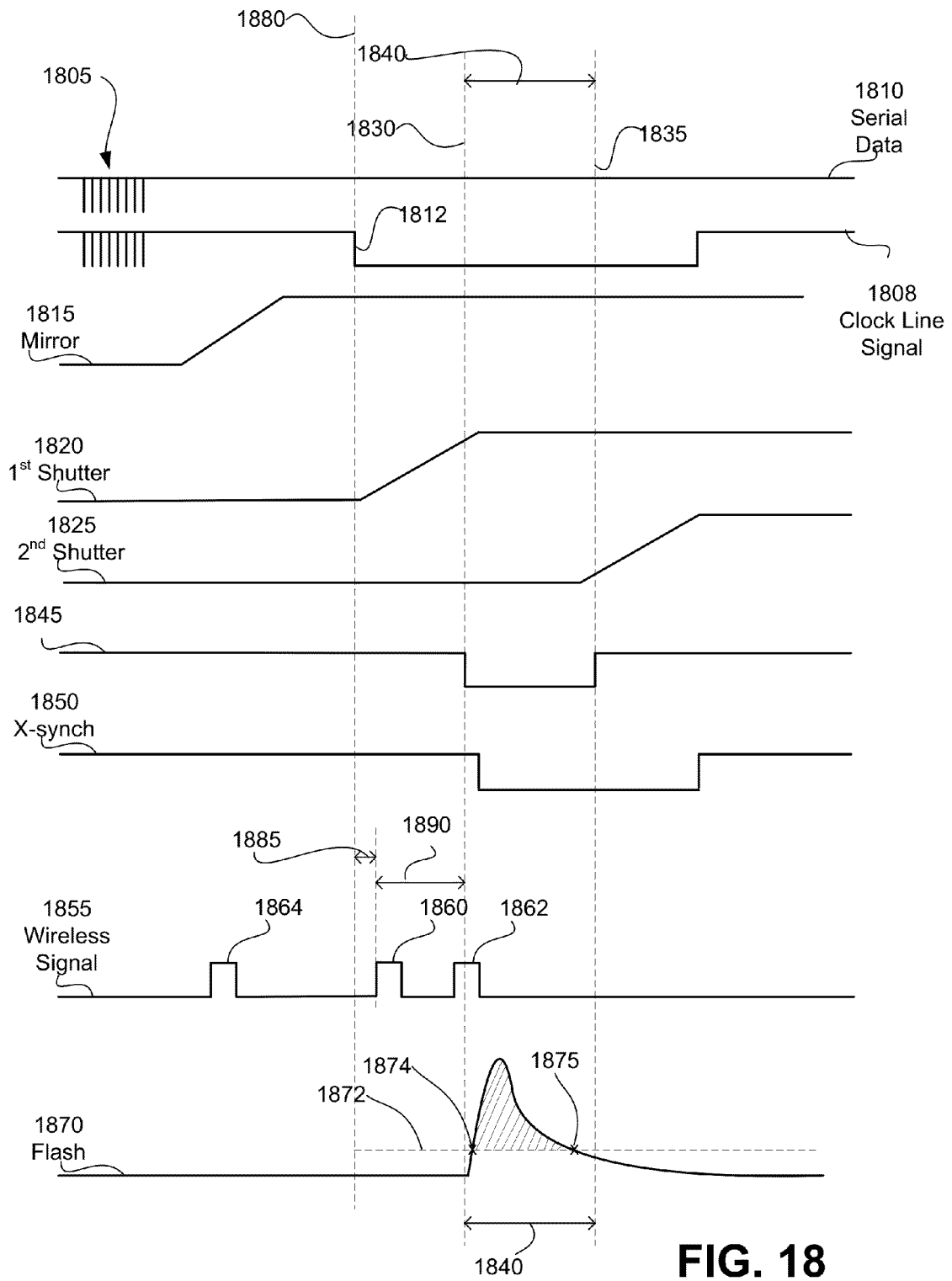
FIG. 18 illustrates yet another exemplary implementation of a method of synchronizing one or more lighting device to an image acquisition of a camera.

FIG. 18 illustrates an exemplary implementation of a method of synchronizing one or more lighting devices to an image acquisition of a camera. The method is shown with the aid of various plots 1800 over time from the left of the plots to the right. The method utilizes a combination of an indicator signal 1805 and a predictor signal (e.g., a drop in voltage of a clock line of the camera as represent by plot zzz08. Data signal 1805 is a serial data transmission of a serial data output of a camera represented in voltage plot 1810. Predictor signal 1812 initiates at a time represented by dotted line 1880 that occurs prior to the first shutter blade clearing the sensor at time 1830. Plot 1815 represents the physical movement of a mirror of a camera from an initial closed position (represented by the initial lower horizontal line) to a position (represented by the second upper horizontal portion of the plot) that allows light to pass to a shutter mechanism of the camera. Plot 1820 shows the movement of an edge of a first shutter blade from an initial position (represented by the initial horizontal portion of the plot) that blocks light from an imaging sensor of the camera to a second stopped position (represented by the second horizontal portion of the plot). In the stopped position, the first shutter blade does not block light from passing to the imaging sensor. A diagonal portion connecting the two horizontal portions represents the movement of the first shutter blade from a position fully obstructing light through a time where the imaging sensor is partially blocked by the first shutter blade to a time where the first shutter blade is no longer obstructing light to the imaging sensor. Initiation of the movement of a first shutter blade may occur in a variety of ways. In one example, a first shutter blade occurs as a result of a magnet that holds the shutter blade in place being released. In such an example, a magnet may be released by a magnet release signal. Plot 1825 shows the movement of an edge of a second shutter blade from an initial open position (represented by the initial horizontal portion of the plot) to a second stopped position (represented by the second horizontal portion of the plot) at which the second shutter blade fully blocks light from the lens to the imaging sensor. A diagonal portion of the plot connecting the two horizontal portions represents the movement of the second shutter blade from a position that does not obstruct light to the sensor through a time where the shutter blade partially obstructs light to the sensor to a time of fully blocking light to the sensor. Dashed line 1830 marks the time at which the edge of the first shutter blade clears the imaging sensor such that it no longer blocks light to the imaging sensor. In this example, this time occurs prior to the first shutter blade stopping movement. Dashed line 1835 marks the time at which the leading edge of the second shutter blade starts to obstruct light from passing to the imaging sensor. In this example, this time occurs at a point after the second shutter blade has begun movement. The time 1840 between dashed lines 1830 and 1835 is the time that the imaging sensor is fully unobstructed by the shutter blades. Plot 1845 shows an optional voltage change plot associated with time period 1840. Plot 1850 shows a voltage change plot of a conventional X-Sync signal of the camera that begins with a voltage change at about the time of the first shutter blade stopping movement and ends with a voltage change at the time of the second shutter blade stopping movement.

Plot 1855 represents a wireless transmission signal used to communicate synchronization information from a camera to one or more photographic lighting devices according to any one of the implementations for initiating light emission described herein. Plot 1855 includes representations for a first synchronization transmission 1860, and a second synchronization transmission 1862, a data transmission 1864. First synchronization transmission 1860 is a transmission including instructions for synchronizing the initiation of light emission by a photographic lighting device according to any one or more of the embodiments and implementations of timing of emission initiation discussed herein. Second synchronization transmission 1862 is an optional transmission. In this example, second synchronization transmission 1862 is for receipt by one or more lighting devices not associated with a functionality for early synchronization with time delay factors. Second synchronization transmission 1862 provides such a device with a wireless light emission initiation direct signal such that the time of initiation is at about the time of receipt of the wireless transmission (e.g., at the time of X-sync or another predetermined time). In one example, transmissions 1860 and 1862 are configured to have light emission initiation by their corresponding lighting devices occur at the same time. In another example, transmissions 1860 and 1862 are configured to have light emission initiation at different times. Data transmission 1864 is also an optional transmission. An early transmitted data transmission can provide information about the image acquisition (e.g., other than timing information), information about the camera, and any combinations thereof to a remote lighting device. In this example, data transmission 1864 transmits information regarding power settings obtained from the power set command 1805.

Plot 1870 shows a light emission intensity profile of a lighting device. Dashed line 1872 marks the intensity level above which the light emission of the lighting device is detectable by the imaging sensor over ambient lighting. Initial critical point 1874 is the point on the light emission profile at which the light emission is first detectable by the imaging sensor above the ambient light. Terminal critical point 1876 is the point on the light emission profile at which the light emission is last detectable by the imaging sensor above the ambient light. The hashed area under the light emission curve represents the light emission that is detectable by the imaging sensor. Light emission is initiated after the first shutter blade begins to allow light to pass to the imaging sensor and before the first shutter blade stops movement.

In this implementation, the data signal 1805 is detected. In this example, this signal 1805 is utilized to provide data for data transmission 1864. Signal 1805 is also used as an indicator that the next major drop in clock line 1808 is a reliable predictor signal that can be utilized in timing the initiation of one or more lighting devices. The initiation of the drop in the voltage of the clock line utilized as the predictor signal 1812. Based on the occurrence of predictor signal 1812, first synchronization transmission 1860 is communicated to a lighting device. First synchronization transmission 1860 includes instructions for initiating light emission of the lighting device such that light emission is initiated as shown in plot 1870. In this example, light emission is initiated prior to X-sync and after the first shutter blade begins to expose the sensor. The initial critical point 1874 and terminal critical point 1876 each occur within the time window 1840. As discussed above, light emission can be initiated such that critical point 1874 occurs at any of a variety of times with respect to an X-sync time and/or the time represented by line 1830. It is contemplated that the examples discussed above could apply to the timing of initial critical point 1874.

As is shown with respect to FIG. 18, first synchronization transmission initiates at a time 1885 after the occurrence of predictor signal 1812 and at a time 1890 before the first shutter blade clears the sensor (i.e., the time shown by line 1830). The instructions for initiating light emission included in synchronization transmission 1860 may utilize the total time between time 1880 and time 1830, the time 1885, the time 1890, a time delay factor, known delays due to transmission, known delays due to excitation of lighting device, and/or other factors in determining the time 1885 for transmission after predictor signal and/or in determining a time delay factor included in the instructions for when the light emission initiation occurs after receipt of the transmission 1860. Various calibration procedures were discussed above. Additional calibration procedures are discussed further below (e.g., with respect to FIGS. 19 and 20).

Figure 19:
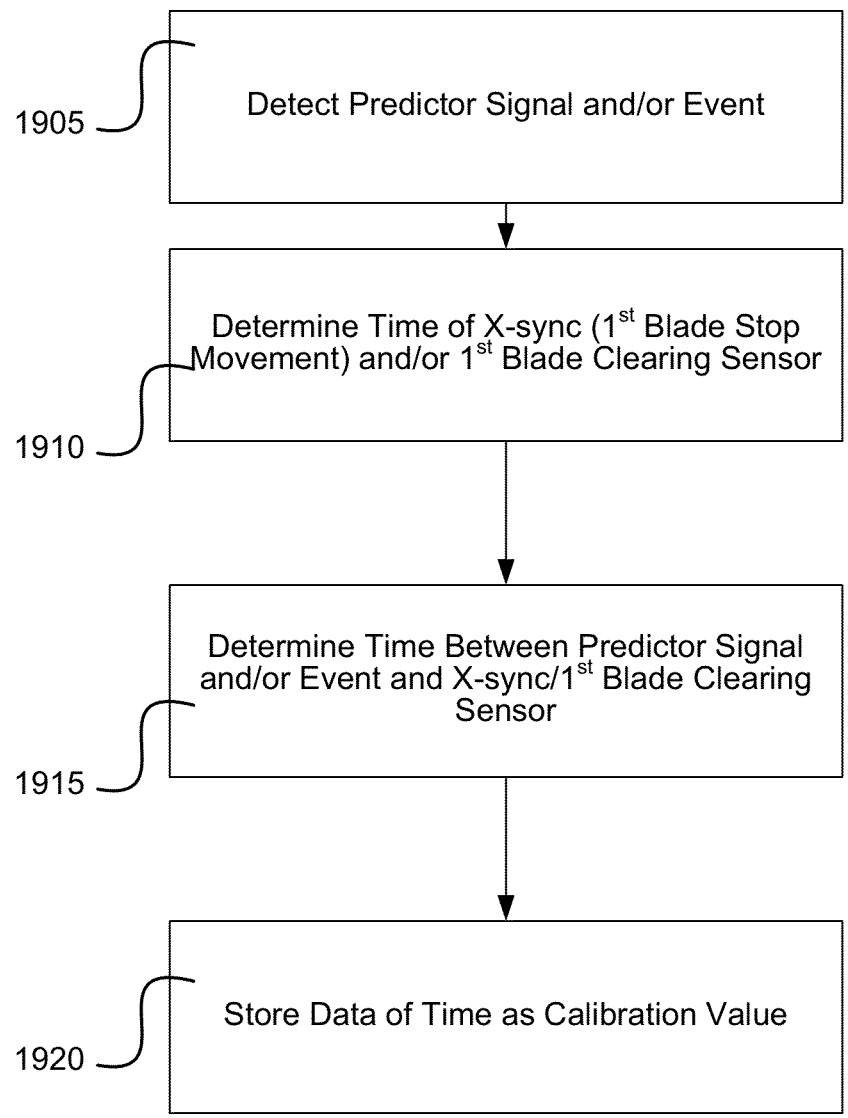
FIG. 19 illustrates an exemplary implementation of a calibration procedure for determining a time calibration value for use in determining the timing of light emission initiation.

FIG. 19 illustrates an additional exemplary implementation of a calibration procedure for determining a time calibration value for use in determining the timing of light emission initiation. At step 1905 a predictor signal and/or event is detected. At step 1910 the time of occurrence of X-sync (e.g., first shutter blade stopping movement) and/or the time of occurrence of the first shutter blade clearing the sensor are determined. In one example, at step 1915 the time from the predictor signal and/or event to the time of occurrence of X-sync is determined. In another example, at step 1915 the time from the predictor signal and/or event to the time of occurrence of the first shutter blade clearing the sensor is determine. The resultant data value from step 1915 is stored as a calibration value for use in calibrating synchronization as discussed herein.

Figure 20:
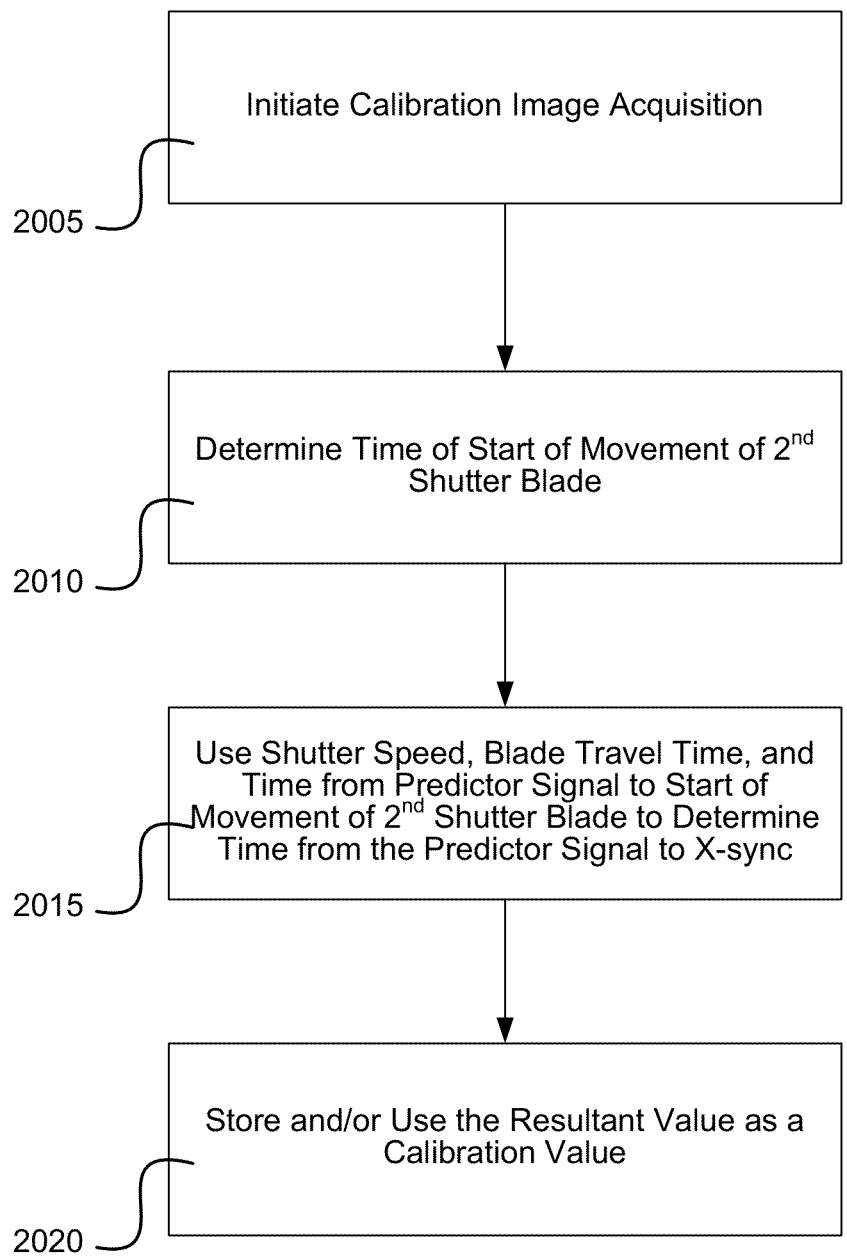
FIG. 20 illustrates another exemplary implementation of a calibration procedure.

FIG. 20 illustrates another exemplary implementation of a calibration procedure. At step 2005, a calibration image acquisition sequence is initiated. The time of start of movement of the second shutter blade of a camera body is determined at step 2010. In one example, a signal may be provided by a camera indicating the start of movement of the second shutter blade. At step 2015, the shutter speed of the image acquisition, the shutter blade travel time for the camera, and the time from the occurrence of a predictor signal and/or event to the start of movement of the second shutter blade are used to determine the time from the predictor signal and/or event to the stopping of movement of the first shutter blade (e.g., X-sync). At step 2020, the resultant value is stored and/or used as a calibration value that can be used to assist in timing the initiation of light emission. In one example, step 2015 further includes determining the time from the stopping of movement of the first shutter blade to the start of movement of the second shutter blade utilizing the shutter speed and the shutter blade travel time for the camera. In one such example, the shutter speed indicates the time between the start of movement of the first shutter blade and the start of movement of the second shutter blade. Using the blade travel time of the first shutter blade from start to finish and subtracting this from the shutter speed indication, the time from the stopping of movement of the first shutter blade to the start of movement of the second shutter blade can be determined. Blade travel times may vary from camera model to camera model and can be determined by analysis and or from literature values. The shutter speed of a camera during an image acquisition can be determined in a variety of ways. Example ways to determine shutter speed include, but are not limited to, detection via an external connector of the camera (e.g., to which a wireless communication functionality is connected, see FIGS. 35 and 36 below for an example), observation of a user interface of the camera, and any combinations thereof. Blade travel times for one or more cameras can be stored for retrieval during calibration and/or implementation of any one or more of the embodiments and/or implementations discussed herein.

Step 2015 may further include determining the time from the predictor signal and/or event to the stopping of movement of the first shutter blade utilizing the time from the occurrence of the predictor signal and/or event to the start of movement of the second shutter blade and the time from the stopping of movement of the first shutter blade to the start of movement of the second shutter blade. In one aspect of calibration, analysis of images at various adjustments to the time from a predictor signal to X-sync can be used in various implementations to determine an approximation of the time that the first shutter blade clears the sensor by viewing any clipping that may occur (e.g., utilizing values for time from initiation of light emission to initial critical point for a given flash, such as provided by literature values from manufacturer).

Determination of time of first shutter blade clearing the sensor can be made in a variety of ways. In one example, a shutter speed setting can be made such that an X-sync signal can be detected and the time from a prior event (e.g., triggering image acquisition) to the initiation of X-sync signal can be measured. A shutter speed setting can be made such that an FP-sync signal can be detected and the time from the same prior event to the initiation of the FP-sync signal can be measured. The centerpoint difference can be determined. For example, if the time to X-sync is 50 milliseconds and the time to FP-sync is 45 milliseconds, the time from the FP-sync signal to the X-sync signal is 5 milliseconds. Using the camera in an FP-sync mode, a wireless communication including a delay in the time from receiving the FP-sync signal from the camera and initiating a remote light emission. The delay is adjusted in successive image acquisitions and the images analyzed to determine when clipping is stopped in the image. The delay at that point is used to determine the time from the initiation of FP-sync signal to the time of clearing the sensor. The time between FP-sync and other predictor signals can be measured and used to determine the time between the predictor signal and the time of the first shutter blade clearing the sensor.

As discussed above, calibration tables can be stored for use (e.g., including calibration values for one or more cameras). Additionally, calibration can occur dynamically at or near the time of image acquisition.

Figure 21:
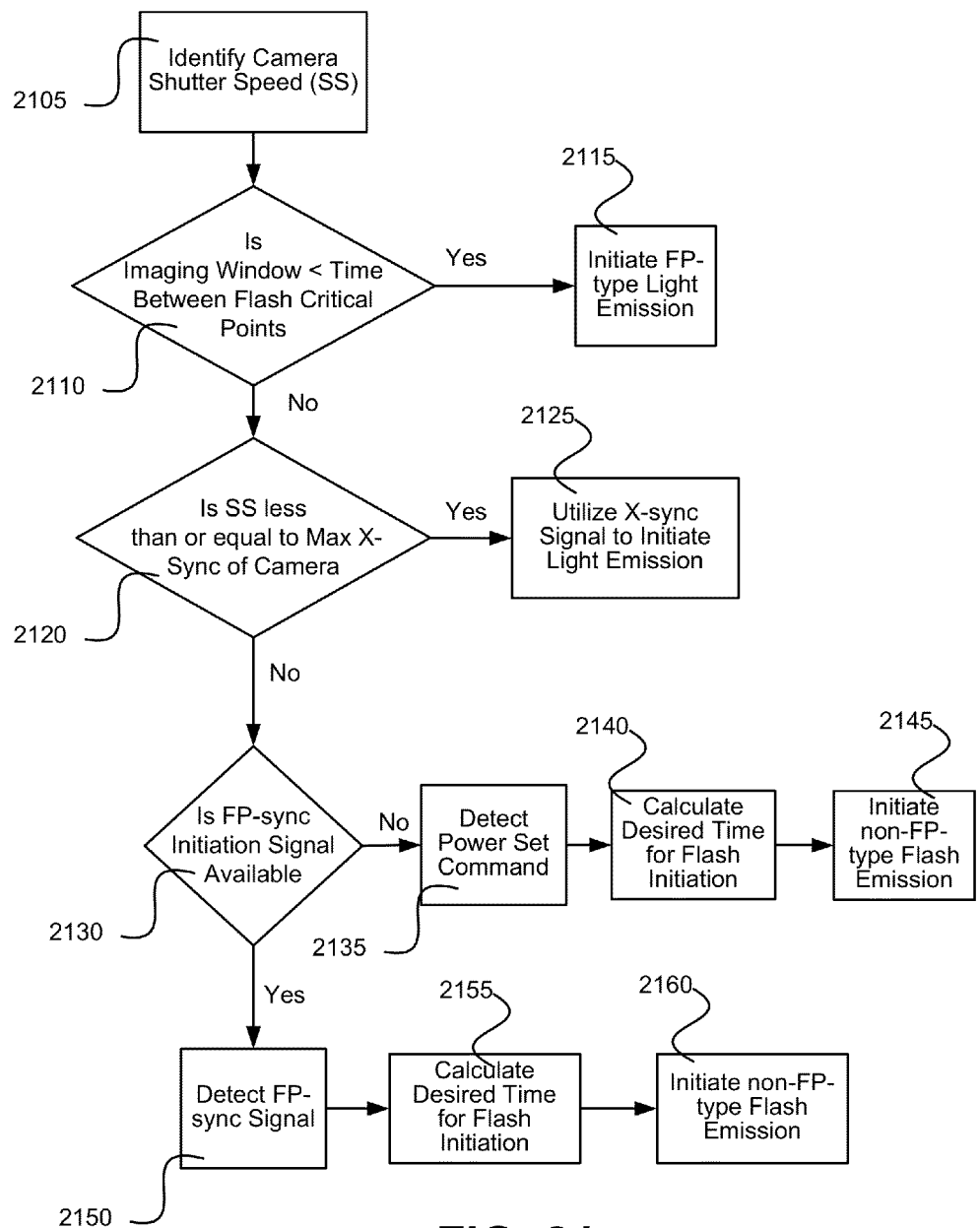
FIG. 21 illustrates one exemplary implementation of a procedure for determining a type of synchronization to implement based on shutter speed.

FIG. 21 illustrates one exemplary embodiment of a procedure for determining a type of synchronization to implement based on shutter speed. At step 2105, the shutter speed of the camera is identified. At step 2110, it is determined if the shutter speed is so fast that the time between the initial critical point for a profile of a lighting device and the terminal critical point for that device that the imaging window between the first blade clearing the sensor and the second shutter blade starting to obstruct the sensor is smaller than the time between critical points. If the imaging window is smaller than the difference in critical points, unacceptable clipping may occur in some examples. In such a case, at step 2110, the method proceeds to step 2115. If the difference in time of the critical points fits in the imaging window for the shutter speed, the method proceeds to step 2120. At step 2115, a synchronization is initiated that will utilize a light emission of the FP-type, as discussed above. At step 2120, it is determined if the shutter speed is less than or equal to the maximum X-sync shutter speed for the camera (e.g., as rated by the manufacturer, as determined by analysis of images acquired at various shutter speeds). If the shutter speed is less than or equal to maximum X-sync value, the method proceeds to step 2125. If the shutter speed is greater than maximum X-sync, the method proceeds to step 2130. At step 2125, a conventional X-sync signal is utilized to initiate light emission. At step 2130, two options are provided in this exemplary implementation for initiating a light emission. In one example, the determination between the two options is made by determining if an FP-sync signal is available from the camera. If an FP sync signal is not available, the method proceeds to step 2135. If an FP sync signal is available, the method proceeds to step 2150. At step 2135, a Power Set Command is detected on a data signal line of the camera. At step 2140, the time from the Power Set Command and a desired time for initiation of light emission is determined using one or more of the implementations and/or embodiments discussed herein. At step 2145, a non-FP-type light emission is initiated. At step 2150, an FP-sync signal is detected. At step 2155, the time from the FP-sync signal and the time of desired light emission initiation is determined using one or more of the implementations and/or embodiments discussed herein. At step 2160, a non-FP-type light emission is initiated.

Figure 22:
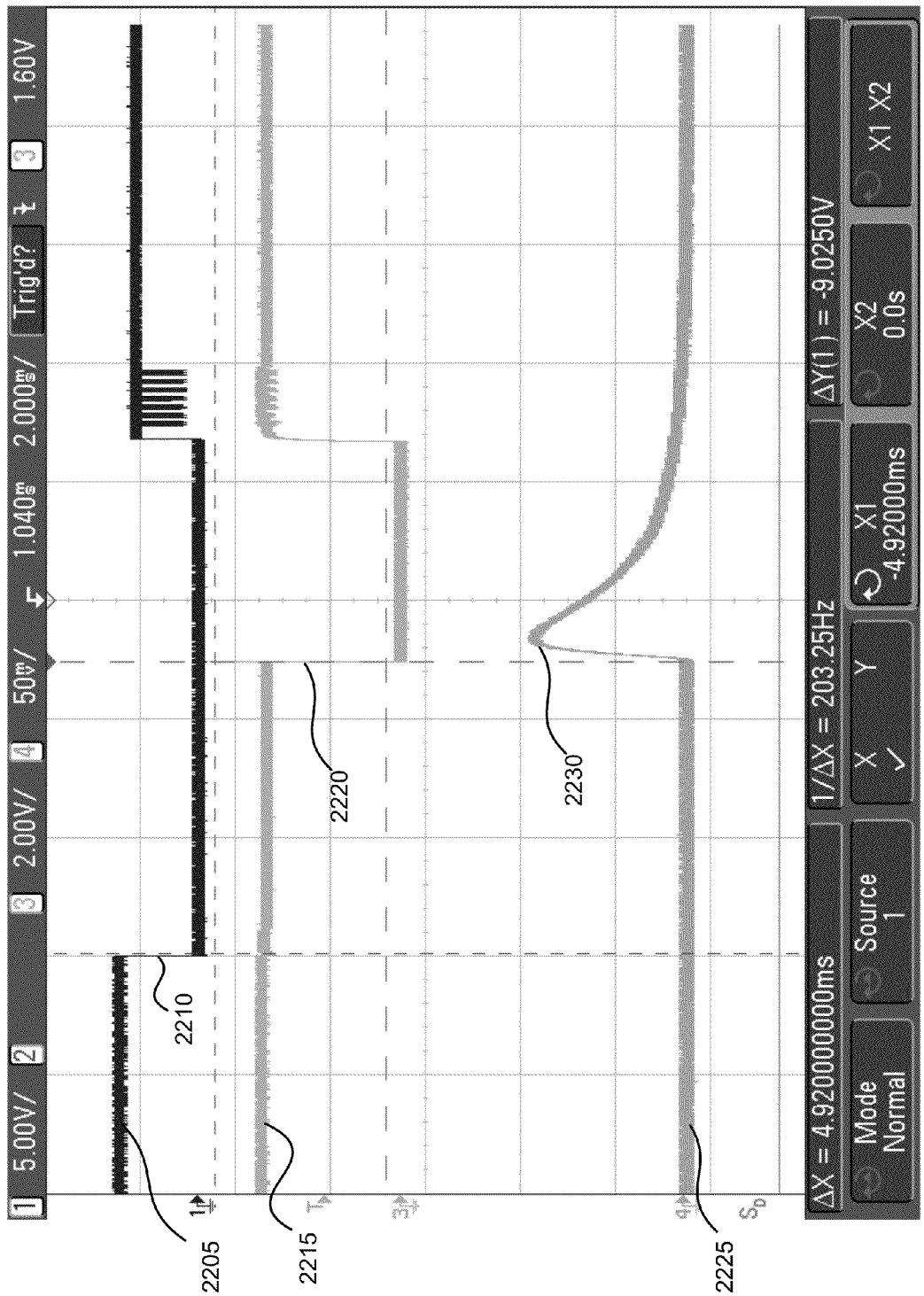
FIG. 22 illustrates exemplary timing plots for an image acquisition utilizing a camera and one or more flash devices synchronized to image acquisition.

FIG. 22 illustrates exemplary timing plots for an image acquisition utilizing a camera and one or more flash devices synchronized to image acquisition. Timing plot 2205 represents a camera clock signal measured in voltage (y-axis) over time (x-axis). Timing plot 2205 shows a voltage change 2210 at the beginning of a signal related to the magnet release associated with the first shutter blade of the camera. In this example, the voltage change 2210 was detectable as reliable predictor of when the first shutter blade of the camera stopped movement (e.g., at the X-synch). Timing plot 2215 represents the X-sync signal of the camera as a voltage (y-axis) over time (x-axis). Timing plot 2215 shows a voltage change 2220 representing the start of the X-sync (the point in time that the first shutter blade of the camera stopped moving. Timing plot 2225 represents a light emission intensity (y-axis) profile over time (x-axis) for the synchronized lighting device. In this example, light emission was initiated in response to the X-sync signal. The light emission curve 2230 initiates in time fully after the beginning of the X-sync signal. Such a synchronization system and method is typically limited to flash synchronization at shutter speeds of $\frac{1}{250}^{th}$ and slower (for cameras with fast shutter blade travel times) or $\frac{1}{200}^{th}$ and slower (for cameras with slower shutter blade travel times).

Figure 23:
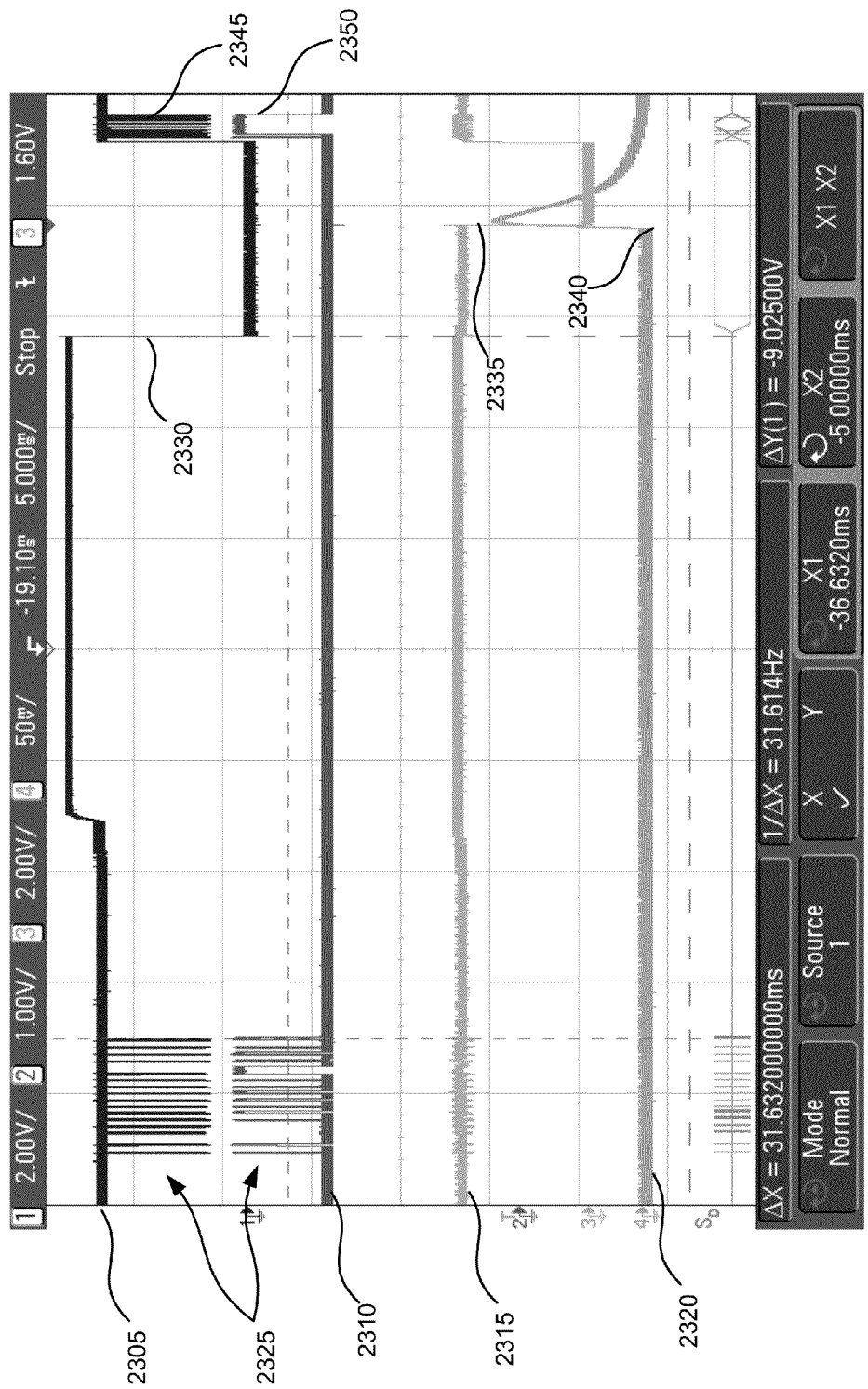
FIG. 23 illustrates another set of timing plots for an exemplary image acquisition using an early synchronization.

FIG. 23 illustrates another set of timing plots for an exemplary image acquisition using an early synchronization. This set of timing plots shows events earlier in the time of the process after triggering the image acquisition. Timing plot 2305 represents the clock information of the camera. Timing plot 2310 represents a camera data signal. Timing plot 2315 represents a monitoring of the X-sync line of the camera. Timing plot 2320 represents a light intensity profile over time. After the image acquisition is triggered, but before the mirror moves out of the light path to the shutter mechanism, the clock signal line 2305 and data signal line 2310 of the camera indicate pulses of information 2325. These pulses represent TTL power setting commands. At a time after the mirror stops movement, the magnet release signal is indicated as a voltage change 2330 on the camera clock signal line 2305. The time between the magnet release signal 2330 and a time associated with the stopping of the first shutter blade movement (indicated as a voltage change 2335 on the X-sync line 2315) was pre-learned by an early synchronization system (such as early synchronization system 1300). A threshold comparator of the synchronization system detected pulses 2325 and with reference to stored information regarding the camera (e.g., learned during a calibration), a processor identified pulses 2325 as an indication that the next larger voltage change to occur on the clock line 2305 would represent a mirror release signal. The threshold comparator then detected the magnet release signal 2330, the processor referenced a memory for stored information regarding the time from this predictor signal and X-sync for this camera, and the processor referenced a calibration value including information for the timing of light emission initiation. The processor generated a light emission initiation signal in time to have light emission initiate at a time 2340 after the first shutter blade started to allow light to pass to the sensor and before the first shutter blade stopped moving at 2335. Clock line 2305, data line 2310, and X-sync line 2315 were detectable via a hot shoe connector of the camera. FIG. 23 also shows post image acquisition data transfer (e.g., via the camera hot shoe) on clock line 2305 at voltage changes 2345 and on data line 2310 at voltage changes 2350.

Figure 24:
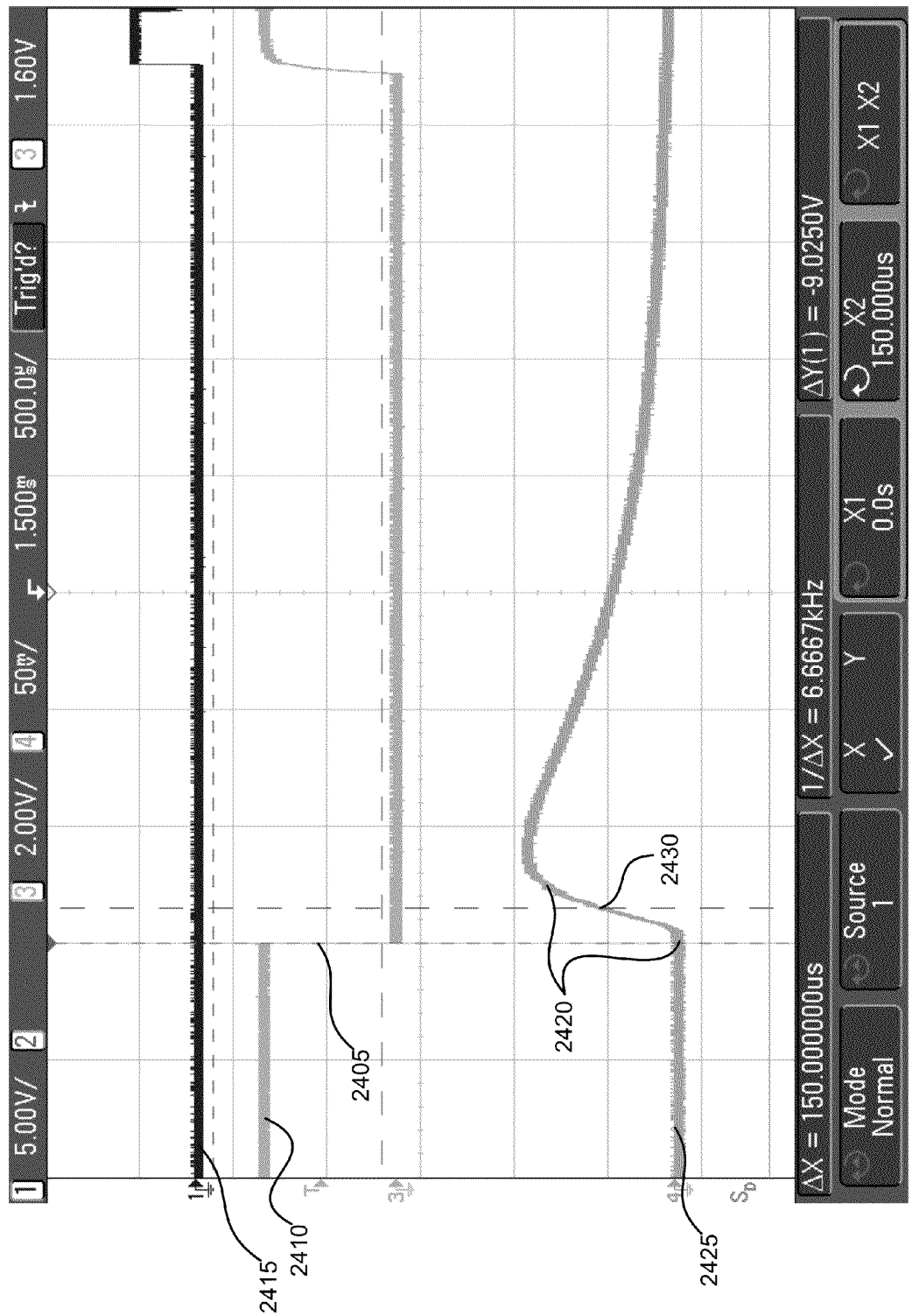
FIG. 24 illustrates yet another set of timing plots for yet another exemplary image acquisition.

FIG. 24 illustrates another set of timing plots for yet another exemplary image acquisition. This image acquisition utilized a prediction of the first shutter blade movement stop time 2405 (seen as X-sync start on X-sync line 2410) from a magnet release signal detected from clock line 2415, as discussed in various examples above. From the determination of when the first shutter blade would stop moving a zero calibration was applied. This resulted in light emission initiation of a lighting device occurring at time 2420. As seen on timing plot 2425 of the light emission intensity over time, light emission initiation 2420 occurred approximately at the same time as the first shutter blade stopping movement (as opposed to prior to this time). Timing plot 2425 also shows a theoretically derived initial critical point 2430 for the light emission profile.

Figure 25:
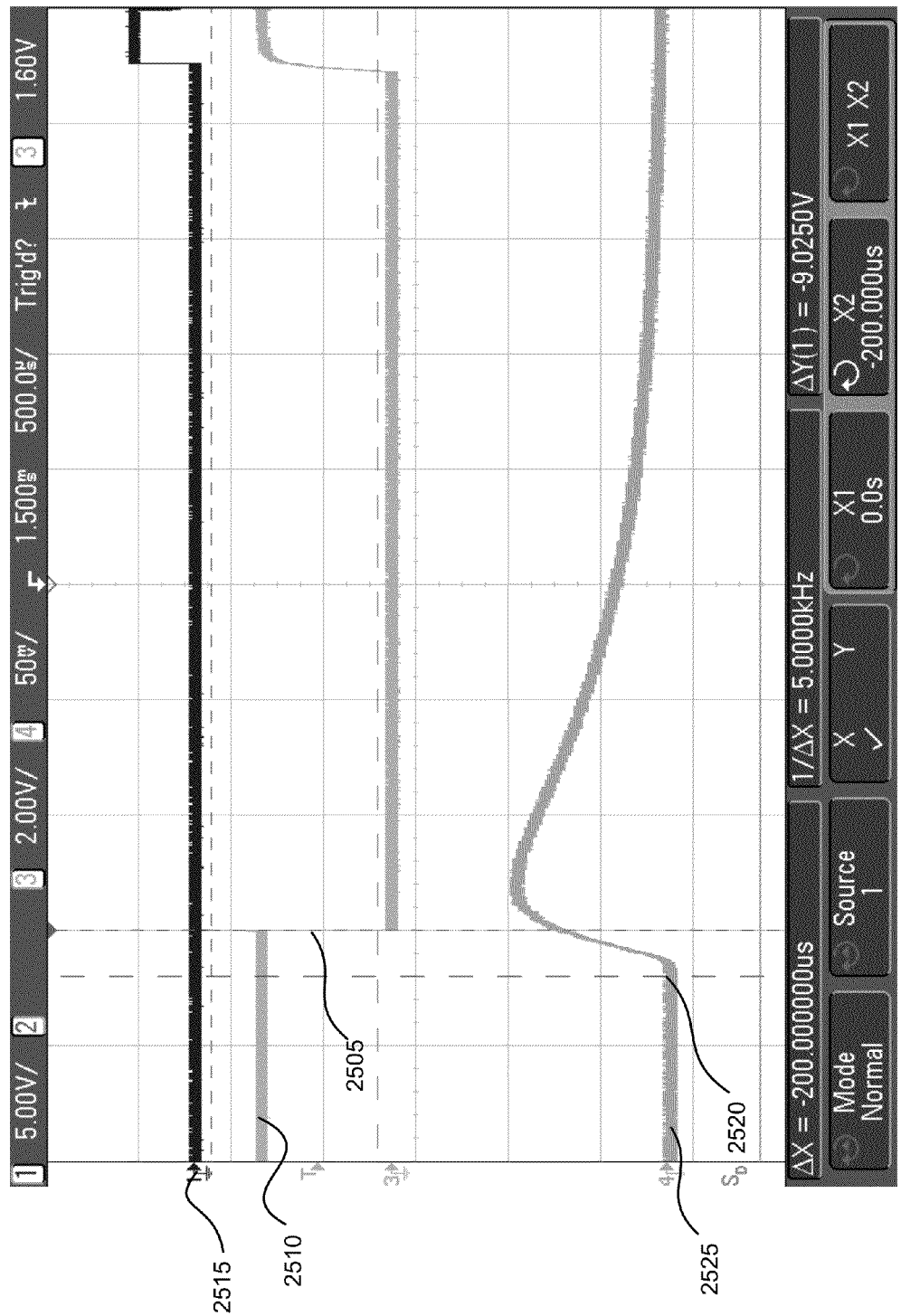
FIG. 25 illustrates another set of timing plots for still another exemplary image acquisition.

FIG. 25 illustrates another set of timing plots for still another exemplary image acquisition. This image acquisition utilized a prediction of the first shutter blade movement stop time 2505 (seen as X-sync start on X-sync line 2510) from a magnet release signal detected from clock line 2515. From the determination of when the first shutter blade would stop moving a calibration of 200 microseconds applied. This resulted in light emission initiation of a lighting device occurring at time 2520. As seen on timing plot 2525 of the light emission intensity over time, light emission initiation 2520 occurred before the first shutter blade stopped movement (by approximately 200 microseconds).

Figure 26:
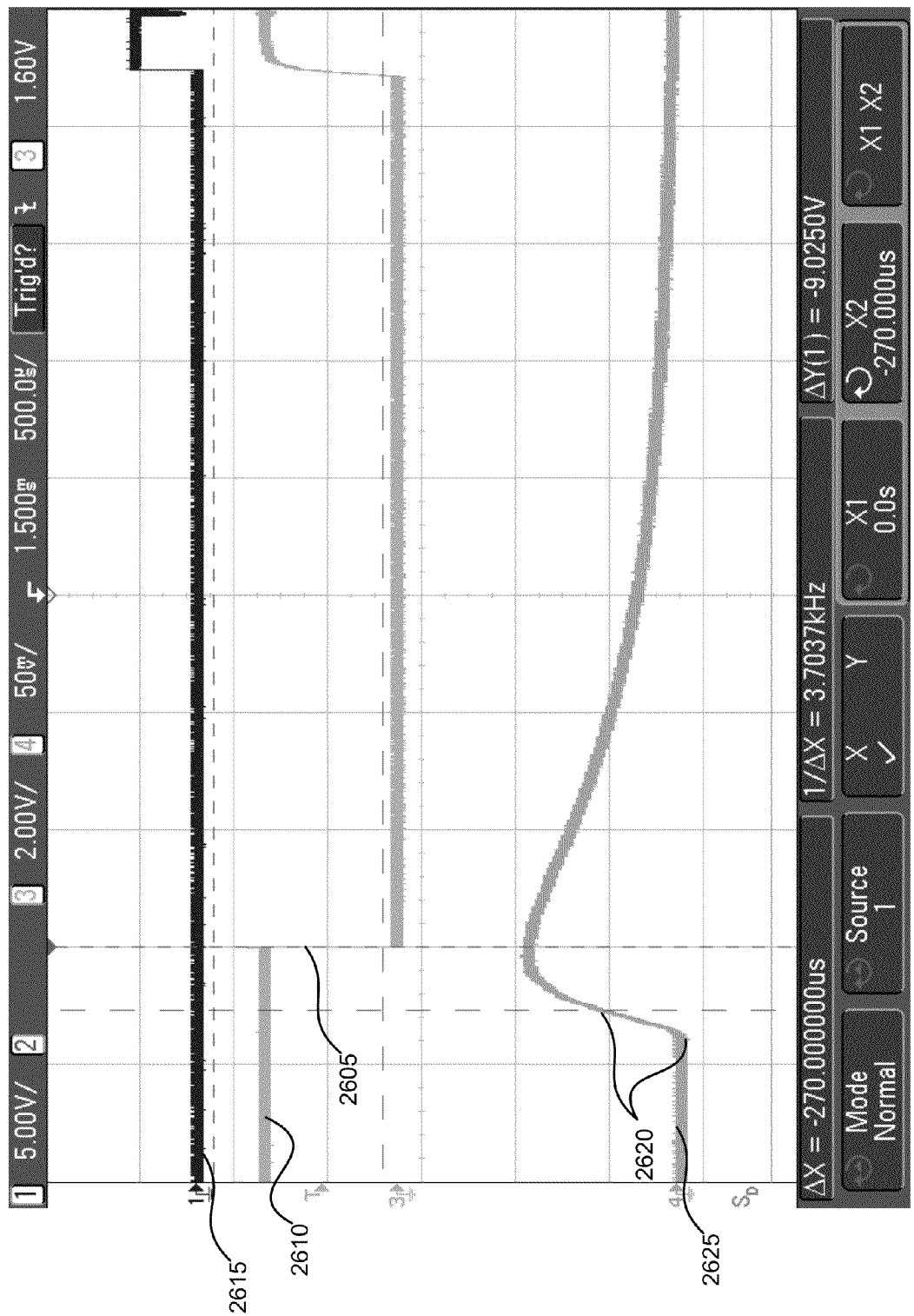
FIG. 26 illustrates another set of timing plots for still another exemplary image acquisition.

FIG. 26 illustrates another set of timing plots for still another exemplary image acquisition. This image acquisition utilized a prediction of the first shutter blade movement stop time 2605 (seen as X-sync start on X-sync line 2610) from a magnet release signal detected from clock line 2615. From the determination of when the first shutter blade would stop moving a calibration of 400 microseconds applied. This resulted in light emission initiation of a lighting device occurring at time 2620. As seen on timing plot 2625 of the light emission intensity over time, light emission initiation 2620 occurred before the first shutter blade stopped movement (by approximately 400 microseconds).

Figure 27:
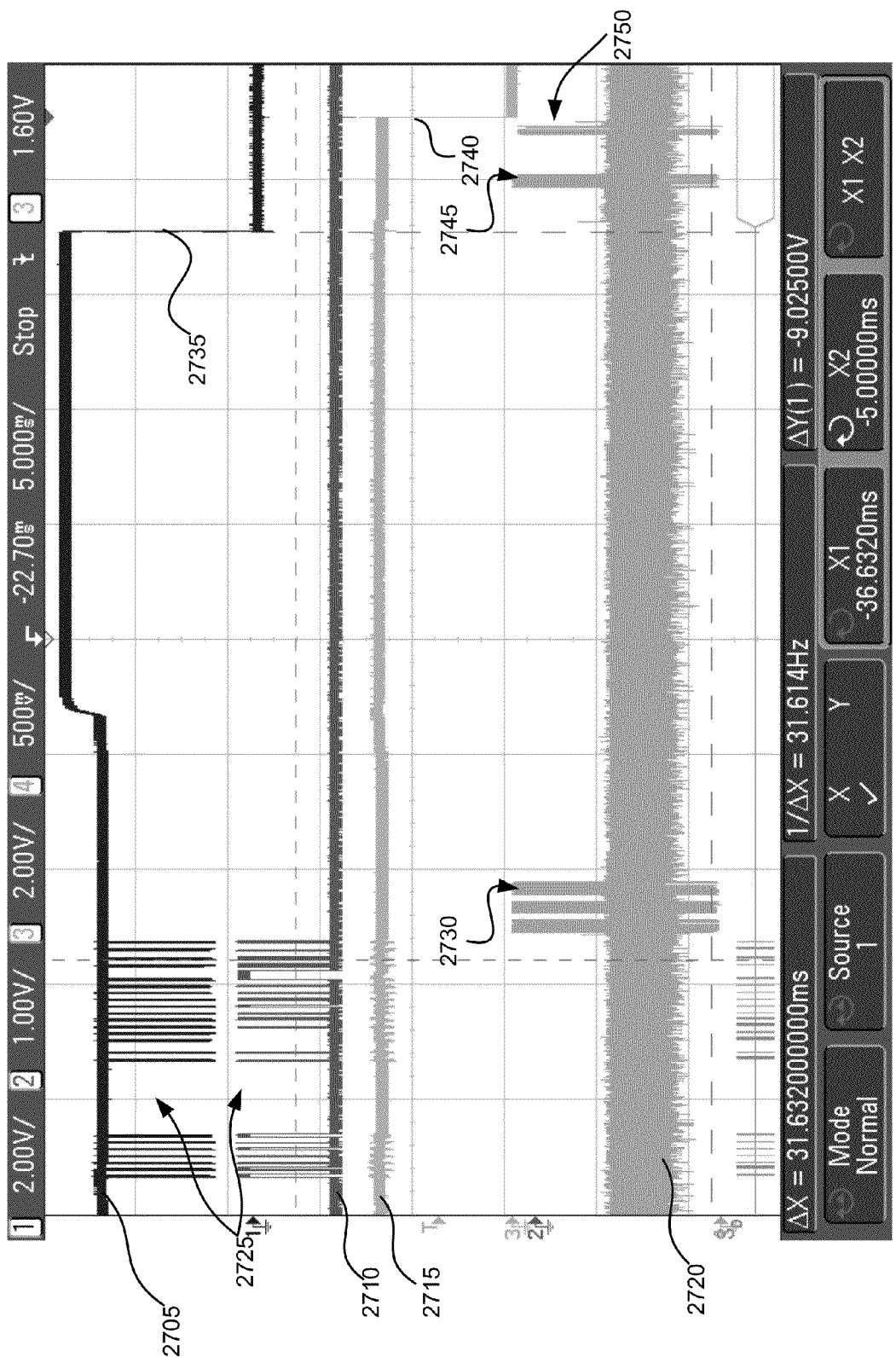
FIG. 27 illustrates another set of timing plots for still yet another exemplary image acquisition.

FIG. 27 illustrates another set of timing plots for still yet another exemplary image acquisition. These timing plots include a timing plot 2705 of a camera clock line, a timing plot 2710 of a camera data line, a timing plot 2715 of a camera X-sync line, and a timing plot 2720 representing radio frequency signal over time of wireless transmissions associated with image acquisition and the synchronization of a remote lighting device having a wireless communication functionality equipped with an early synchronization system (such as system 1300) and another remote lighting device having a wireless communication functionality configured only to initiate light emission upon reception of traditional synchronization signal. In this exemplary implementation, TTL command data pulses 2725 were detected. Power control information was transmitted via radio frequency to one or more of the remote devices as shown by RF pulses 2730. Pulses 2725 were also used to determine that the next full voltage drop on line 2705 would represent a predictor signal (in this case a magnet release signal) as shown by the voltage drop 2735. The known time to time when the first shutter blade stopped movement (indicated by voltage drop 2740) and a calibration value was utilized to determine when light emission initiation should occur. The time to transmit radio frequency to the remote devices was utilized to determine a timing code to be wirelessly transmitted to the wireless reception device capable of managing early synchronization data. For example, if the time to first shutter blade stopping movement 5 milliseconds (ms), the calibration value is 400 microseconds, and the time to transmit via RF is 500 microseconds, the RF transmission to the remotes would need to occur at approximately 4.1 milliseconds from the detected predictor signal. In another example (as illustrated in FIG. 27), a timing code delay feature can be utilized. A timing code delay feature can instruct the receiving wireless device to delay for a period of time from receipt before generating a light emission initiation signal to the flash device. The receiving wireless device has appropriate circuitry and/or machine readable instructions to perform such a delay upon instruction from the timing code. In such an example (using the numbers from above) the camera-side wireless device can transmit the timing code earlier than above and still have the light emission initiate at the proper time. For example, a timing code delay of 2 milliseconds would allow the RF signal to be transmitted at approximately 2.1 milliseconds from the detected predictor signal. It is noted that this example does not take into account circuitry delay at the receiving end. It is contemplated that a receiving wireless device/early flash synchronizing device and/or the camera-side wireless device may include circuitry, memory, and/or instructions for factoring in known delays due to circuitry transmission. In one exemplary aspect, transmitting an RF timing code with delay information early can allow for multiple RF transmissions (e.g., for multiple zoned remotes, different types of remotes, etc.) with appropriately varied delays prior to the desired light emission initiation time. Referring again to the example shown in FIG. 27, an RF pulse 2745 was transmitted with a timing code delay to a remote configured to manage the delay data. A second RF pulse 2750 was transmitted at a time that would have the light emission initiation from a remote flash with a standard reception device occur at the desired initiation time (e.g., transmitted approximately 4.1 milliseconds from the detected predictor signal, using the above example theoretical timing data). In this way, multiple types of reception devices may be utilized to synchronize light emission initiation.

Figure 28A:
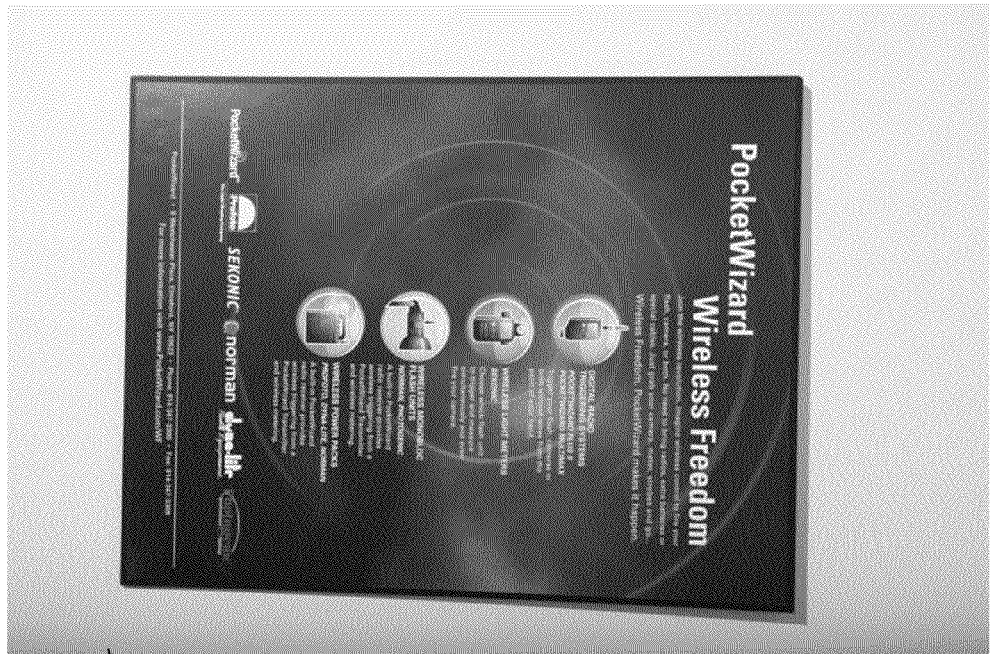
FIG. 28A illustrates a photograph acquired using flash photography with a shutter speed of the $1/200^{th}$ of a second.
Figure 28B:
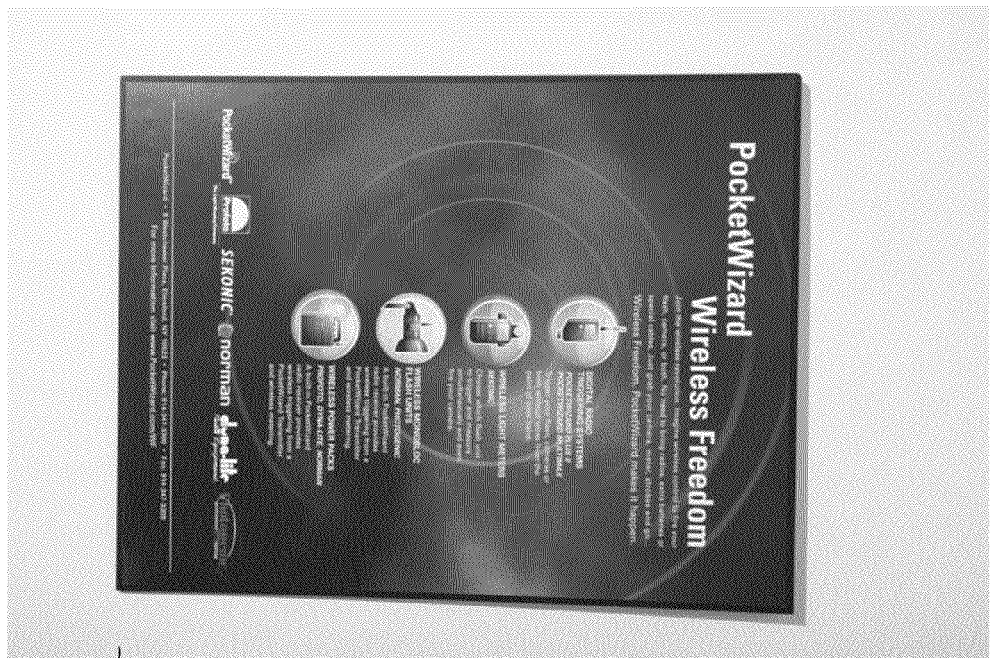
FIG. 28B illustrates a photograph acquired using a flash photography with a shutter speed of $1/200^{th}$ of a second with initiation of light emission after the first shutter blade has moved to apposition that begins to allow light to pass to the imaging sensor and before the first shutter blade stops movement.

FIG. 28A illustrates a photograph 2805 acquired using flash photography with a shutter speed of $1/200^{th}$ of a second using a radio frequency wireless system to synchronize a flash device with the X-sync signal. FIG. 28B illustrates a photograph 2810 acquired using flash photography with a shutter speed of $1/200^{th}$ of a second using a radio frequency wireless system configured to initiate light emission after the first shutter blade has moved to a position that begins to allow light to pass to the imaging sensor and before the first shutter blade stops movement.

Figure 29A:
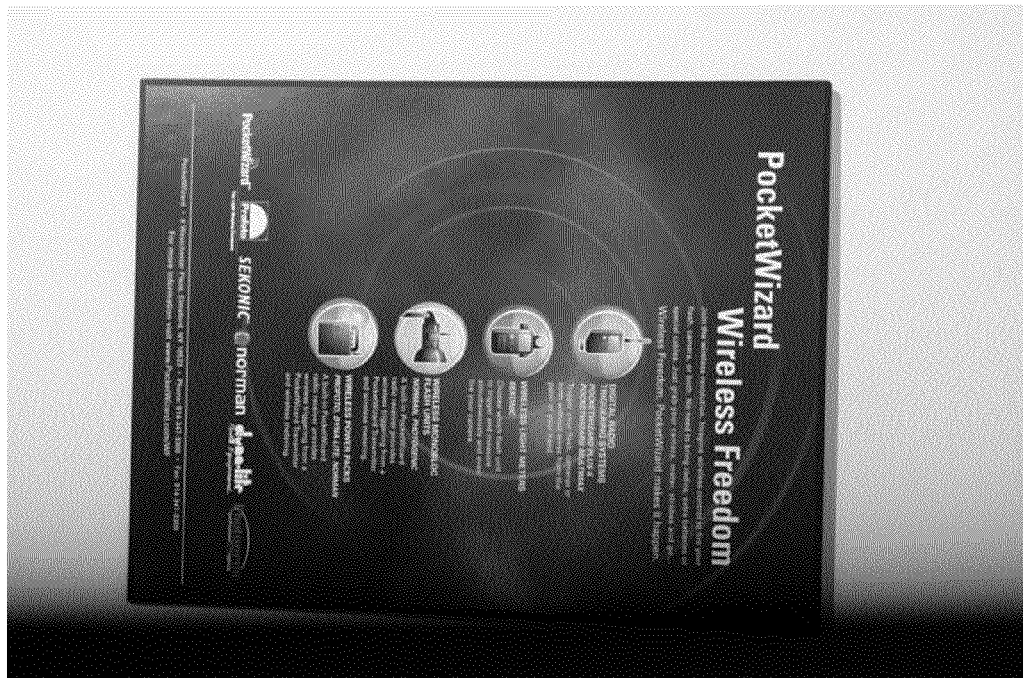
FIG. 29A illustrates a photograph acquired using flash photography with a shutter speed of the $1/250^{th}$ of a second.
Figure 29B:
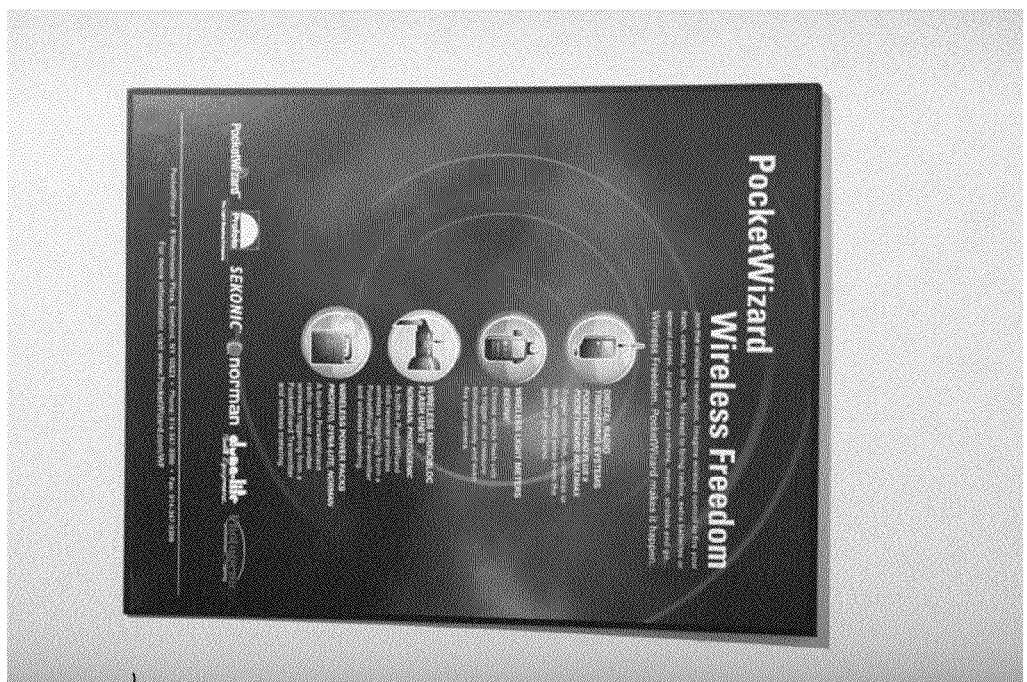
FIG. 29B illustrates a photograph acquired using a flash photography with a shutter speed of $1/250^{th}$ of a second with initiation of light emission after the first shutter blade has moved to apposition that begins to allow light to pass to the imaging sensor and before the first shutter blade stops movement.

FIG. 29A illustrates a photograph 2905 acquired using flash photography with a shutter speed of $1/250^{th}$ of a second using a radio frequency wireless system to synchronize a flash device with the X-sync signal. FIG. 29B illustrates a photograph 2910 acquired using flash photography with a shutter speed of $1/250^{th}$ of a second using a radio frequency wireless system configured to initiate light emission after the first shutter blade has moved to a position that begins to allow light to pass to the imaging sensor and before the first shutter blade stops movement.

Figure 30A:
FIG. 30A illustrates a photograph acquired using flash photography with a shutter speed of the $1/320^{th}$ of a second.
Figure 30B:
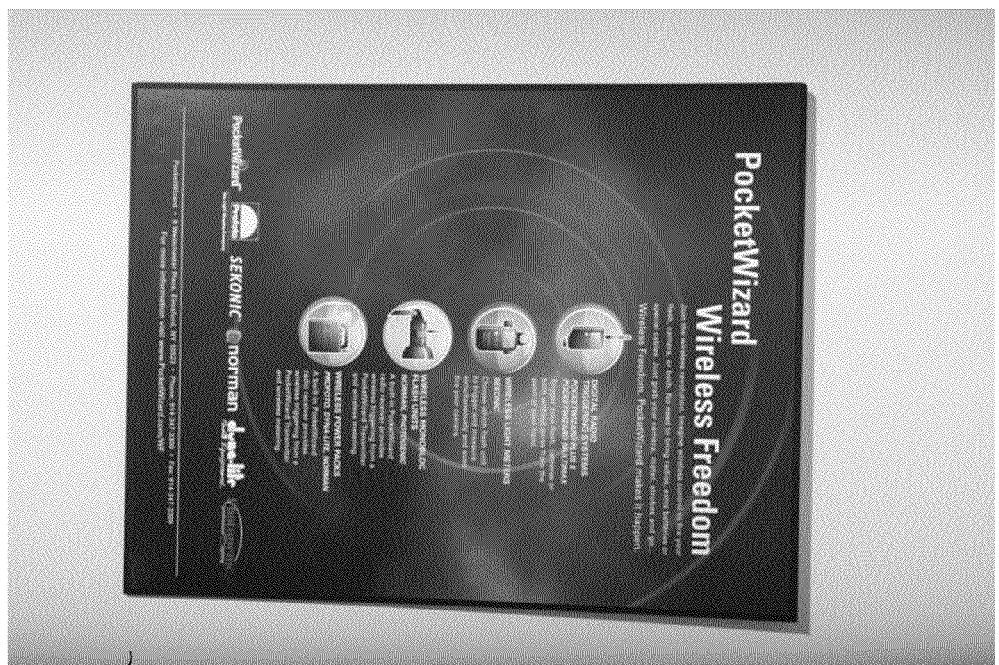
FIG. 30B illustrates a photograph acquired using a flash photography with a shutter speed of $1/320^{h}$ of a second with initiation of light emission after the first shutter blade has moved to apposition that begins to allow light to pass to the imaging sensor and before the first shutter blade stops movement.

FIG. 30A illustrates a photograph 3005 acquired using flash photography with a shutter speed of $1/320^{th}$ of a second using a radio frequency wireless system to synchronize a flash device with the X-sync signal. FIG. 30B illustrates a photograph 3010 acquired using flash photography with a shutter speed of $1/320^{th}$ of a second using a radio frequency wireless system configured to initiate light emission after the first shutter blade has moved to a position that begins to allow light to pass to the imaging sensor and before the first shutter blade stops movement.

Figure 31A:
FIG. 31A illustrates a photograph acquired using flash photography with a shutter speed of the $1/400^{th}$ of a second.
Figure 31B:
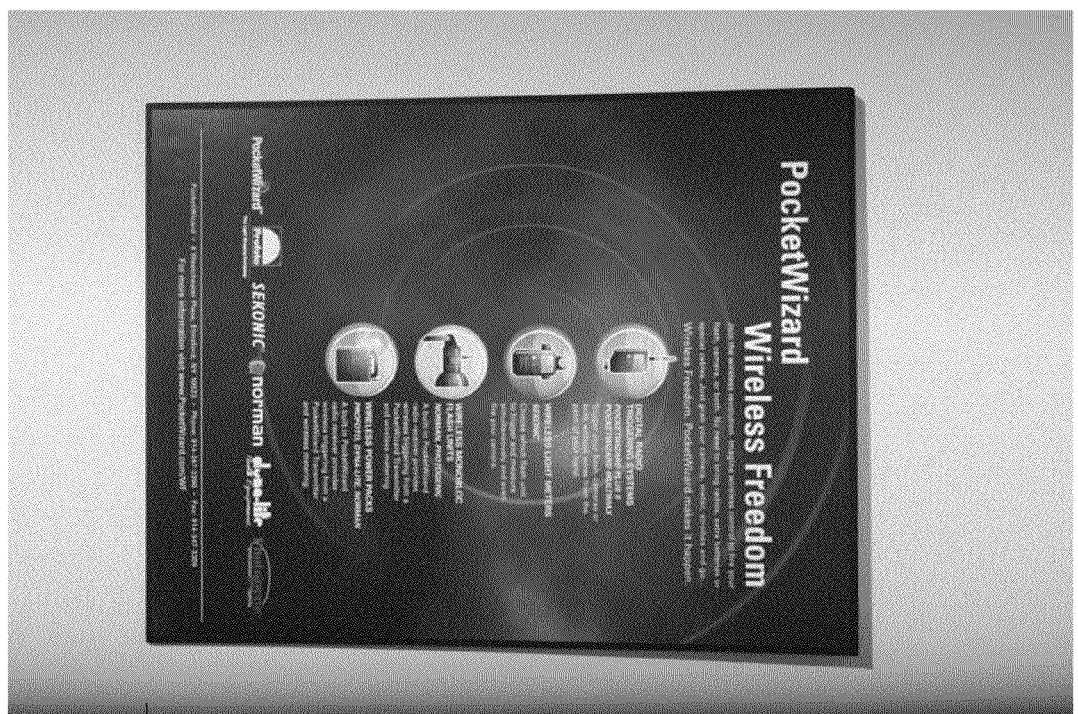
FIG. 31B illustrates a photograph acquired using a flash photography with a shutter speed of $1/400^{th}$ of a second with initiation of light emission after the first shutter blade has moved to apposition that begins to allow light to pass to the imaging sensor and before the first shutter blade stops movement.

FIG. 31A illustrates a photograph 3105 acquired using flash photography with a shutter speed of $1/400^{th}$ of a second using a radio frequency wireless system to synchronize a flash device with the X-sync signal. FIG. 31B illustrates a photograph 3110 acquired using flash photography with a shutter speed of $1/400^{th}$ of a second using a radio frequency wireless system configured to initiate light emission after the first shutter blade has moved to a position that begins to allow light to pass to the imaging sensor and before the first shutter blade stops movement.

Figure 32A:
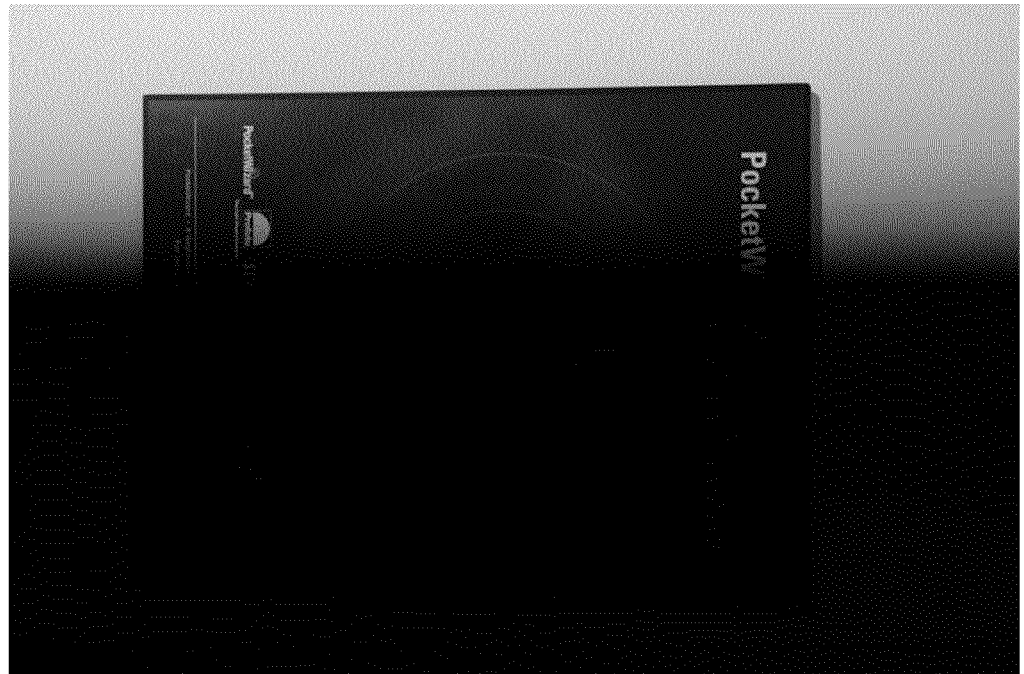
FIG. 32A illustrates a photograph acquired using flash photography with a shutter speed of the $1/500^{th}$ of a second.
Figure 32B:
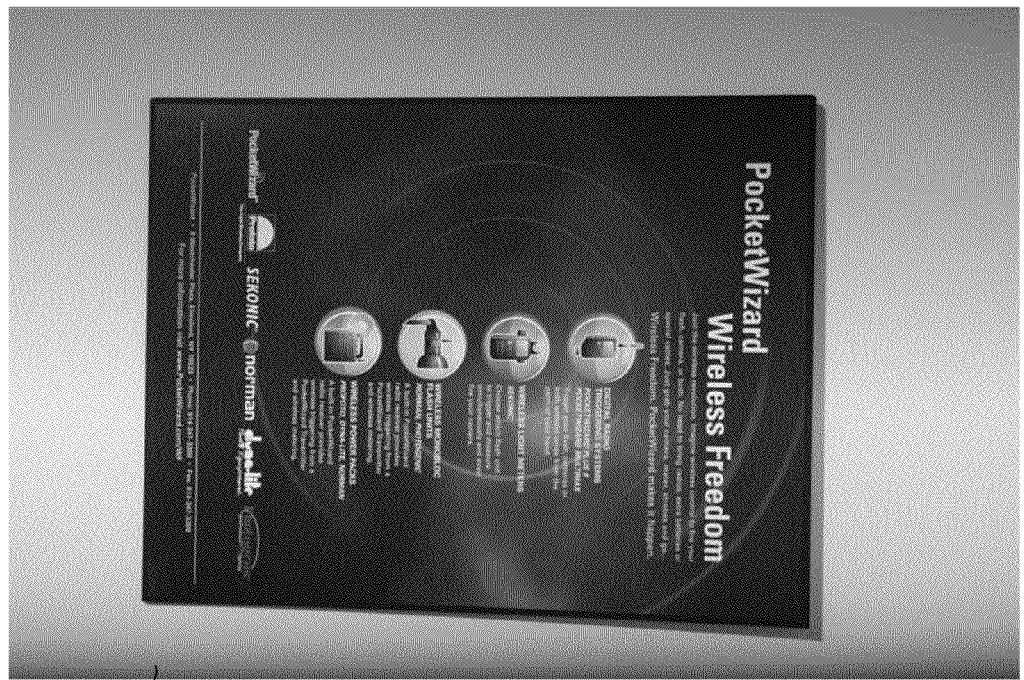
FIG. 32B illustrates a photograph acquired using a flash photography with a shutter speed of $1/500^{th}$ of a second with initiation of light emission after the first shutter blade has moved to apposition that begins to allow light to pass to the imaging sensor and before the first shutter blade stops movement.

FIG. 32A illustrates a photograph 3205 acquired using flash photography with a shutter speed of $1/500^{th}$ of a second using a radio frequency wireless system to synchronize a flash device with the X-sync signal. FIG. 32B illustrates a photograph 3210 acquired using flash photography with a shutter speed of $1/500^{th}$ of a second using a radio frequency wireless system configured to initiate light emission after the first shutter blade has moved to a position that begins to allow light to pass to the imaging sensor and before the first shutter blade stops movement.

FIGS. 28A, 29A, 30A, 31A, and 32A show an increasing level of "clipping" (image darkening at one edge as the shutter speed becomes faster. At $1/200^{th}$ of a second, the standard X-sync shows a bit of clipping, which may be acceptable (e.g., cropping may eliminate the darkening at the bottom of the image). However, at $1/250^{th}$ of a second and faster, the standard X-sync shows much greater levels of clipping. In contrast, FIGS. 28B, 29B, 30B, 31B, and 32B illustrate examples of much higher performance at higher sync speeds using an exemplary process of early synchronization with detection of a predictor signal and initiation of light emission after the first shutter blade has moved to a position that begins to allow light to pass to the imaging sensor and before the first shutter blade stops movement. The level of visually detectable darkening at the edges is not serious until $1/400^{th}$ and faster. This clipping could possibly be calibrated out of the images by adjusting the calibration offset value.

Figure 33:
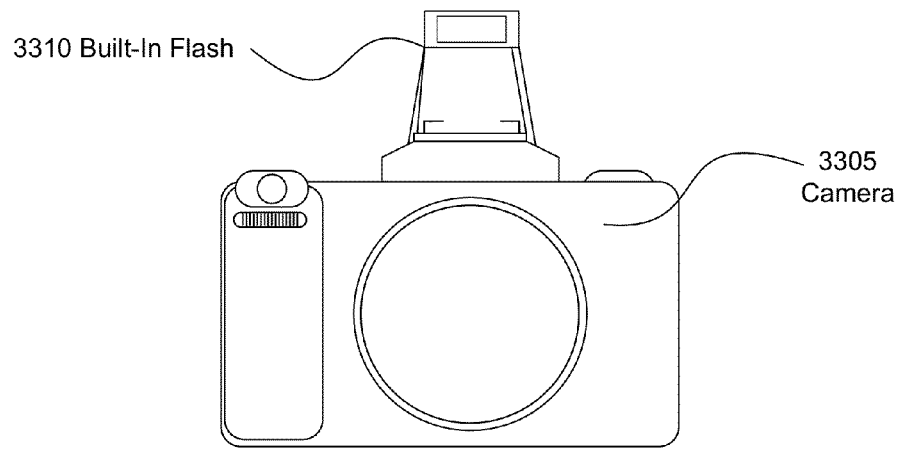
FIG. 33 illustrates one example of a camera having a built-in flash device.

FIG. 33 illustrates one example of a camera 3305 having a built-in flash device 3310. In one exemplary implementation, camera 3305 may include appropriate circuitry and/or instructions capable of execution by one or more circuit elements of camera 3305 that generate a light emission initiation signal such that light is emitted by flash device 3310 after a first shutter blade of camera 3305 has begun to allow light to pass to an imaging sensor of camera 3305 but before the first shutter blade stops movement. The circuitry and/or instructions may also be configured to implement any one or more of the other aspects of the implementation and embodiments described herein.

Figure 34:
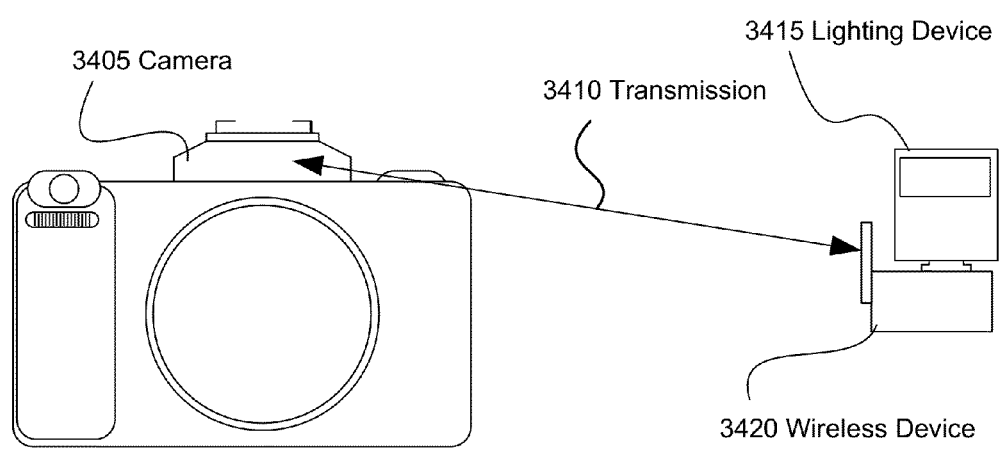
FIG. 34 illustrates one example of a camera having a built-in radio frequency wireless transceiver.

FIG. 34 illustrates one example of a camera 3405 having a built-in radio frequency wireless transceiver (not shown). The transceiver may be utilized to wirelessly communicate with one or more remote devices via a radio frequency transmission, such as transmission 3410. A remote lighting device 3415 is shown. Remote lighting device 3415 is an example of a hot shoe mountable speedlight flash device. The built-in transceiver of camera 3405 may be utilized to wirelessly communicate with remote lighting device 3415 and/or one or more other types of lighting devices (e.g., one or more other hot shoe mountable lights, one or more studio strobe lighting devices). Remote lighting device 3415 is shown connected to an external wireless device 3420. It is contemplated that any one or more remote devices may include an internal wireless functionality. In one exemplary implementation camera 3405 may include appropriate circuitry and/or instructions capable of execution by one or more circuit elements of camera 3405 that generate a light emission initiation signal such that the light emission initiation signal is wirelessly transmitted to wireless device 3420 for communication to lighting device 3415 such that light emission is initiated by lighting device 3415 after a first shutter blade of camera 3405 has begun to allow light to pass to an imaging sensor of camera 3405 but before the first shutter blade stops movement. In another exemplary implementation, camera 3405 may include appropriate circuitry and/or instructions capable of execution by one or more circuit elements of camera 3405 (e.g., circuitry and/or machine executable instruction associated with the internal wireless capability of camera 3405) that detect a predictor signal and/or a predictor event of camera 3405 from which the time to the first shutter blade stopping movement can be determined. Using the predictor signal and/or predictor event, a light emission initiation signal can be generated such that light emission initiates after the first shutter blade begins to allow light to pass to an imaging sensor but before the first shutter blade stops movement. Additional aspects and embodiments of using a predictor signal and/or a predictor event are discussed above. The circuitry and/or instructions may also be configured to implement any one or more of the other aspects of the implementations and embodiments described herein.

Figure 35:
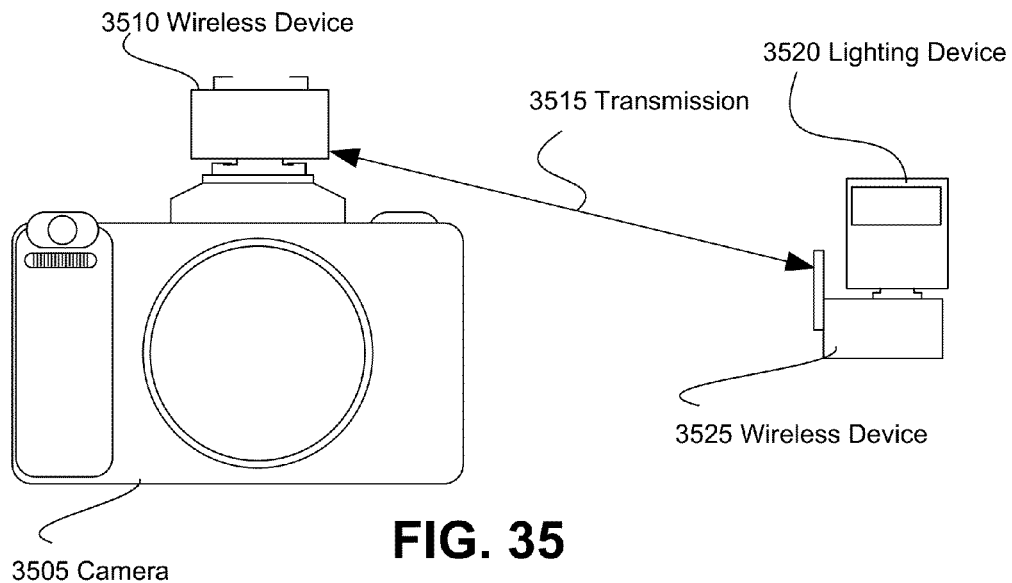
FIG. 35 illustrates on example of a camera having an external wireless device connected via a hot shoe connector of the camera.

FIG. 35 illustrates one example of a camera 3505 having an external wireless device 3510 connected via a hot shoe connector of camera 3505. External wireless devices are known. In one aspect, an external wireless device may be configured to communicate data (e.g., camera and/or flash data) to and/or from a camera via one or more of the contacts of a hot shoe connector. Examples of external wireless devices configured for connection to a camera hot shoe and methodologies for communicating via a hot shoe connector are discussed in further detail in copending U.S. patent application Ser. No. 12/129,402, filed on May 29, 2008, the disclosure of which is incorporated herein by reference in its entirety.

Camera 3505 may utilize wireless device 3510 to wirelessly communicate via a wireless transmission, such as transmission 3515, with one or more remote devices. A remote lighting device 3520 is shown connected via a hot shoe connector to a wireless device 3525. As discussed above, a camera may communicate with one or more remote lighting devices for synchronizing the one or more lighting devices to image acquisition. The one or more remote lighting devices may each include an external wireless functionality, an internal wireless functionality, or any combination thereof. In one exemplary implementation, camera 3505 (and/or wireless device 3510) may include appropriate circuitry (and/or instructions capable of execution by one or more circuit elements) that generate a light emission initiation signal such that the light emission initiation signal is wirelessly transmitted to wireless device 3525 for communication to lighting device 3520 such that light emission is initiated by lighting device 3520 after a first shutter blade of camera 3505 has begun to allow light to pass to an imaging sensor of camera 3505 but before the first shutter blade stops movement. In another exemplary implementation, camera 3505 (and/or wireless device 3510) may include appropriate circuitry and/or instructions capable of execution by one or more circuit elements that detect a predictor signal and/or a predictor event of camera 3505 from which the time to the first shutter blade stopping movement can be determined. Using the predictor signal and/or predictor event, a light emission initiation signal can be generated such that light emission initiates after the first shutter blade begins to allow light to pass to an imaging sensor but before the first shutter blade stops movement. Additional aspects and embodiments of using a predictor signal and/or a predictor event are discussed further above. The circuitry and/or instructions may also be configured to implement any one or more of the other aspects of the implementation and embodiments described herein.

Figure 36:
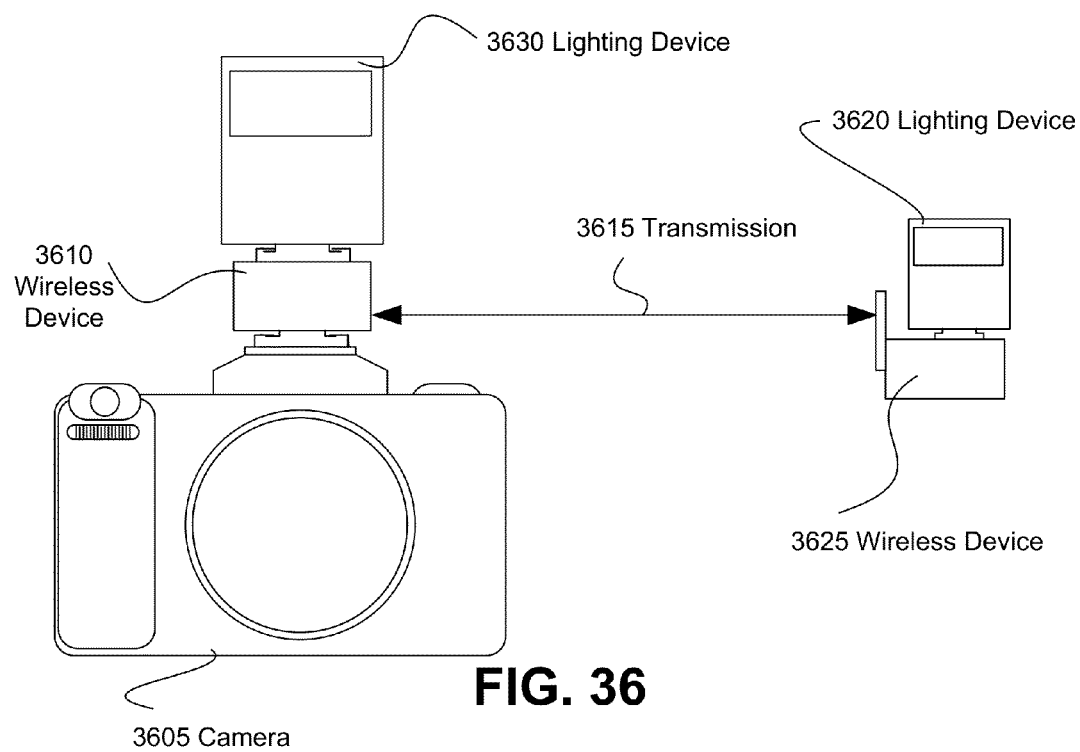
FIG. 36 illustrates another example of a camera having an external wireless device connected via a hot shoe connector.

FIG. 36 illustrates one example of a camera 3605 having an external wireless device 3610 connected via a hot shoe connector. Camera 3605 may utilize wireless device 3610 to wirelessly communicate (e.g., via a transmission 3615) to one or more remote lighting devices 3620 having a wireless functionality 3625 (e.g., an internal wireless functionality and/or external wireless functionality, as shown). A hot shoe mountable flash device 3630 is connected to a second hot shoe connector of wireless device 3610. In one exemplary implementation, one or more remote lighting devices 3620 and/or flash device 3630 may have associated light emission initiated after a first shutter blade of camera 3605 begins to allow light to pass to an imaging sensor of camera 3605 but before the first shutter blade stops movement. In one such implementation, wireless device 3610 may include appropriate circuitry (and/or instructions capable of execution by one or more circuit elements) that detect a signal and/or event of camera 3605 from which the timing of initiation of the light emission can be determined and an initiation signal generated accordingly. The initiation signal may then be utilized to initiate a light emission by one or more lighting devices 3620 and/or flash device 3630. Additional aspects and embodiments of using a predictor signal and/or a predictor event are discussed above. The circuitry and/or instructions may also be configured to implement any one or more of the other aspects of the implementation and embodiments described herein.

Figure 37:
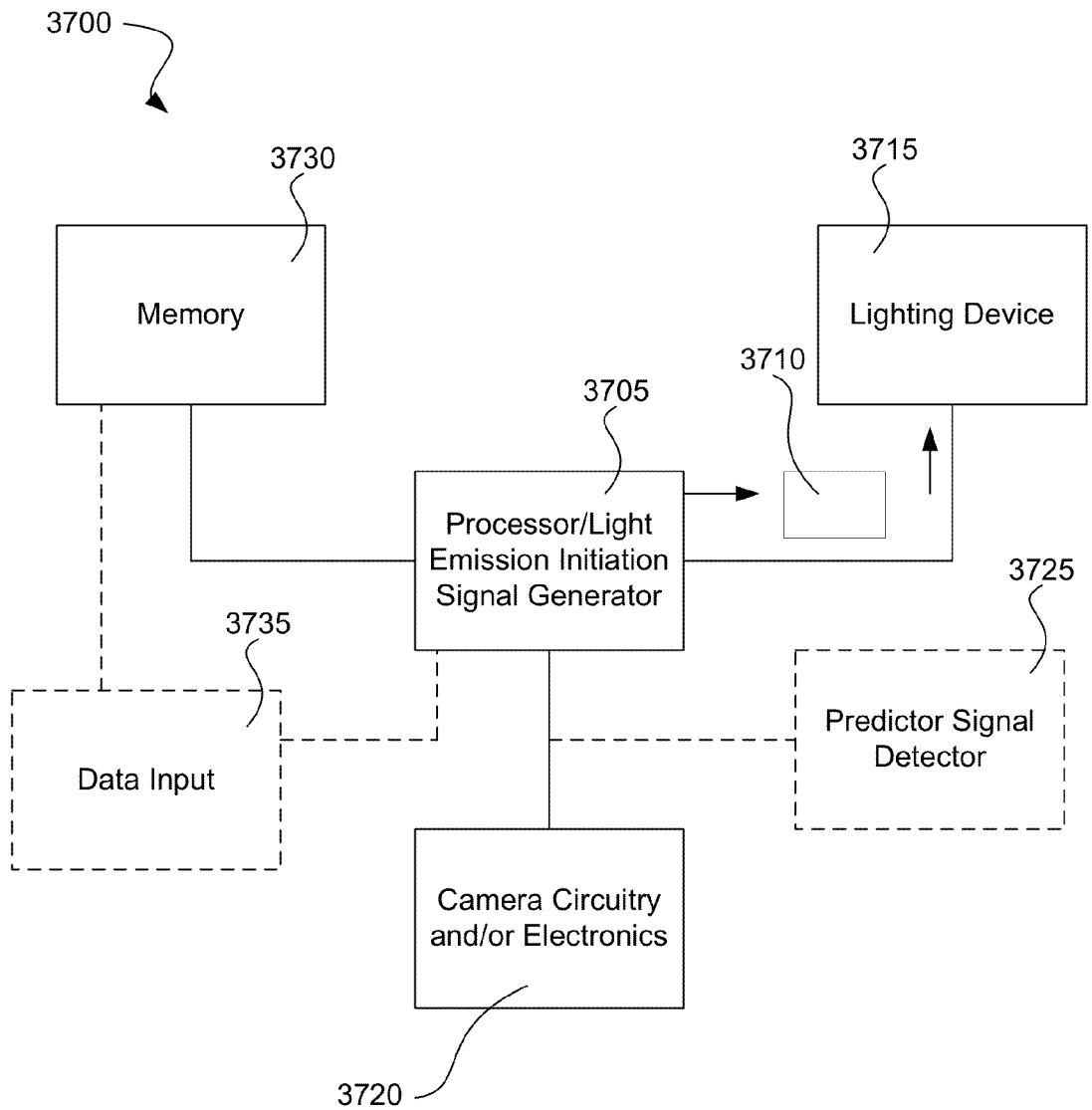
FIG. 37 illustrates an exemplary early synchronizer system.

FIG. 37 illustrates an exemplary early synchronizer system 3700. In one exemplary aspect, early synchronizer system 3700 may provide an ability to initiate light emission at a time after a first shutter blade of a camera moves such that light begins to be allowed to pass to an imaging sensor of the camera and before the first shutter blade of the camera stops movement. In one example, early synchronizer system 3700 includes one or more components that are internal to a camera. In another example, one or more components of early synchronizer system 3700 may be added to a camera that does not already have an ability to initiate light emission at a time after a first shutter blade of the camera moves such that light begins to be allowed to pass to an imaging sensor of the camera and before the first shutter blade of the camera stops movement. In yet another example, early synchronizer system 3700 includes one or more components that are part of a photographic wireless communication device (e.g., a transmitter, receiver, and/or transceiver associated with a camera and/or one or more remote devices). In one such example, at least a portion of the photographic wireless communication device is internal to a camera. In another such example, at least a portion of the photographic wireless communication device is external to a camera.

Early synchronizer system 3700 includes a processor 3705. Processor 3705 may be a shared processing element. In one example, processor 3705 is shared with other functionality of a camera. In another example, processor 3705 is shared with other functionality of a photographic wireless communication device. One of the functionalities of processor 3705 may include generation of a light emission initiation signal 3710 for initiating light emission of one or more lighting devices 3715. In an alternative implementation, early synchronizer system 3700 may include a light emission initiation signal generator separate from processor 3705. Processor 3705 is configured to be in electrical communication with circuitry and/or electronics 3720 of a camera. In one example, processor 3705 is connected electrically (e.g., via electrical wiring and/or other electrical contacts) to circuitry and/or electronics 3720. In another example, processor 3705 is connected to one or more connectors (not shown) that are configured to be connected to circuitry and/or electronics 3720 of a camera. Connectors for electrically connecting an external device to internal circuitry and/or electronics of a camera are known. Examples of such connectors include, but are not limited to, a flash synchronization connector, a hot shoe connector, a PC flash synchronization connector (note the term PC as used in this example refers to the photographic industry standard "PC connector" and not to a "personal computer"); a Universal Serial Bus ("USB") connector, a FireWire connector, a connector proprietary to a given camera manufacturer, a motor-drive connector, and any combinations thereof.

Early synchronization system 3700 may optionally include a predictor signal detector 3725 electrically connected and/or configured to be electrically connected to circuitry and/or electronics 3720 for detecting (e.g., receiving) a predictor signal and/or an indication of a predictor event of the camera. Predictor signal detector 3725 may include circuitry and/or machine executable instruction configured to detect the predictor signal and/or event and communicate the detection to processor 3705 and/or other light emission initiation signal generator functionality. In one example, predictor signal detector 3725 includes a threshold comparator. In another example, predictor signal detector 3725 includes an input/output (I/O) port of a processor element (e.g., processor element 3705. In one such example, at least a portion of predictor signal detector 3725 may share common components with processor 3705.

Early synchronization system 3700 includes a memory 3730. Memory 3730 may be any memory device capable of storing data and/or other information. Examples of a memory device include, but are not limited to, a random access memory, a read only memory, a flash memory, a hard-drive memory device, an optical memory device, and any combinations thereof. Memory 3730 is shown in electrical communication with processor 3705. In an alternative implementation
memory 3730 may be directly and/or indirectly in electrical communication with (and/or be configured to be electrically connected to) any one or more additional components of early synchronization system 3700 that may require information storage capability. Memory 3730 is shown as a separate component. It is contemplated that memory 3730 and/or any other component of early synchronization system 3700 may have any portion thereof shared with another component. It is also contemplated that memory 3730 and/or any other component of early synchronization system 3700 may also be divided into more than one component element. Memory 3730 may include information (e.g., in one or more tables) for example, but not limited to, calibration time values, other calibration values not in time increments, data related to a camera model, data related to the time between a predictor signal and/or event and the time of the first shutter blade stopping movement, one or more time delay factors, other calibration values as discussed above, shutter speed correlations, information related to instructions for initiating light emission after the first shutter blade begins to expose the image acquisition sensor to light and before X-sync associated with the first shutter blade stopping movement, and any combinations thereof.

Early synchronization system 3700 may optionally include one or more data inputs 105. One or more data inputs 105 may be in electrical communication and/or be configured to be electrically connected to processor 3705, memory 3730, and/or other components of early synchronization system 3700. Example data inputs include, but are not limited to, a dial, a trigger, a touch screen, a USB connector, another data connector, and any combinations thereof. In one example, a USB connector may connect to a computing device (e.g., a general computing device, such as a laptop or desktop computer) having thereon a software program for interfacing with early synchronization system 3700. In one such example, the software program may provide a graphical user interface for inputting data (e.g., calibration time values, other calibration values not in time increments, data related to a camera model, data related to the time between a predictor signal and/or event and the time of the first shutter blade stopping movement, one or more time delay factors, etc.). Such data may be stored in memory 3730.

One or more data inputs 3735 may be accompanied by a data/information output (not shown) for conveying information from system 3700 (e.g., to a user). Examples of a data/information output include, but are not limited to, an LED, an LCD, a display screen, an audio device, and any combinations thereof.

Figure 38:
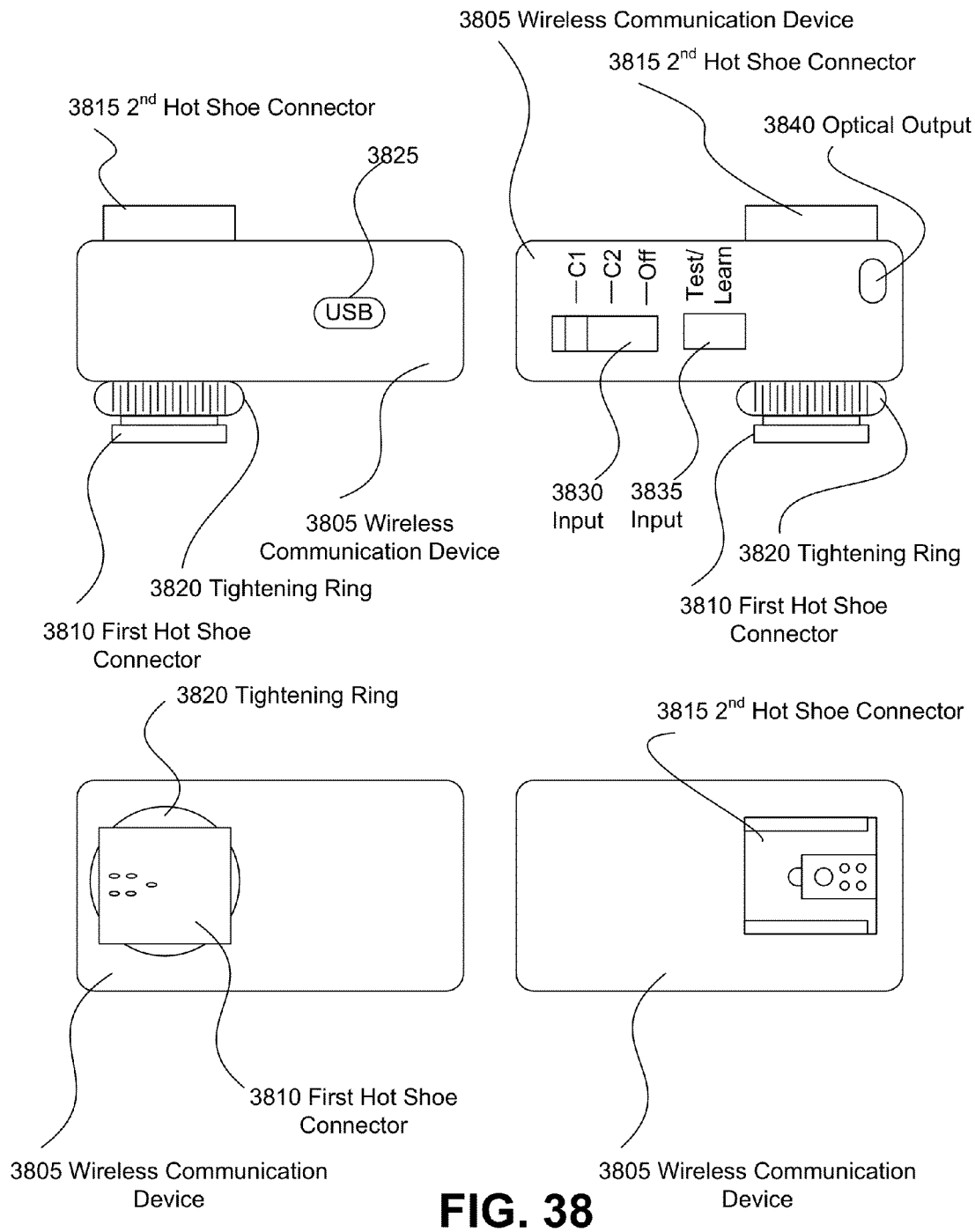
FIG. 38 illustrates multiple views of an exemplary photographic wireless communication device.

FIG. 38 illustrates multiple views of a photographic wireless communication device 3805. Wireless communication device 3805 includes an internal transmitter component (not shown) for wirelessly transmitting information to one or more remote devices and an internal antenna component (not shown). Wireless communication device 3805 also includes components of an early synchronization system, such as system 3700 of FIG. 37. Wireless communication device 3805 includes a first hot shoe connector 3810 configured to connect to a hot shoe connector of a camera and provide electrical communication with the circuitry and/or electronics of the camera (e.g., communication with data, clock, and/or X-sync signals). Wireless communication device 3805 also includes a second hot shoe connector 3815 configured to allow another device having a hot shoe connector to be connected to the top of wireless communication device 3805. In one example, a speedlight flash device may be connected to hot shoe connector 3815. Wireless communication device 3805 also includes a tightening ring 3820 for securely connecting hot shoe connector 3810 to a corresponding hot shoe of a camera.

Wireless communication device 3805 includes a USB data connector 3825 for inputting and outputting information from wireless communication device 3805 and the early synchronization functionality therein. An input 3830 and an input 3835 provide information input and control to wireless communication device 3805. Wireless communication device 3805 includes an optical output element 3840 for outputting information.

In one exemplary implementation, a predictor signal is detected through one or more of the contacts of hot shoe connector 3810 from a camera connected thereto. Wireless communication device 3805 may also receive via hot shoe connector 3810 data representing the model of the camera and the shutter speed of operation of the camera. A processor of wireless communication device 3805 accesses a memory having a correlation between the data representing the model of the camera and the corresponding time from the predictor signal to the time of the first shutter blade of the camera stopping movement. The processor also accesses the memory for data representing a calibration value for the received shutter speed of operation of the camera. Based on the calibration value, the known time from predictor signal to first shutter blade stopping for the model of camera, and the time of detection of the predictor signal, the processor generates a light emission initiation signal and transmits the signal to one or more wireless reception devices each associated with a remote lighting device. In this example, the processor of wireless communication device 3805 takes into account the time necessary for wireless communication and circuitry communication in generating the light emission initiation signal such that initiation of the light emission will occur at the desired time between the first shutter blade of the camera moving such to allow light to start to pass to the sensor and the first shutter blade stopping movement.

In yet another exemplary implementation, a wireless remote device may be configured to handle varying times between light emission initiation and initial critical point for various lighting devices. In one example, a speedlight may have a time from flash initiation to initial critical point of 40 microseconds and a studio strobe flash may have a time from flash initiation to initial critical point of 100 microseconds. A wireless early synchronization device that is remote from a camera (e.g., has a remote flash device connected thereto) may have a memory with data stored for varying times for varying flashes. For example, when a speedlight is connected (e.g., to a hot shoe connector) the synchronization device may utilize an offset based on a value stored for a speedlight. In another example, when a strobe is connected (e.g., to a miniphone connector) the synchronization device may utilize an offset based on a value stored for a strobe flash. The offsets at the receiver side can be utilized to ensure that when a desired time for light initiation is determined (as discussed above) and transmitted to remote light devices, varying light devices contribute detectable light to the scene at the same time (e.g., their initiation times are offset from each other so that their initial critical points occur at the same time).

In one implementation, a method for synchronizing a photographic lighting device to image acquisition by a camera is provided. The method includes allowing a first shutter blade of the camera to move such that light is allowed to pass to an imaging portion of an image acquisition sensor of the camera; and initiating light emission of the photographic lighting device after the first shutter blade begins to expose the image acquisition sensor to light and before X-sync associated with the first shutter blade stopping movement. In another example, initiating of light emission may occur such that an initial critical point of a flash profile of the photographic lighting device occurs at a point in time after about 1 millisecond before the first shutter blade moves to a position that no longer obstructs light to the imaging portion of the sensor. In another example, initiating of light emission may occur such that an initial critical point of a flash profile of the photographic lighting device occurs at a point in time after about 500 microseconds before the first shutter blade moves to a position that no longer obstructs light to the imaging portion of the sensor. In another example, initiating of light emission may occur such that an initial critical point of a flash profile of the photographic lighting device occurs at a point in time after about 250 microseconds before the first shutter blade moves to a position that no longer obstructs light to the imaging portion of the sensor. In another example, initiating of light emission may occur such that an initial critical point of a flash profile of the photographic lighting device occurs at a point in time after the first shutter blade moves to a position that no longer obstructs light to the imaging portion of the sensor. In another example, initiating of light emission may occur such that an initial critical point of a flash profile of the photographic lighting device occurs at about the time the first shutter blade moves to a position that no longer obstructs light to the imaging portion of the sensor. In another example, initiating of light emission may occur such that an initial critical point of a flash profile of the photographic lighting device occurs before the first shutter blade stops movement. In another example, initiating of light emission may occur such that a terminal critical point of a flash profile of the photographic lighting device occurs less than about 500 microseconds after a second shutter blade of the camera moves to a point where the second shutter blade starts to obstruct light from passing to the imaging portion of the sensor. In another example, initiating of light emission may occur such that a terminal critical point of a flash profile of the photographic lighting device occurs less than about 250 microseconds after a second shutter blade of the camera moves to a point where the second shutter blade starts to obstruct light from passing to the imaging portion of the sensor. In another example, initiating of light emission may occur such that a terminal critical point of a flash profile of the photographic lighting device occurs at about the time that the second shutter blade starts to obstruct light from passing to the sensor In another example, initiating of light emission may occur such that a terminal critical point of a flash profile of the photographic lighting device occurs before the time that the second shutter blade starts to obstruct light from passing to the sensor The method may also include identifying a camera predictor event and/or signal that occurs prior to the first shutter blade of the camera moving to a point that allows light to pass to the sensor, the predictor event and/or signal not being an event or signal for instructing the initiation of light emission from a photographic lighting device, the predictor event and/or signal occurring prior to a normal flash initiation event or signal intended to instruct the light emission of the photographic lighting device; and based upon the occurrence of the predictor event and/or signal, communicating to the photographic lighting device an instruction for the initiating light emission of the photographic lighting device. The identifying may include identifying a camera predictor event and/or signal that is not an event or signal intended for instructing the initiation of an X-sync flash pulse and occurs prior to the time of X-sync. In one example, a camera predictor event and/or signal may be a serial data communication of the camera. In one such example, serial data communication may be a power set command. In another example, a camera predictor event and/or signal may be a drop in a voltage of a clock signal of the camera. In yet another example, a camera predictor event and/or signal may be the initiation of a shutter magnet release signal. In still another example, a camera predictor event and/or signal is the initiation of an FP-synch signal and the initiating light emission does not include an FP-type flash emission. In one example, the communicating may include delivering the instruction internal to the camera to an internal lighting device. In another example, the communicating may include delivering the instruction via a hot shoe connector of the camera to the photographic lighting device, the photographic lighting device being positioned in the hot shoe connector. In still another example, the communicating may include wirelessly transmitting the instruction to the photographic lighting device. In one example, the wirelessly transmitting includes a radio frequency transmission. In another example, the instruction is wirelessly transmitted prior to the first shutter blade moving to a position that no longer obstructs light to the imaging portion of the sensor. In yet another example, the instruction is received by a wireless communications receiver associated with the photographic lighting device prior to the first shutter blade moving to a position that no longer obstructs light to the imaging portion of the sensor. In still another example, the instruction is wirelessly transmitted prior to the occurrence of the normal flash initiation event or signal. In still yet another example, the instruction is received by a wireless communications receiver associated with the photographic lighting device prior to the occurrence of the normal flash initiation event or signal. In a further example, the initiating light emission occurs at a time delayed from completion of the communicating the instruction. In one example, the instruction includes a delay factor. In another example, the instruction includes a precalculated time for the initiating light emission. In another example, the identifying includes detecting the predictor event and/or signal external to the camera. In one example, the detecting occurs via a hot shoe connector of the camera.

The method may further include detecting a predictor signal and/or event; determining an amount of time from the occurrence of the predictor signal and/or event until a desired time for the initiation of light emission of the photographic lighting device; and transmitting to the photographic lighting device an instruction for the initiating light emission of the photographic lighting device at the desired time. In one example, the detecting a predictor signal and/or event includes identifying the occurrence of an FP-sync signal of the camera. In another example, the detecting a predictor signal and/or event includes identifying the occurrence of a power set command of the camera. In yet another example, the detecting a predictor signal and/or event includes identifying the occurrence of a drop in voltage of a clock signal of the camera, the drop in voltage occurring after triggering of image acquisition and prior to the first shutter blade stopping movement. In one example, the determining an amount of time includes utilization of a time value determined using a calibration that includes: initiating an image acquisition sequence; determining a start of movement of a second shutter blade; and using the shutter speed of the image acquisition, the shutter blade travel time for the camera, the time from the occurrence of the predictor signal and/or event to the start of movement of the second shutter blade to determine the time from the predictor signal and/or event to the stopping of movement of the first shutter blade. In one example, the using step includes: determining the time from the stopping of movement of the first shutter blade to the start of movement of the second shutter blade utilizing the shutter speed and the shutter blade travel time for the camera; and determining the time from the predictor signal and/or event to the stopping of movement of the first shutter blade utilizing the time from the occurrence of the predictor signal and/or event to the start of movement of the second shutter blade and the time from the stopping of movement of the first shutter blade to the start of movement of the second shutter blade.

In another example, the determining an amount of time includes utilization of a time value determined using a calibration that includes: initiating an image acquisition sequence; analyzing the resultant image; and modifying an adjustment factor that impacts the value of a delay factor of the instruction.

In another implementation, a method for synchronizing a photographic lighting device to image acquisition by a camera is provided. The method includes associating a photographic lighting device having a light emission profile with an initial critical point and a terminal critical point with the camera; and initiating light emission from the photographic lighting device prior to the first shutter blade stops movement such that the initial critical point occurs at a point in time after about 1 millisecond before the first shutter blade moves to a position that no longer obstructs light to the imaging portion of the sensor. In one example, the initiating light emission occurs such that the initial critical point occurs at a point in time after about 500 microseconds before the first shutter blade moves to a position that no longer obstructs light to the imaging portion of the sensor. In another example, the initiating light emission occurs such that the initial critical point occurs at a point in time after about 250 microseconds before the first shutter blade moves to a position that no longer obstructs light to the imaging portion of the sensor. In yet another example, the initiating light emission occurs such that the initial critical point occurs at a point in time after the first shutter blade moves to a position that no longer obstructs light to the imaging portion of the sensor. In still another example, the initiating light emission occurs such that the initial critical point occurs at about the time the first shutter blade moves to a position that no longer obstructs light to the imaging portion of the sensor. In a further example, the initiating light emission occurs such that the initial critical point occurs before the first shutter blade stops movement. In still yet another example, the initiating light emission occurs such that the terminal critical point occurs before about 500 microseconds after a second shutter blade of the camera moves to a point where the second shutter blade starts to obstruct light from passing to the imaging portion of the sensor. In a still further example, the initiating light emission occurs such that the terminal critical point occurs before about 250 microseconds after a second shutter blade of the camera moves to a point where the second shutter blade starts to obstruct light from passing to the imaging portion of the sensor. In yet a further example, the initiating light emission occurs such that the terminal critical point occurs at about the time that the second shutter blade starts to obstruct light from passing to the imaging portion of the sensor. In still yet a further example, the initiating light emission occurs such that the terminal critical point occurs before the time that the second shutter blade starts to obstruct light from passing to the imaging portion of the sensor The method may further include identifying a camera predictor event and/or signal that occurs prior to the first shutter blade of the camera moving to a point that allows light to pass to the imaging portion of the sensor, the predictor event and/or signal not being an event or signal for instructing the initiation of light emission from a photographic lighting device, the predictor event and/or signal occurring prior to a normal flash initiation event or signal intended to instruct the light emission of the photographic lighting device; and based upon the occurrence of the predictor event and/or signal, communicating to the photographic lighting device an instruction for the initiating light emission of the photographic lighting device. In one example, the camera predictor event and/or signal is a serial data communication of the camera. In one such example, the serial data communication is a power set command. In another example, the camera predictor event and/or signal is the initiation of a shutter magnet release signal. In yet another example, the camera predictor event and/or signal is the initiation of an FP-synch signal and the initiating light emission does not include an FP-type flash emission. In one example, the communicating includes delivering the instruction internal to the camera to an internal lighting device. In another example, the communicating includes delivering the instruction via a hot shoe connector of the camera to the photographic lighting device, the photographic lighting device being positioned in the hot shoe connector. In still another example, the communicating includes wirelessly transmitting the instruction to the photographic lighting device. In one such example, the wirelessly transmitting includes a radio frequency transmission. In another such example, the instruction is wirelessly transmitted prior to the first shutter blade moving to a position that no longer obstructs light to the imaging portion of the sensor. In yet another such example, the instruction is received by a wireless communications receiver associated with the photographic lighting device prior to the first shutter blade moving to a position that no longer obstructs light to the imaging portion of the sensor. In still another such example, the instruction is wirelessly transmitted prior to the occurrence of the normal flash initiation event or signal. In still yet another such example, the instruction is received by a wireless communications receiver associated with the photographic lighting device prior to the occurrence of the normal flash initiation event or signal. In another example, the initiating light emission occurs at a time delayed from completion of the communicating the instruction. In one such example, the instruction includes a delay factor. In another such example, the instruction includes a precalculated time for the initiating light emission. In yet another example, the identifying includes detecting the predictor event and/or signal external to the camera. In one such example, the detecting occurs via a hot shoe connector of the camera.

The method may further include detecting a predictor signal and/or event; determining an amount of time from the occurrence of the predictor signal and/or event until a desired time for the initiation of light emission of the photographic lighting device; and transmitting to the photographic lighting device an instruction for the initiating light emission of the photographic lighting device at the desired time. In one example, the detecting a predictor signal and/or event includes identifying the occurrence of an FP-sync signal of the camera. In another example, the detecting a predictor signal and/or event includes identifying the occurrence of a power set command of the camera. In yet another example, the detecting a predictor signal and/or event includes identifying the occurrence of a drop in voltage of a clock signal of the camera, the drop in voltage occurring after triggering of image acquisition and prior to the first shutter blade stopping movement. In still another example, the determining an amount of time includes utilization of a time value determined using a calibration that includes: initiating an image acquisition sequence; determining a start of movement of a second shutter blade; using the shutter speed of the image acquisition, the shutter blade travel time for the camera, the time from the occurrence of the predictor signal and/or event to the start of movement of the second shutter blade to determine the time from the predictor signal and/or event to the stopping of movement of the first shutter blade. In one such example, the using step includes: determining the time from the stopping of movement of the first shutter blade to the start of movement of the second shutter blade utilizing the shutter speed and the shutter blade travel time for the camera; determining the time from the predictor signal and/or event to the stopping of movement of the first shutter blade utilizing the time from the occurrence of the predictor signal and/or event to the start of movement of the second shutter blade and the time from the stopping of movement of the first shutter blade to the start of movement of the second shutter blade. In still another example, the determining an amount of time includes utilization of a time value determined using a calibration that includes: initiating an image acquisition sequence; analyzing the resultant image; and modifying an adjustment factor that impacts the value of a delay factor of the instruction.

In still another implementation, a method for synchronizing a photographic lighting device to image acquisition by a camera is provided. The method includes detecting a predictor signal and/or event; determining an amount of time from the occurrence of the predictor signal and/or event until a desired time for the initiation of light emission of the photographic lighting device; transmitting to the photographic lighting device an instruction for the initiating light emission of the photographic lighting device at the desired time; and initiating light emission of the photographic lighting device after a first shutter blade of the camera begins to expose the image acquisition sensor to light and before the first shutter blade stops movement. In one example, the detecting a predictor signal and/or event includes identifying the occurrence of an FP-sync signal of the camera. In another example, the detecting a predictor signal and/or event includes identifying the occurrence of a power set command of the camera. In yet another example, the detecting a predictor signal and/or event includes identifying the occurrence of a drop in voltage of a clock signal of the camera, the drop in voltage occurring after triggering of image acquisition and prior to the first shutter blade stopping movement. In still another example, the determining an amount of time includes utilization of a time value determined using a calibration that includes: initiating an image acquisition sequence; determining a start of movement of a second shutter blade; using the shutter speed of the image acquisition, the shutter blade travel time for the camera, the time from the occurrence of the predictor signal and/or event to the start of movement of the second shutter blade to determine the time from the predictor signal and/or event to the stopping of movement of the first shutter blade. In one such example, the using step includes: determining the time from the stopping of movement of the first shutter blade to the start of movement of the second shutter blade utilizing the shutter speed and the shutter blade travel time for the camera; determining the time from the predictor signal and/or event to the stopping of movement of the first shutter blade utilizing the time from the occurrence of the predictor signal and/or event to the start of movement of the second shutter blade and the time from the stopping of movement of the first shutter blade to the start of movement of the second shutter blade. In still yet another example, the determining an amount of time includes utilization of a time value determined using a calibration that includes: initiating an image acquisition sequence; analyzing the resultant image; and modifying an adjustment factor that impacts the value of a delay factor of the instruction.

In yet another implementation, a method for synchronizing a photographic lighting device to image acquisition by a camera is provided. The method includes identifying a camera predictor event and/or signal that occurs prior to the first shutter blade of the camera moving to a point that allows light to pass to the imaging portion of the sensor, the predictor event and/or signal not being an event or signal intended for instructing the initiation of X-sync, the predictor event and/or signal occurring prior to the time of X-sync and based upon the occurrence of the predictor event and/or signal, communicating to the photographic lighting device an instruction for the initiating light emission of the photographic lighting device.

In still yet another implementation, a method for synchronizing a photographic lighting device to image acquisition by a camera is provided. The method includes allowing a first shutter blade of the camera to move such that light is allowed to pass to an image acquisition sensor of the camera; and initiating light emission of the photographic lighting device after the first shutter blade begins to expose the image acquisition sensor to light and before the shutter travel completion switch is detected by camera.

In a further implementation, a system for synchronizing a photographic lighting device to image acquisition by a camera is provided. The system includes means for allowing a first shutter blade of the camera to move such that light is allowed to pass to an imaging portion of an image acquisition sensor of the camera; and means for initiating light emission of the photographic lighting device after the first shutter blade begins to expose the image acquisition sensor to light and before X-sync associated with the first shutter blade stopping movement.

In yet a further implementation, a system for synchronizing a photographic lighting device to image acquisition by a camera having an image acquisition sensor and a shutter system with a first shutter blade is provided. The system includes a connection to a camera circuitry providing access to a camera predictor signal; a memory including information related to instructions for initiating light emission after the first shutter blade begins to expose the image acquisition sensor to light and before X-sync associated with the first shutter blade stopping movement; a processor element configured to use the information and the camera predictor signal to generate a lighting emission initiation signal; and a connection to the photographic lighting device in communication with the processing element for communicating the lighting emission initiation signal to the photographic lighting device.

In yet another embodiment, a system and method is provided of synchronizing a light emission initiation using a light emission profile information to determine a start time for light emission initiation.

Figure 39:
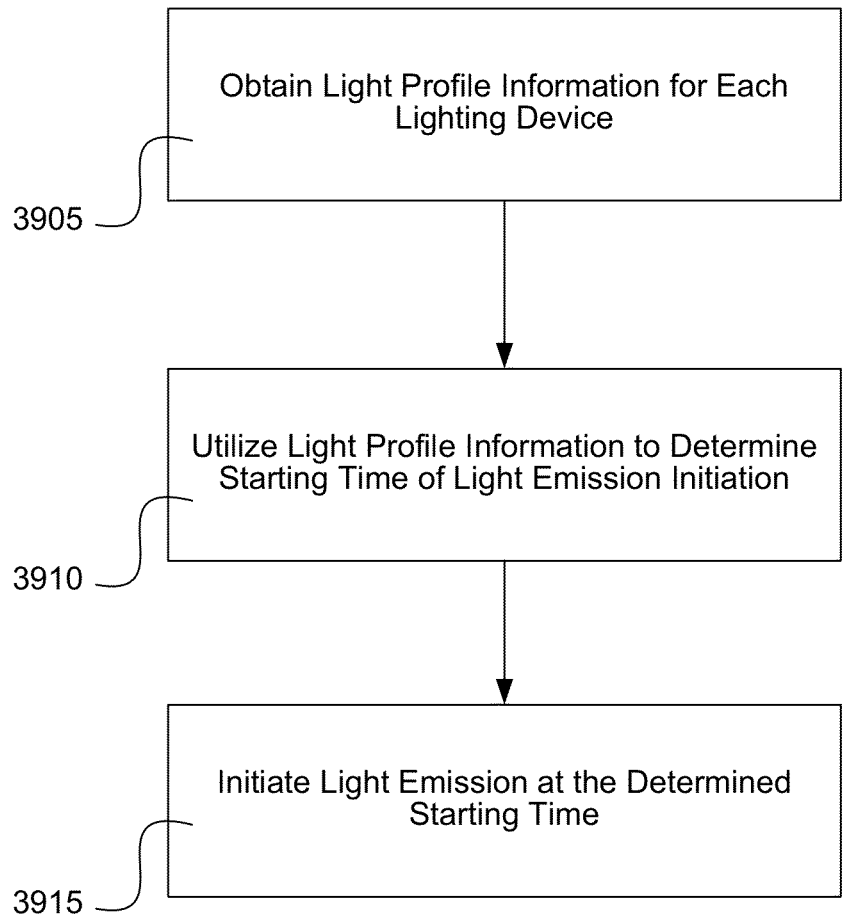
FIG. 39 illustrates an implementation of a method of synchronizing one or more lighting devices to an image acquisition of a camera using light profile information.

FIG. 39 illustrates yet another implementation of a method of synchronizing one or more lighting devices to an image acquisition of a camera. At step 3905 light profile information is obtained for each lighting device. At step 3910 for each lighting device the light profile information is used to determine a starting time of light emission initiation for that lighting device. At step 3915 the light emission is initiated at the determined starting time.

Figure 40:
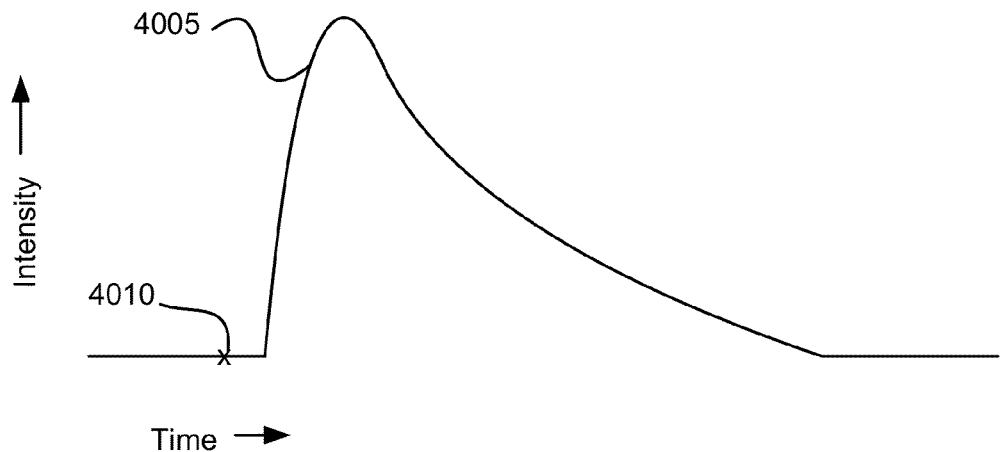
FIG. 40 illustrates an exemplary light emission profile.

Light profile information for a lighting device can come in a variety of forms based on the profile of the light emission for the lighting device. Examples of light profile information that can be utilized to determine a starting time for light emission initiation include, but are not limited to, a full lighting profile, one or more points on a lighting profile (e.g., a brightness balance point, such as an initial critical point, a terminal critical point; an energy balance point, such as a lateral energy balance point (e.g., half energy balance point), a vertical energy balance point (e.g., a T.0.5 balance point); and other points along the curve of the profile), and any combinations thereof. A light emission profile for a lighting device may differ from one type of lighting device to another. An example light emission profile 4005 is shown in FIG. 40. Light emission profile 4005 is shown with increasing and then decreasing intensity (i.e., a light pulse) over time after light emission initiation at time 4010. It is noted that in this example actual light emission starts at a time after light emission initiation. Such a delay between light emission initiation and actual light emission can result from multiple factors and can be worked into the time calculations for when to initiate light emission according to the implementations described herein. Examples of such factors include, but are not limited to, time of circuitry delay, time for wireless communication, time for light element of a lighting device to charge to a point of emitting light, and any combinations thereof.

A balance point of a lighting profile is a location that indicates a certain balance of energy, brightness, or other quality on either side of the location. As discussed above, the critical points of a profile indicate the location at which the brightness of the light emission is high enough over ambient light to contribute to the image acquisition. Below the critical points of the profile, the brightness of the light does not contribute significantly over ambient light. Above the critical points of the profile, the brightness of the light contributes over ambient light. Several exemplary light emission profiles are shown with initial and terminal critical points with respect to the various implementations discussed above. The time from the time of light emission initiation to the time of the balance point of the lighting profile being used may be referred to herein as the Time To Balance Point ("TTBP"). The TTBP may be known for a given photographic lighting device (e.g., from manufacturer literature, testing of the given flash output to determine the TTBP, etc.). As is discussed further below, this TTBP can be used to determine the time for light emission initiation. A time to balance point for an initial critical point is the time from the light emission initiation to the time of the initial critical point of the profile. A time to balance point for a terminal critical point is the time from the light emission initiation to the time of the terminal critical point of the profile.

Figure 41:
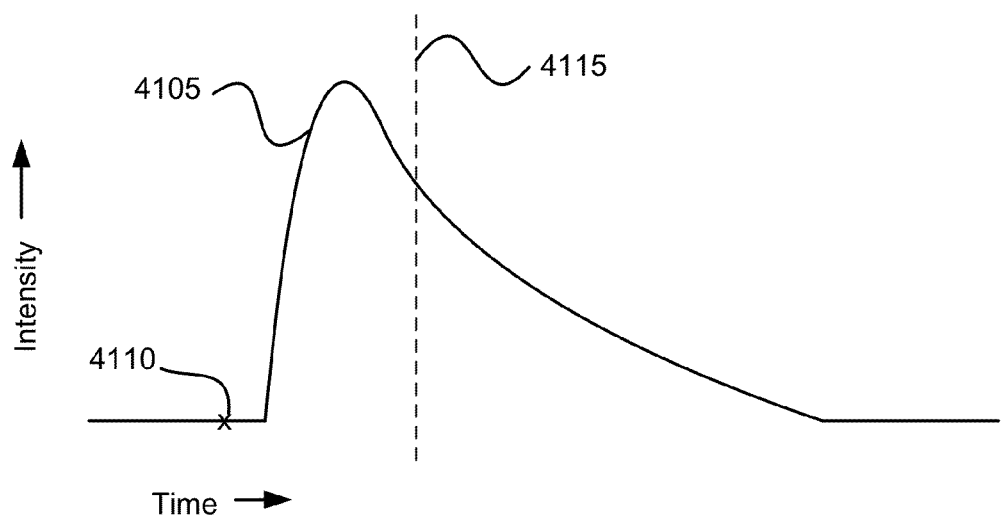
FIG. 41 illustrates an exemplary light emission profile showing an exemplary 1/x energy balance point.

An energy balance point is a location along the curve of a lighting profile that divides the energy of the light emission into two components. A lateral energy balance point indicates the location on the profile at which a certain amount of the energy of the light emission occurs before the balance point and a certain amount of the energy of the light emission occurs after the balance point. In one example, a lateral energy balance point is a $1/x$ energy balance point where x is any number to create a fraction. Example $1/x$ energy balance points include, but are not limited to, a ½ energy balance point, a ⅓ energy balance point, and a ¼ energy balance point. A ½ energy balance point (also referred to herein as a "half energy balance point") is the location on a light emission profile at which half of the energy of the light emission occurs before that point in time and half of the energy of the light emission occurs after that point in time. A ⅓ energy balance point is the location on a light emission profile at which one third of the energy of the light emission occurs before that point in time and two-thirds of the energy of the light emission occurs after that point in time. A ¼ energy balance point is the location on a light emission profile at which one-fourth of the energy of the light emission occurs before that point in time and three-fourths of the energy of the light emission occurs after that point in time. FIG. 41 illustrates an exemplary light emission profile 4105 wherein light emission is initiated at point 4110. Light emission profile 4105 has a $1/x$ energy balance point 4115 indicated by the dashed line. The time from light emission initiation 4110 to a $1/x$ energy balance point 4115 is the TTBP.

Figure 42:
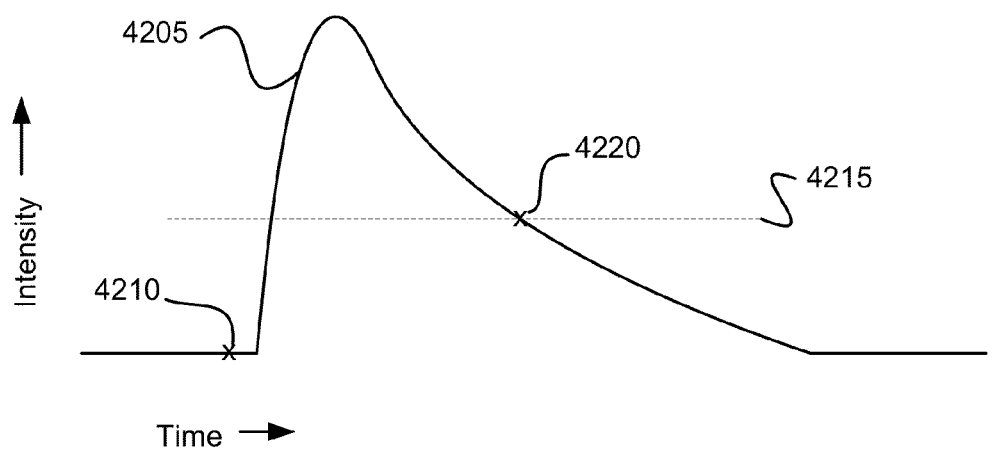
FIG. 42 illustrates an exemplary light emission profile showing an exemplary T0.x energy balance point.

A vertical energy balance point indicates the location on the profile at which a certain amount of energy and/or brightness of the light emission occurs below that location and a certain amount of the energy and/or brightness of the light emission occurs above the balance point. In one example, a vertical energy balance point is a T0.x energy balance point. Such T0.x energy balance points may sometimes be obtained in the literature accompanying a photographic lighting device. Example T0.x energy balance points include, but are not limited to, a T0.5 energy balance point and a T0.1 energy balance point. A T0.5 energy balance point is the location on a light emission profile at which half of the brightness of the light emission occurs above that location on the profile and half of the brightness of the light emission occurs below that location on the profile. A T0.1 energy balance point is the location on a light emission profile at which T0.9 of the brightness of the light emission occurs above that location on the profile and T0.1 of the brightness of the light emission occurs below that point on the profile. In one example, a T0.5 energy balance point may be utilized as an approximation of a half energy balance point. FIG. 42 illustrates an exemplary light emission profile 4205 wherein light emission is initiated at point 4210. Light emission profile 4205 has a T0.x energy balance point 4215 which is indicated by the dashed line and a terminal point of the dashed line at 4220. The time to balance point (TTBP) for a 0.x energy balance point, such as balance point 4215, is measured from the time of light emission initiation (e.g., time 4210) to the time of the terminal crossing point of the T0.x energy balance point (e.g., time 4220). It is contemplated that a $1/x$ or T0.x energy balance point may refer to approximations of the amount of energy and/or brightness on one side or the other of the location. For example, in a half energy balance point, approximately half of the energy may be before that location on the profile and approximately the energy may be after that location on the profile. In such an approximate location for a 1/x or T0.x energy balance point, a time to balance point (TTBP) from light emission initiation to the approximate point on the profile can be utilized to provide synchronization of a lighting device to image acquisition as discussed herein.

A location for a balance point of a lighting profile and other light emission profile information can be obtained in a variety of ways recognizable by those of ordinary skill in light of the disclosure herein. Example ways to obtain light emission profile information include, but are not limited to, measuring the light output of a lighting device and recording the light emission profile, measuring the light output of a lighting device and recording the energy output over time (e.g., integration of flash profile); measuring the time from light emission initiation to a given point in a light emission profile (e.g., a balance point); accessing a stored value for one or more light emission profile information; determining a model of a lighting device (e.g., using an associated wireless communication functionality, such as a remote external wireless device connected to a lighting device) and using the model to correlate to a stored value for light emission profile information, and any combinations thereof.

Light emission profile information may be stored in a memory element. Example memory elements include, but are not limited to, a volatile memory element, a non-volatile memory element, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. Example locations for a memory element include, but are not limited to a memory element of a lighting device, a memory element of a camera, a memory element of synchronizer, and any combinations thereof. Example of synchronizers are discussed above with respect to FIGS. 37 and 38. An exemplary wireless synchronization system is discussed further below with respect to FIG. 59. Light emission profile information may be stored in a variety of ways including, but not limited to, as data representing the entire profile, as data representing one or more points of the profile, as information representing a time from a given point (e.g., light emission initiation) to one or more points of the profile (e.g., a light emission profile balance point), and any combinations thereof.

Example lighting devices include, but are not limited to, a lighting device internal to a camera body, a lighting device external to a camera body, a lighting device having internal wireless functionality for communicating with a camera, a lighting device having external wireless functionality for communication with a camera, a flash lighting device (e.g., a speedlight, a studio strobe), and any combinations thereof. A lighting device may be associated with a camera in a variety of ways including, but not limited to, via a wired connection not directly attached to the camera (e.g., via a synchronization cable), via a wired connection directly attached to the camera (e.g., a speedlight flash mounted in a hot shoe connector of the camera), via a wireless functionality (e.g., a wireless synchronization circuitry) located internal to a camera, via a wireless functionality located external to a camera (e.g., wireless device 3805 of FIG. 38), via a wireless functionality (e.g., internal wireless synchronization circuitry) located internal to a lighting device, via a wireless functionality located external to a lighting device (e.g., wireless device 3805 of FIG. 38), and any combinations thereof.

In one example, light emission profile information for a flash device internal to a camera is stored in a memory located in a camera body. In another example, light emission profile information for one or more lighting devices external to a camera (e.g. multiple models of flash devices that may be associated with the camera) is stored in a memory located in a camera body. In yet another example, light emission profile information for one or more lighting devices external to a camera (e.g. multiple models of flash devices that may be associated with the camera) is stored in a memory located in a synchronization device (e.g., internal or external to a camera and/or a lighting device, wired or wireless).

It is noted that a light emission profile may change for a given lighting device depending on the power settings for the lighting device (e.g., possibly shifting its peak and balance points closer to or further from the light emission initiation time). In addition to storing light emission profile information for one or more lighting devices (e.g., by model), it is contemplated that for a given lighting device there may be a different light emission profile information for each of a plurality of power settings for the lighting device. In one example, power setting information may also be used to determine the proper light emission profile information to use for a given synchronization.

Referring again to step 3910, a light emission profile information is used to determine the time for light emission initiation. In one implementation, light emission profile information is utilized to position a light emission of a lighting device at a predetermined position in an image acquisition window ("IAW") for an image acquisition. An image acquisition window is the time period for a camera in which a sensor (or film in a film-based system) is exposed to light during an image acquisition. For example, in a shutter bladed system, the image acquisition window is the time period beginning when a first shutter blade begins to allow light to pass to a sensor and ending when a second shutter blade completely blocks light from passing to the sensor. As discussed above, this is likely not bounded by the times that the shutter blades begin and end movement due to travel time prior to and after the sensor. In another example, a system lacking a physical shutter may employ electronic gating or other methods to bound the beginning and end of an image acquisition window.

Light emission profile information can be used in a variety of ways to position a light emission at a desired location in an image acquisition window. Example ways to position a light emission at a desired location include, but are not limited to, positioning a profile relatively (e.g., using visual estimation), iteratively taking images and repositioning a profile within an image acquisition (e.g., by offsetting a time delay, by offsetting the light emission initiation time) until a desired result is obtained, positioning a profile using one or more balance points (e.g., by using a known time between light emission initiation and the one or more balance points and, possibly, information from a camera initiating the image acquisition, such as shutter information and model), positioning a profile such that the light emission initiation occurs after a first shutter blade begins to move, positioning a profile such that the light emission initiation occurs after a first shutter blade begins to expose a sensor to light, positioning a profile such that the light emission initiation occurs before x-sync, positioning a profile such that the light emission initiation occurs before a first shutter blade stops movement, positioning a profile such that the light emission initiation occurs after a first shutter blade moves to a position that fully clears (i.e., no longer blocks) a sensor, using a TTBP and a known time from a start of the imaging process to a particular location within an IAW and/or a location of balance point to position a profile within an image acquisition window, using a TTBP and a known time from a predictor signal/event to a particular location within an IAW and/or a location of balance point to position a profile within an image acquisition window, and any combinations thereof.

In one example, a light emission profile is centered within an image acquisition window. In one such example, centering is done using relative positioning (e.g., approximation visually, iteratively taking images, etc.). In another such example, centering is done using by centering a balance point of a profile within an image acquisition window. In another example, a light emission profile is weighted (e.g., shifted) toward the earlier portion of the image acquisition. In one such example, shifting a profile to the earlier portion of the image acquisition is done using relative positioning (e.g., approximation visually, iteratively taking images, etc.). In another such example, weighting to an earlier time in the image acquisition window is accomplished by positioning a balance point of a profile at a point in the image acquisition that occurs earlier than the center point. In still another example, a light emission profile is weighted (e.g., shifted) toward a later time in the image acquisition window. In one such example, shifting a profile to a later position in the image acquisition window is done using relative positioning (e.g., approximation visually, iteratively taking images, etc.). In another such example, weighting to a later time in the image acquisition window is accomplished by positioning a balance point of a profile at a point in the image acquisition that occurs later than the center point. Examples of shifting and examples of user interfaces for inputting a shifting value are discussed further below. A user interface (such as those shown in FIGS. 53 to 55) and user input of offset value (such as discussed with respect to FIGS. 52 to 55 and elsewhere) can be utilized with the methods disclosed herein to provide a modification to a desired location in an image acquisition window, modification to a determination of a location in time for light emission initiation (i.e., a starting point of light emission initiation), and any combinations thereof. It is possible to move a bright portion of an image illumination to the top or bottom of an acquired image by shifting a profile. In one example, such shifting may be desirable where a shutter speed is relatively high such that some shading does occur in the image even with one or more of the methods discussed herein and a desired portion of the image field of the camera is positioned higher or lower in the image field than the center point of the image field. The concept of centering a profile (e.g., centering a balance point of a profile) is used in many of the examples and implementations discussed below. It is contemplated that where centering is discussed, it is possible to also employ a shifting to an earlier point or later point in the image acquisition window.

Figure 43:
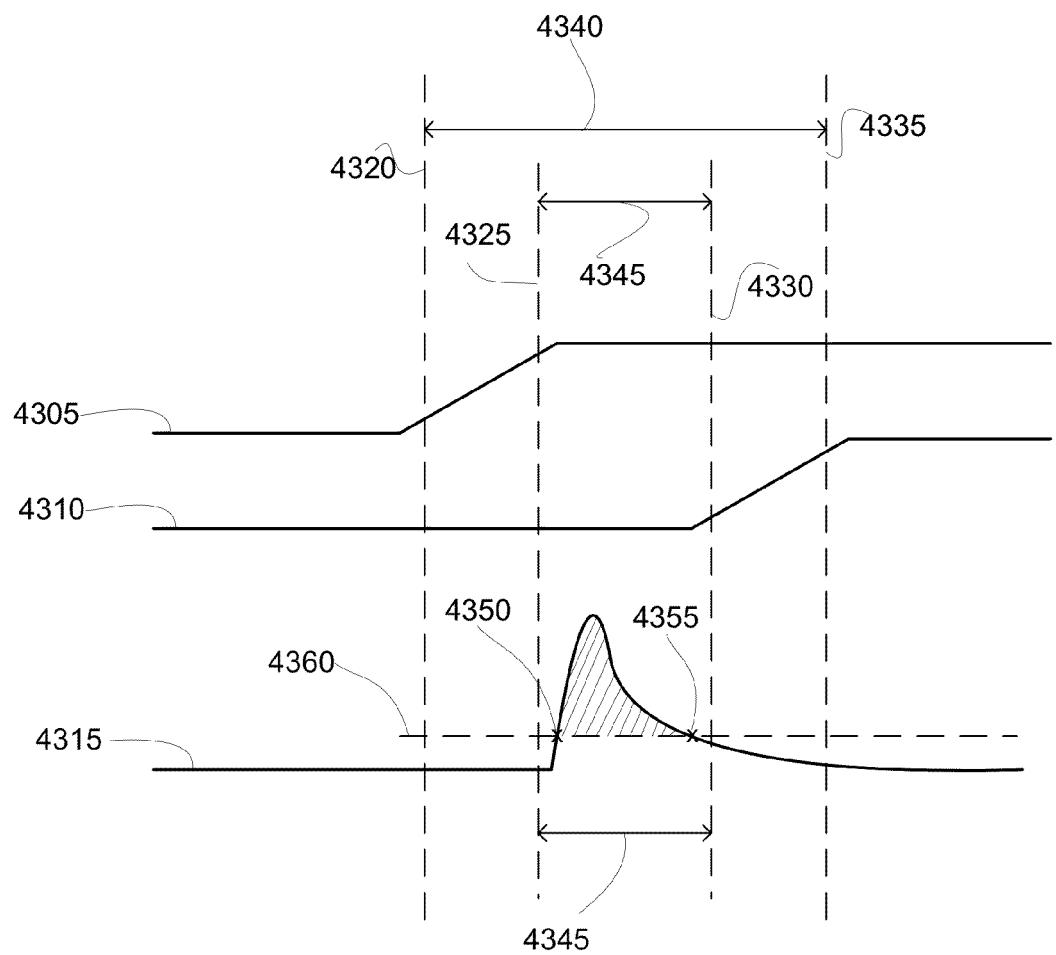
FIG. 43 illustrates an example of using light emission profile information to position a light emission profile within an image acquisition window.

FIG. 43 illustrates one example of using light emission profile information to position a light emission profile within an image acquisition. FIG. 43 shows a timing/movement plot for a first shutter blade 4305, a timing/movement plot for a second shutter blade 4310, and a light emission profile 4315 over time for a lighting device (e.g., at a given power output setting). Plot 4305 for the first shutter blade includes an initial flat portion in time where the first shutter blade is at rest fully blocking light from passing to an imaging sensor. The angled portion moving upwards represents the movement of the first shutter blade from the position of fully blocking light to the sensor, to a position in time 4320 where the first shutter blade begins to expose the sensor to light as the edge of the first shutter moves across the sensor, to a position in time 4325 where the first shutter blade moves to a position that no longer blocks light to the sensor, to a position (indicated by the second flat portion of the plot) at rest. Plot 4310 for the second shutter blade includes an initial flat portion in time where the second shutter blade is at rest and not blocking any light from passing to an imaging sensor. The angled portion moving upwards represents the movement of the first shutter blade from the position of not blocking light to the sensor, to a position in time 4330 where the first shutter blade begins to block light passing to the sensor as the edge of the first shutter moves across the sensor, to a position in time 4335 where the first shutter blade moves to a position that fully blocks light to the sensor, to a position (indicated by the second flat portion of the plot) at rest. The time from the first shutter blade beginning to expose the sensor 4320 to the time that the second shutter blade fully blocks light to the sensor 4335 is the image acquisition window 4340.

A sub-window in time 4345 is shown from the time that the first shutter blade fully clears the sensor 4325 to the time that the second shutter blade starts to block light to the sensor 4330. This sub-window in time 4345 is referred to herein as the fully open imaging window. The fully open imaging window 4345, in this example, is the time that light passing to the sensor is completely unblocked by the shutter blades. In this example, the time from time 4325 to the first blade stopping movement and the time from time 4335 to the second blade stopping movement are approximately the same. In such an example (which is typical for many camera models), a fully open imaging window is equidistantly centered within the image acquisition window. In some situations, a fully open imaging window, such as window 4345, may act as a guidepost to positioning a light emission profile within an image acquisition window, such as window 4340. AS discussed further below, a center point in time of a fully open imaging window can be utilized to be the same as the center point of a corresponding image acquisition window for a given set of image acquisition conditions. It is noted that at certain high shutter speeds (i.e., fast shutter speed, short exposure time) the second shutter blade begins to block light from passing to the sensor prior to the first shutter blade fully clearing the sensor. Such a situation will cause a "negative" fully open imaging window in which there is actually no time period that the sensor is fully unblocked by the shutter blades. Example high speed shutter situations are discussed further below. The shutter speeds at which this will occur will differ by camera model and are based in part on the shutter blade travel time (sometimes referred to herein as "BTT"). Blade travel time is the time of movement of a shutter blade from rest to stopping movement (indicated in FIG. 43 by the time of the angled line sections of plots 4305 and 4310).

Light emission profile 4315 is shown with an initial critical point 4350 and a terminal critical point 4355. As discussed above, the light above the line 4360 that crosses critical points 4350 and 4355 is the light intensity that contributes to the imaging over the ambient light. In this example, the combination of the light emission profile information and the information about the camera image acquisition window 4340 is used to position the profile 4315 such that portion of the profile that is between the critical points is positioned within the fully open imaging window 4345. In one example, using timing information for the time between light emission initiation and the initial critical point, the light emission initiation may occur at a proper time.

Figure 44:
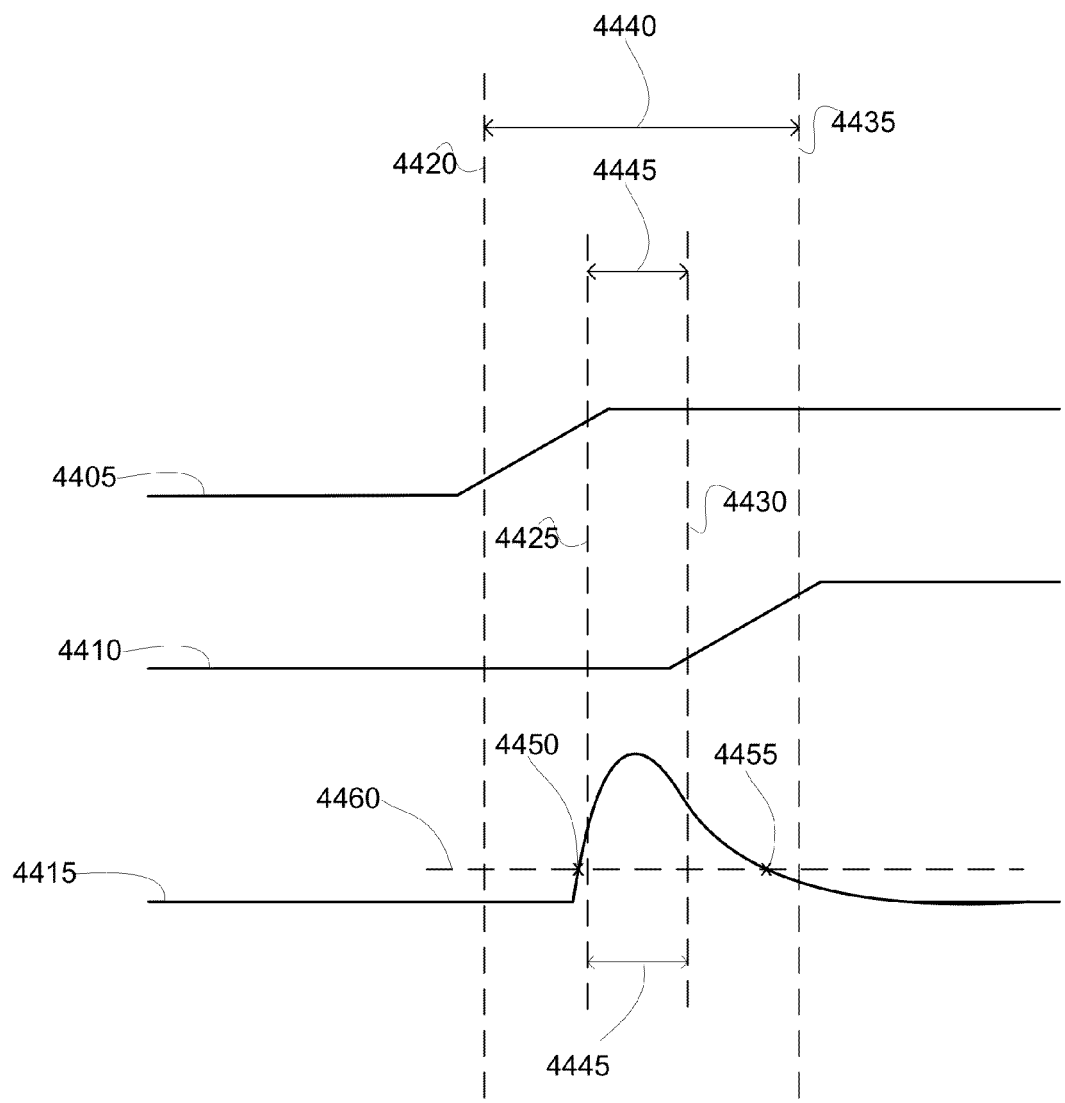
FIG. 44 illustrates another example of using light emission profile information to position a light emission profile within an image acquisition window.

FIG. 44 illustrates another example of using light emission profile information to position a light emission profile within an image acquisition. FIG. 44 shows a timing/movement plot for a first shutter blade 4405, a timing/movement plot for a second shutter blade 4410, and a light emission profile 4415 over time for a lighting device (e.g., at a given power output setting). Plot 4405 for the first shutter blade includes an initial flat portion in time where the first shutter blade is at rest fully blocking light from passing to an imaging sensor. The angled portion moving upwards represents the movement of the first shutter blade from the position of fully blocking light to the sensor, to a position in time 4420 where the first shutter blade begins to expose the sensor to light as the edge of the first shutter moves across the sensor, to a position in time 4425 where the first shutter blade moves to a position that no longer blocks light to the sensor, to a position (indicated by the second flat portion of the plot) at rest. Plot 4410 for the second shutter blade includes an initial flat portion in time where the second shutter blade is at rest and not blocking any light from passing to an imaging sensor. The angled portion moving upwards represents the movement of the first shutter blade from the position of not blocking light to the sensor, to a position in time 4430 where the first shutter blade begins to block light passing to the sensor as the edge of the first shutter moves across the sensor, to a position in time 4435 where the first shutter blade moves to a position that fully blocks light to the sensor, to a position (indicated by the second flat portion of the plot) at rest. The time from the first shutter blade beginning to expose the sensor 4420 to the time that the second shutter blade fully blocks light to the sensor 4435 is the image acquisition window 4440.

A fully open imaging window between time 4425 and time 4430 is shown as time period 4445. Light emission profile 4315 is shown with an initial critical point 4450 and a terminal critical point 4455 with an interconnecting line 4460. In this example, the combination of the light emission profile information and the information about the camera image acquisition window 4440 is used to determine that both critical points will not fit within fully open imaging window 4445. The peak of the profile 4415 is positioned approximately centrally within fully open imaging window 4445 and image acquisition window 4440. In one example, using timing information for the time between light emission initiation and the initial critical point, the light emission initiation may occur at a proper time.

Information regarding a camera being used for an image acquisition with one or more lighting devices may be useful in determining the time to initiate light emission such that profile information is used to position a profile within an image acquisition window for the given camera. Examples of camera information for use in determining a time for light emission initiation include, but are not limited to, a shutter information (e.g., a shutter speed, an exposure time, a blade travel time, a sensor travel time), a model identifier, a light output power setting, a time from a starting point of an imaging process (e.g., a point where a camera's internal operation starts a process of synchronizing based on a method disclosed herein) and a landmark point in the image acquisition process (e.g., a time of x-sync, a time of a first shutter blade fully clearing a sensor), a time from a predictor signal/event to a landmark point in the image acquisition process (e.g., a time of x-sync, a time of a first shutter blade fully clearing a sensor), and any combinations thereof. In one example, a camera provides a shutter information to a process of determining a starting time for light emission initiation. In one such example, shutter speed and sensor travel time for a camera model (e.g., via a camera identifier and a look up table for the sensor travel time) are provided. Sensor travel time (sometimes referred to herein as "STT") is the time of travel of the edge of a shutter blade across the sensor (e.g., the time for a first shutter blade to move from the position where it first starts to allow light to pass to the sensor to the point in time where it fully clears the sensor). An STT may also represent the time of movement of a second shutter blade across a sensor moving from a position where it first starts to obstruct light to the sensor to a position where it fully blocks light to the sensor. Shutter speed for a camera and exposure time are related to each other. In embodiments discussed herein where exposure time is used or called for in a method, it is understood that shutter speed can be substituted in its time format. For example, a $1/1000^{th}$ of a second shutter speed is the same as 0.1 millisecond (ms) exposure time. STT, shutter speed (i.e., exposure time), and light emission profile information (e.g., a balance point) can be used to calculate a time to initiate light emission. A time from a process starting point or predictor signal can also be used in the calculation. As used herein a predictor signal (e.g., a predictor signal as discussed above with respect to multiple examples and implementations) can be an example of a process starting point. Where the term process start or process starting point is used it is inclusive of a predictor signal. Examples of such calculations are discussed further below with respect to one or more of the example implementations.

A camera and one or more remote lighting devices may be associated via one or more wireless communication connections. In one such example, camera information and/or a timing delay can be wirelessly transmitted from a camera to one or more lighting devices. Various wireless communication examples are discussed further below.

Referring again to step 3915 of FIG. 39, light emission is initiated at a determined time using the information determined at step 3910.

Figure 45:
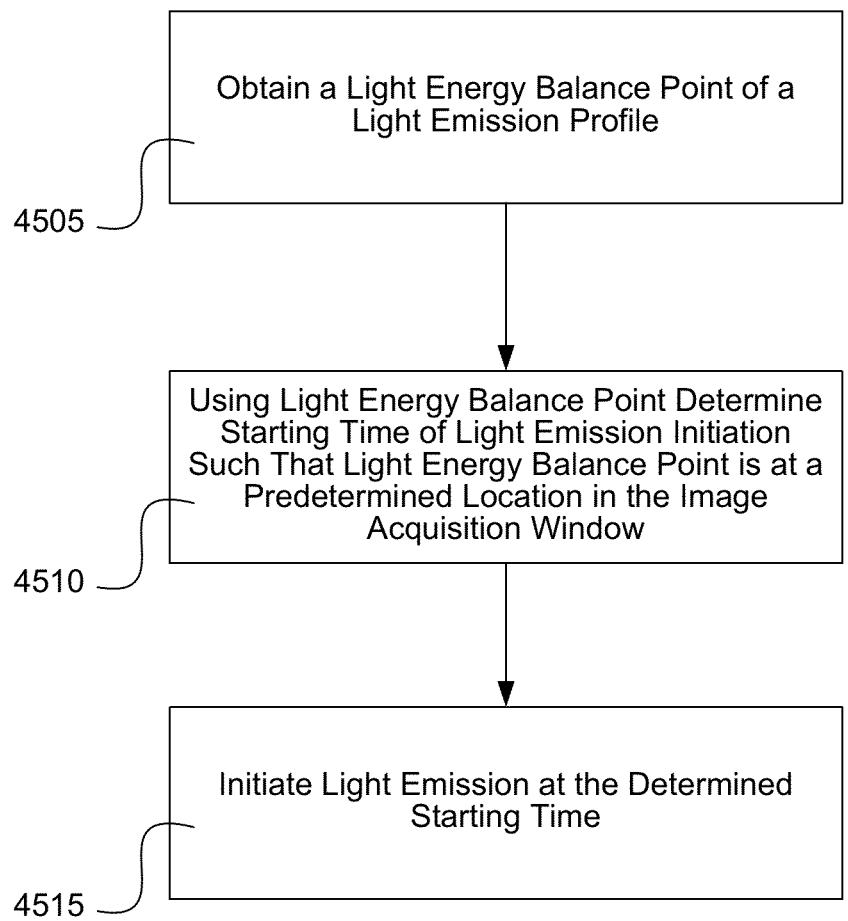
FIG. 45 illustrates another implementation of a method of synchronizing a lighting device to image acquisition using a light energy balance point profile information.

FIG. 45 illustrates still another implementation of a method for synchronizing a lighting device to image acquisition using a light emission profile to determine the light emission initiation time. The features discussed above with respect to the method in FIG. 39 and the discussion thereafter (e.g., TTBP, memory elements, data storage, wireless communication, STT, exposure time, light emission profile information, IAW, a fully open imaging window, etc.) may also apply where appropriate to this implementation and the examples discussed below). At step 4505, a light energy balance point of a light profile is obtained.

At step 4510, a start time of light emission initiation is determined using the light energy balance point such that the light energy balance point is at a predetermined location in an image acquisition window for the camera involved in the image acquisition.

At step 4515, light emission is initiated at the determined start time.

Figure 46:
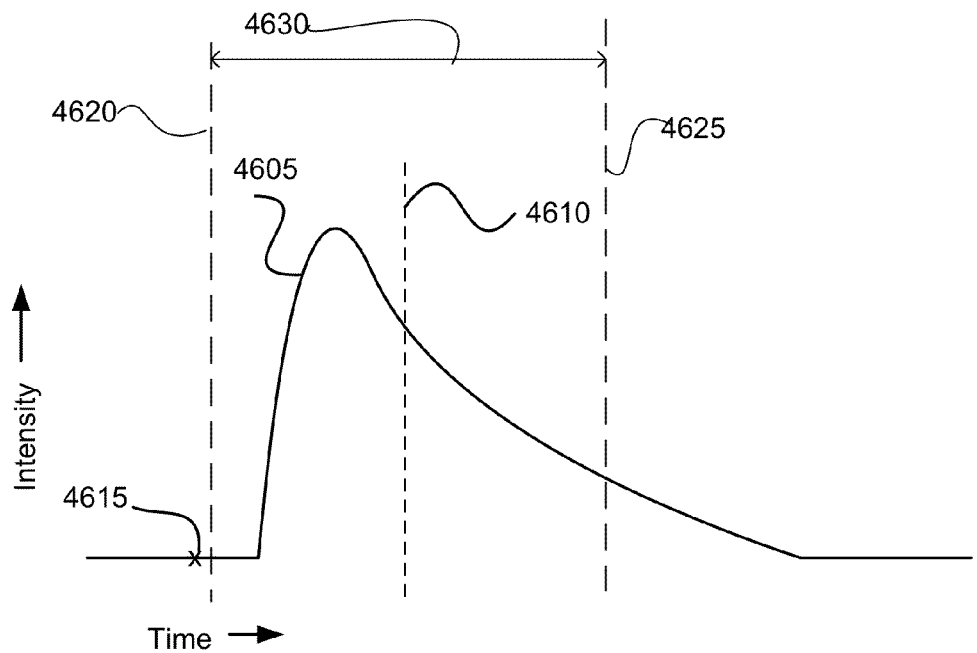
FIG. 46 illustrates an example of using a 1/x energy balance point.

FIG. 46 illustrates one example of positioning a 1/x energy balance point of a light emission profile at a predetermined location (i.e., the center) in an image acquisition window. In this example, a light emission profile 4605 having a ½ energy balance point (half energy balance point) 4610 that occurs a certain known time after light emission initiation 4615 for the lighting device at the power level setting used in this example. A first shutter blade of a camera has a time at which it starts to allow light to pass to the sensor at 4620 and a second shutter blade of the camera has a time at which it completely blocks light from passing to the sensor at 4625 such that an image acquisition window 4630 is the time between time 4620 and 4625. In this example, based on the light emission profile and the time between light emission initiation 4615 and half energy balance point 4610, centering the half energy balance point 4610 in the predetermined location of the center of the image acquisition window 4630, positions the start of light emission initiation 4615 after the first shutter blade begins movement, before the first shutter blade begins to allow light to pass to the sensor at 4620, and before the first shutter blade stops movement or x-sync.

Figure 47:
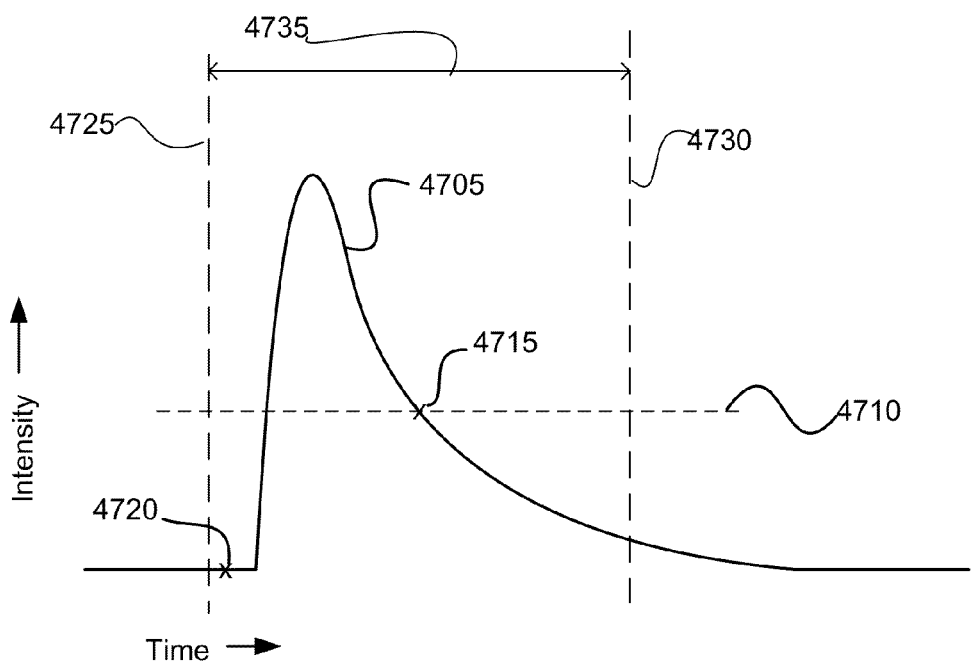
FIG. 47 illustrates an example of using a T0.x energy balance point.

FIG. 47 illustrates one example of positioning a 0.x energy balance point of a light emission profile at a predetermined location (i.e., here in the center) in an image acquisition window. In this example, a light emission profile 4705 having a 0.5 vertical energy balance point 4710 that occurs at a location on the profile 4705 such that the terminal crossing point occurs at a time 4715 a certain known time after light emission initiation 4720 for the lighting device at the power level setting used in this example. A first shutter blade of a camera has a time at which it starts to allow light to pass to the sensor at 4725 and a second shutter blade of the camera has a time at which it completely blocks light from passing to the sensor at 4730 such that an image acquisition window 4735 is the time between time 4725 and 4730. In this example, based on the light emission profile and the time between light emission initiation 4615 and 0.5 energy balance point time at 4715, centering the 0.5 energy balance point in the predetermined location of the center of the image acquisition window 4735, positions the start of light emission initiation 4720 after the first shutter blade begins movement, after the first shutter blade begins to allow light to pass to the sensor at 4725, and before the first shutter blade stops movement or x-sync.

Figure 48:
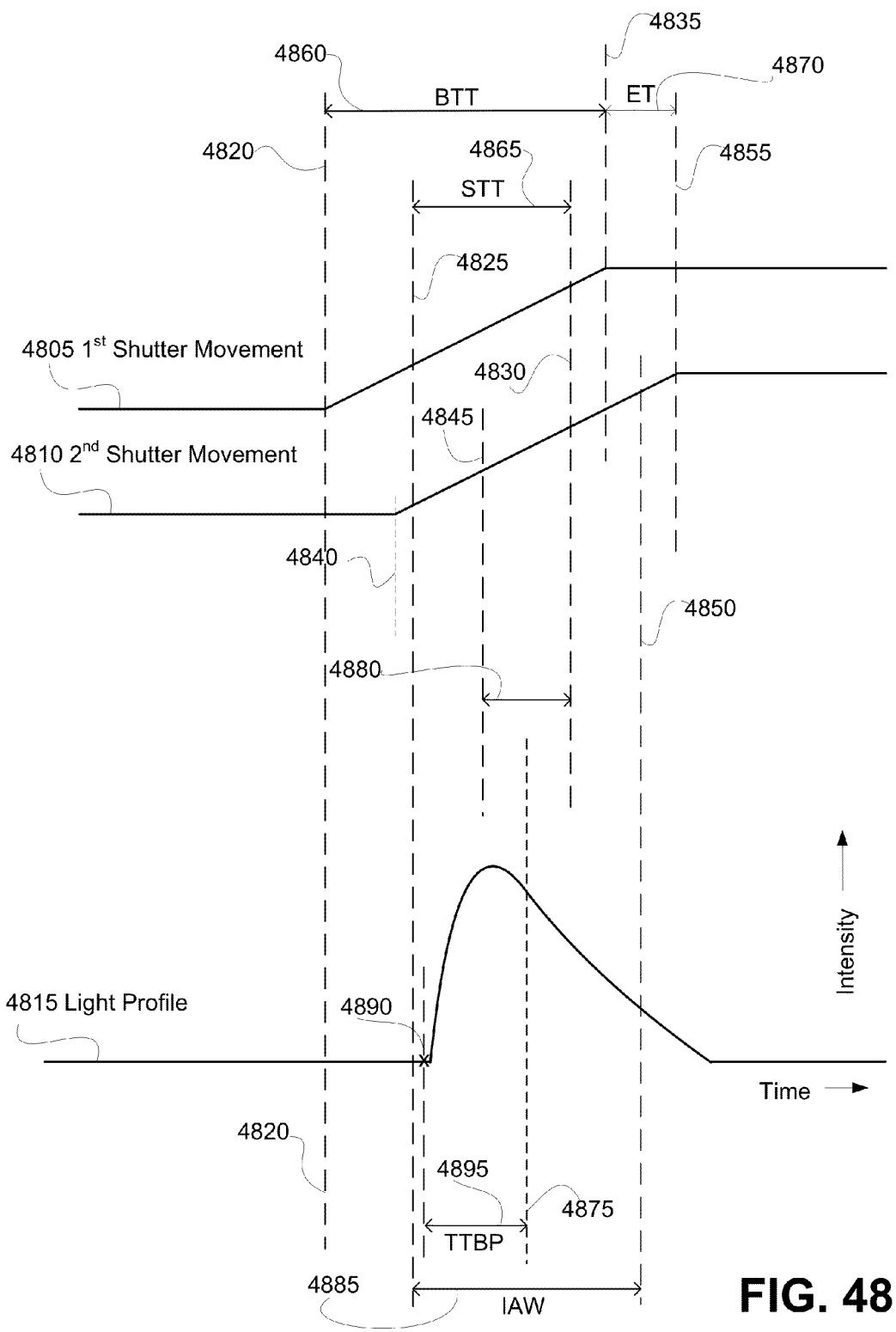
FIG. 48 illustrates an example of using a half energy balance point and a camera shutter speed of $1/1000^{th}$ of a second.

FIG. 48 illustrates yet another example of positioning a half energy balance point of a light emission profile at a predetermined (e.g., center) location in an image acquisition window for a camera set at a shutter speed of $\frac{1}{1000}^{th}$ of a second. FIG. 48 includes a timing plot for a first shutter movement 4805, a timing plot for a second shutter movement 4810, and a light emission profile for a lighting device 4815. First shutter blade starts movement at time 4820 and begins to allow light to pass to the sensor 1.25 milliseconds (ms) later at time 4825. In one exemplary aspect, this time prior to reaching the edge of the sensor allows the shutter blade to accelerate to the proper velocity for traveling across the sensor. The first shutter blade then moves to a position at time 4830 2.25 ms later at which it fully clears the sensor an stops blocking light from passing to the sensor. At time 4835 (0.5 ms later), the first shutter blade comes to a stop. After clearing the sensor the first shutter blade has some time to decelerate and come to a stop. In this example, the time after the shutter blade traverses the sensor is less than the time it uses to accelerate prior to the shutter blade edge traversing the sensor. At time 4835 is typically the time when the first shutter blade actuates a mechanism that generates x-sync. Second shutter blade starts movement at a time 4840 which is 1 ms after the first shutter blade started movement. The second shutter blade moves to a location at time 4845 where it starts to obstruct light from passing to the sensor. This is 1.25 ms after the second shutter blade starts to move. At time 4850 (2.25 ms later), the second shutter blade moves to a position that fully blocks light from passing to the sensor of the camera. At time 4855, the second shutter blade comes to a stop. The blade travel time 4860 (BTT) for the camera used in this example is 4 ms. The sensor travel time 4865 (STT) for the camera used in this example is 2.25 ms. The exposure time 4870 (ET) is 1 ms (corresponding to the time between any two like locations on the shutter blade plots, for example the time between the stopping of the shutter blades at 4835 and 4855). The time between the first shutter blade fully clearing the sensor at 4830 and the second shutter blade starting to obstruct light to the sensor at 4845 is a negative fully open window value at 4880 (corresponding to negative 1.25 ms). In this example, there is no time at which the sensor is fully open to light passing to it. The negative fully open imaging window 4880 is in the middle of the image acquisition window 4885 (IAW), which is the time between the first shutter blade starting to allow light to pass to the sensor at 4820 and the time at which the second shutter blade fully blocks light from passing to the sensor at 4850. The IAW has a width of 3.25 ms.

The light emission profile 4815 for the flash device used in this example has a half energy balance point at 4875, which is approximately 1.5 ms after the light emission initiation point 4890 for the light emission profile 4815 (i.e., the time to balance point 4895 (TTBP) is 1.5 ms). Light emission profile 4815 is shown positioned such that the half energy balance point is in the center of image acquisition window 4885 and negative fully open imaging window 4880. With the information provided here, the time for initiation of light emission relative to one or more landmark positions in the image acquisition process for this camera can be determined. For example, the time for light emission initiation can be determined relative to the time that the first shutter blade fully clears the sensor at time 4830 from knowing a time between a process start point and/or a predictor signal/event to time 4830. An example calculation for profile 4815 is discussed below with respect to FIG. 51.

In the example shown in FIG. 48 the light emission initiation point occurs after the first shutter blade starts movement at 4820, after the first shutter blade starts to allow light to pass to the sensor at 4825, and before the first shutter blade stops movement at 4835. In one example where shading occurs of an image at the top and/or bottom of the image due to less light energy being delivered at the beginning and/or end of the image acquisition window from centering the half energy, a higher even brightness may appear in the center portion of the image. In an alternative implementation, the brightness area of a resultant image can be modified by various approaches. Examples of approaches for modifying the location of a brightness and less bright portions of a resultant image include, but are not limited to, changing the predetermined location in the image acquisition window from the center location to a location weighted to an earlier time in the image acquisition window, changing the predetermined location in the image acquisition window from the center location to a location weighted to a later time in the image acquisition window, changing the balance point used for the light emission profile from a half energy balance point to another 1/x energy balance point, using a user offset value to change the position of the balance point with respect to the image acquisition window (e.g., using an user interface, such as the user interfaces discussed further below), and any combinations thereof.

Figure 49:
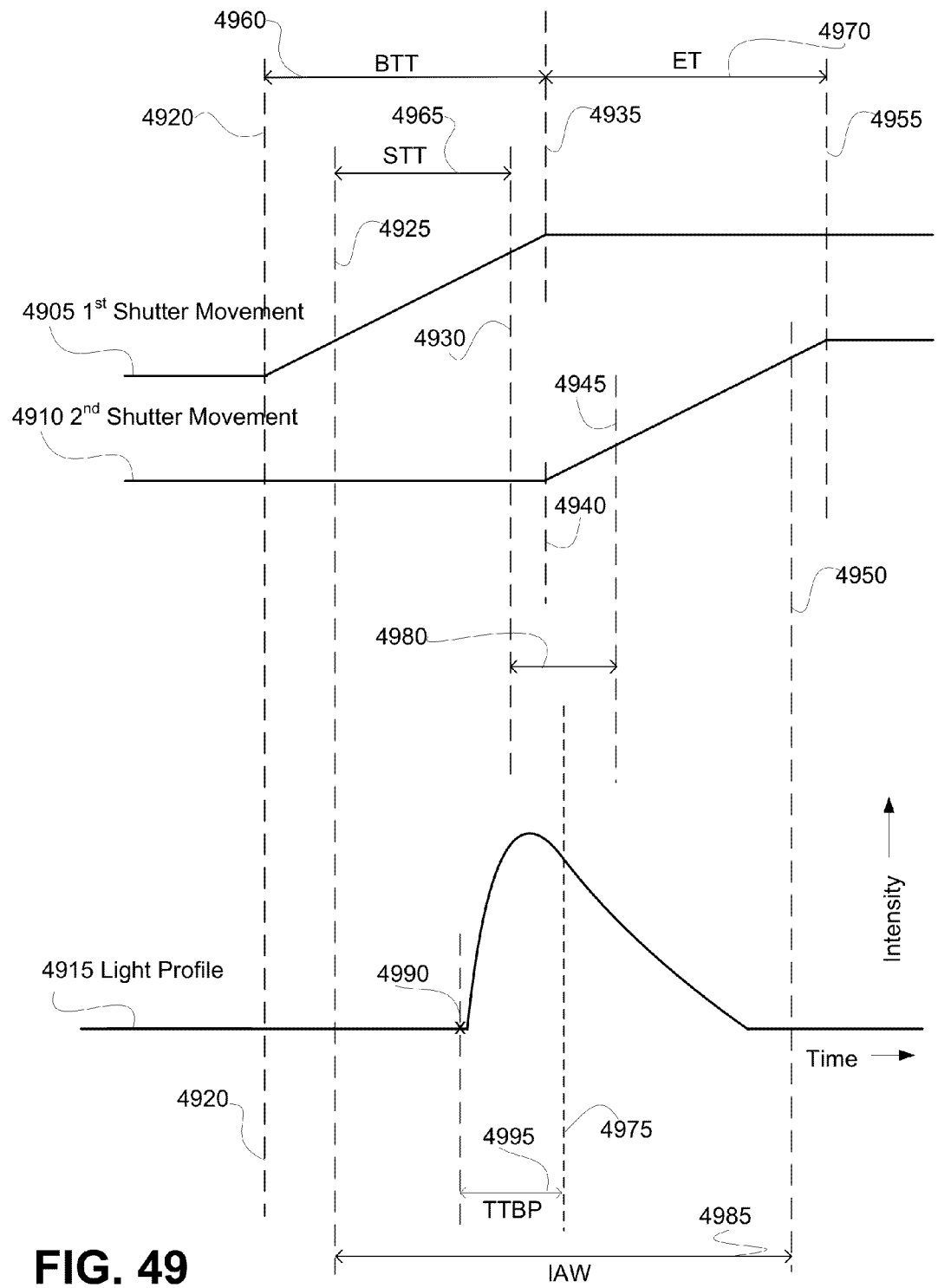
FIG. 49 illustrates an example of using a half energy balance point and a camera shutter speed of $1/250^{th}$ of a second.

FIG. 49 illustrates yet another example of positioning a half energy balance point of a light emission profile at a predetermined (e.g., center) location in an image acquisition window for a camera set at a shutter speed of $\frac{1}{250}^{th}$ of a second. FIG. 49 includes a timing plot for a first shutter movement 4905, a timing plot for a second shutter movement 4910, and a light emission profile for a lighting device 4915. First shutter blade starts movement at time 4920 and begins to allow light to pass to the sensor 1 milliseconds (ms) later at time 4925. In one exemplary aspect, this time prior to reaching the edge of the sensor allows the shutter blade to accelerate to the proper velocity for traveling across the sensor. The first shutter blade then moves to a position at time 4930 2.5 ms later at which it fully clears the sensor an stops blocking light from passing to the sensor. At time 4935 (0.5 ms later), the first shutter blade comes to a stop. After clearing the sensor the first shutter blade has some time to decelerate and come to a stop. In this example, the time after the shutter blade traverses the sensor is less than the time it uses to accelerate prior to the shutter blade edge traversing the sensor. At time 4935 is typically the time when the first shutter blade actuates a mechanism that generates x-sync. Second shutter blade starts movement at a time 4940 which is 4 ms after the first shutter blade started movement. The second shutter blade moves to a location at time 4945 where it starts to obstruct light from passing to the sensor. This is 1 ms after the second shutter blade starts to move. At time 4950 (2.5 ms later), the second shutter blade moves to a position that fully blocks light from passing to the sensor of the camera. At time 4955, the second shutter blade comes to a stop. The blade travel time 4960 (BTT) for the camera used in this example is 4 ms. The sensor travel time 4965 (STT) for the camera used in this example is 2.5 ms. The exposure time 4970 (ET) is 4 ms (corresponding to the time between any two like locations on the shutter blade plots, for example the time between the stopping of the shutter blades at 4935 and 4955). The time between the first shutter blade fully clearing the sensor at 4930 and the second shutter blade starting to obstruct light to the sensor at 4945 is a fully open window value at 4980 (corresponding to 1.5 ms). In this example, this is the time at which the sensor is fully open to light passing to it. The fully open imaging window 4980 is in the middle of the image acquisition window 4985 (IAW), which is the time between the first shutter blade starting to allow light to pass to the sensor at 4920 and the time at which the second shutter blade fully blocks light from passing to the sensor at 4950. The IAW has a width of 6.5 ms.

The light emission profile 4915 for the flash device used in this example has a half energy balance point at 4975, which is approximately 1.5 ms after the light emission initiation point 4990 for the light emission profile 4915 (i.e., the time to balance point 4995 (TTBP) is 1.5 ms). Light emission profile 4915 is shown positioned such that the half energy balance point is in the center of image acquisition window 4985 and negative fully open imaging window 4980. With the information provided here, the time for initiation of light emission relative to one or more landmark positions in the image acquisition process for this camera can be determined. For example, the time for light emission initiation can be determined relative to the time that the first shutter blade fully clears the sensor at time 4930 from knowing a time between a process start point and/or a predictor signal/event to time 4930. An example calculation for profile 4915 is discussed below with respect to FIG. 51.

In the example shown in FIG. 49 the light emission initiation point occurs after the first shutter blade starts movement at 4920, after the first shutter blade starts to allow light to pass to the sensor at 4925, and before the first shutter blade stops movement at 4935. In one example where shading occurs of an image at the top and/or bottom of the image due to less light energy being delivered at the beginning and/or end of the image acquisition window from centering the half energy, a higher even brightness may appear in the center portion of the image. In an alternative implementation, the brightness area of a resultant image can be modified by various approaches. Examples of approaches for modifying the location of a brightness and less bright portions of a resultant image include, but are not limited to, changing the predetermined location in the image acquisition window from the center location to a location weighted to an earlier time in the image acquisition window, changing the predetermined location in the image acquisition window from the center location to a location weighted to a later time in the image acquisition window, changing the balance point used for the light emission profile from a half energy balance point to another 1/x energy balance point, using a user offset value to change the position of the balance point with respect to the image acquisition window (e.g., using an user interface, such as the user interfaces discussed further below), and any combinations thereof.

Figure 50:
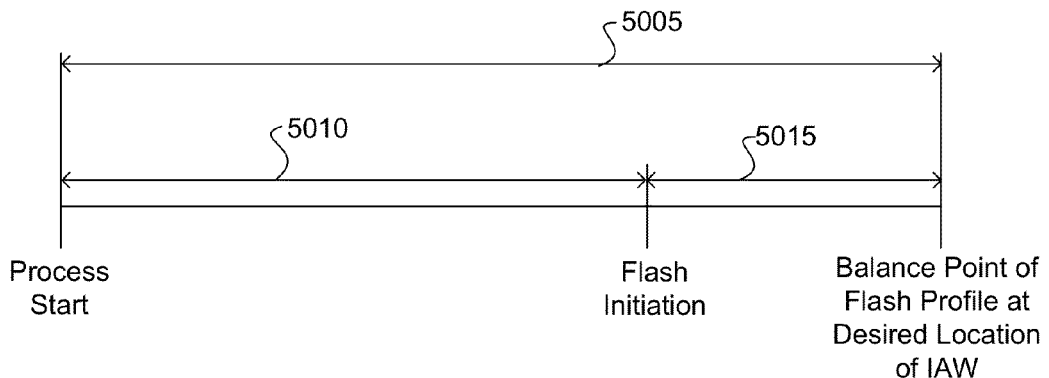
FIG. 50 illustrates an example of a timeline showing relationships amongst a time of process start, a time of flash emission initiation, and a point in time where a balance point of a light profile is aligned at a desired location.

FIG. 50 illustrates an exemplary implementation of a timeline showing relationships amongst a time of process start, a time of flash emission initiation, and the point in time where the balance point of a flash profile is aligned at the desired predetermined location of an image acquisition window. In one example, a process start time is a time in a camera from which a camera knows the time to a landmark location in the image acquisition (e.g., x-sync, first blade full clearance of the sensor, etc.). In another example, a process start time includes a predictor signal and/or event as discussed herein for predicting a time to a landmark location in the image acquisition (e.g., x-sync, first blade full clearance of the sensor, etc.). Example predictor signals/events are discussed above. In one example, a predictor signal is a signal normally used by a camera to initiate an FP-type synchronization. In another example, a predictor signal is a data signal of a camera. In yet another example, a predictor signal is a change in voltage on a clock line of a camera.

In FIG. 50, a time 5005 from process start to the point in time where the balance point of a flash profile is aligned at the desired predetermined location of an image acquisition window is known. In one example, a relationship between this predetermined location and a landmark location in the image acquisition process can be used along with a known time from process start to the landmark location to determine time 5005. A time 5015 from flash initiation to energy balance point can be used with time 5005 to determine the time 5010 from process start to the time for flash initiation. As discussed above, user offsets, changes to the balance point, and/or changes to the predetermined location in the IAW can be used to change the resultant image and impact the location in time of flash emission initiation.

Figure 51:
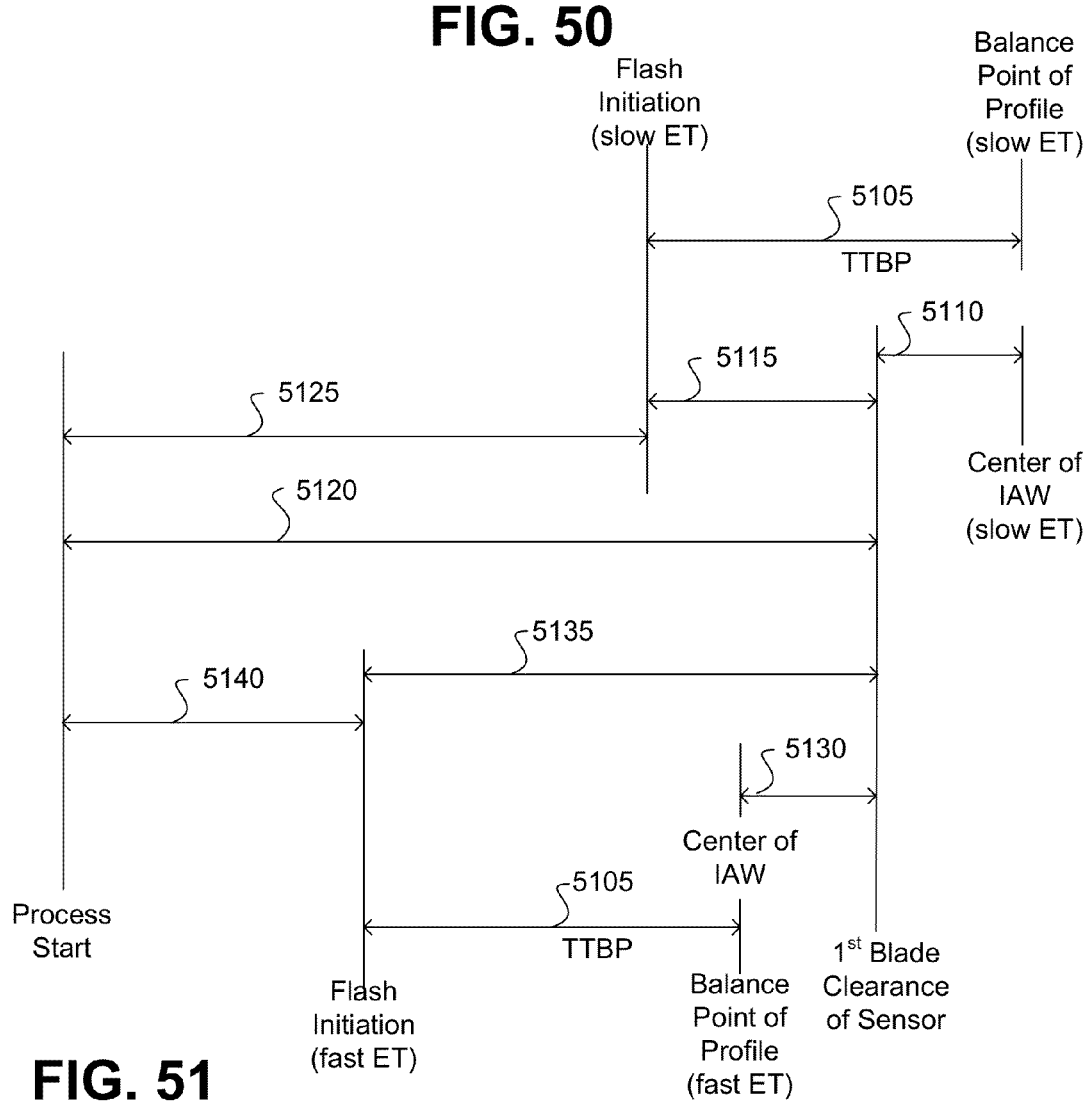
FIG. 51 illustrates an example of timing relationships of events in two exemplary exposure time scenarios.

FIG. 51 illustrates an example of using camera information and profile information to initiate light emission at a time such that a balance point of the light profile is positioned at a desired location in an image acquisition window. In the general scenarios presented in this figure (a slow exposure time [slow ET] with a fully open imaging window and a fast exposure time [fast ET] with a negative fully open imaging window), a flash having a time 5105 from light emission initiation to the balance point being used is shown. The first general scenario of a slow ET is presented at the top of the timing plots. In one example, the time 5110 from first shutter blade full clearance of the sensor to a center point of an image acquisition window can be determined using the sensor travel time (STT) and exposure time (ET) to calculate the time between the first shutter blade starting to allow light to pass to the sensor and the second shutter blade fully blocking light to the sensor (i.e., the fully open imaging window). Note that here as in other locations of the examples the center point of the image acquisition window (and/or fully open imaging window) is utilized. However, the features and aspects discussed herein of timing and other matters also apply to a position in the image acquisition window that is not in the center.

Subtracting the STT from the ET will give a value that is the same time as the time of the fully open imaging window. Dividing this in half will give the time from the first shutter blade fully clearing the sensor to the center point of the fully open imaging window, which is also the center point of the IAW. Time offset value 5115 from the time of light emission initiation to first shutter blade fully clearing the sensor can be calculated by subtracting TTBP 5105 from value 5110. This gives a negative time value for the offset value 5115. This negative timing offset 5115 can be used in combination with a known value 5120 from process start time to the landmark time of the first shutter blade fully clearing the sensor to determine the time 5125 from process start to flash emission initiation. It is noted that movement of the balance point of the profile from the center point of the IAW (e.g., due to a user offset) will change the timing of the desired flash emission initiation, changing time offset 5115 and impacting time 5125.

The second general scenario of a fast ET is presented at the bottom of the timing plots. In one example, the time 5130 from first shutter blade full clearance of the sensor to a center point of an image acquisition window is determined the same way the first general scenario. In this scenario, the center point of the image acquisition window occurs before the first blade clearance of the sensor. Subtracting the STT from the ET will give a negative value for time 5130. Time offset value 5135 from the time of light emission initiation to first shutter blade fully clearing the sensor can be calculated by subtracting TTBP 5105 from the negative value 5130. This gives a larger negative value for the time offset 5135. Using a known value 5120 from process start time to the landmark time of the first shutter blade fully clearing the sensor and the time offset value 5130, a time 5125 from process start to flash emission initiation is determined. It is noted that movement of the balance point of the profile from the center point of the IAW (e.g., due to a user offset) will change the timing of the desired flash emission initiation, changing time offset 5135 and impacting time 5140.

Many different equations may be utilized to relate the relationships in time set forth in FIG. 51. One example of how to place these relationships into a form of equation attempts to find a position for light emission initiation in the image acquisition process at a certain time prior to the start of the image acquisition window. Such a position may be useful, for example, in a system (e.g., a camera and/or photographic lighting device) where the start of the image acquisition window is at a known point in time with respect to the image acquisition process. Determination of a time prior to the start of an image acquisition window may be expressed as follows:

$$t_1 = t_{IAW} * DL_{factor}$$

$$t_2 = TTBP - t_1$$

where $t_1$ is a first amount of time from the start of the image acquisition window to the desired location, $t_{IAW}$ is the time of the image acquisition window, $DL_{factor}$ is a factor based on the desired location, TTBP is the time to balance point from the time of light emission initiation, and $t_2$ is a second amount of time prior to the start of the image acquisition window, the second amount of time being used to determine a location in time for light emission initiation to take place such that the balance point occurs at the desired location within the image acquisition window. A $DL_{factor}$ can be determined by using the desired location in the image acquisition window (e.g., as determined by user input, predetermined selection, programming of the system, etc.) to create a fractional number representing the location in the overall image acquisition window. For example, a desired location in the center of an image acquisition window would have a $DL_{factor}$ of ½. A desired location at 25% from the start of the image acquisition window would have a $DL_{factor}$ of ¼.

For example, a desired location in an image acquisition window that is in the center may have the following expression:

$$t_1 = t_{IAW}/2$$

$$t_2 = TTBP - t_1$$

where $t_1$ is a first amount of time from the start of the image acquisition window to the desired location, $t_{IAW}$ is the time of the image acquisition window, TTBP is the time to balance point from the time of light emission initiation, and $t_2$ is a second amount of time prior to the start of the image acquisition window, the second amount of time being used to determine a location in time for light emission initiation to take place such that the balance point occurs at the desired location within the image acquisition window.

Another example can express the relationships such that a time for light emission initiation occurs at a first amount of time before a first shutter blade of a camera moves to a position that no longer obstructs light to an imaging portion of a sensor of the camera. One example of an expression of the relationships is as follows:

$$t_{1'} = (ET - STT) * DL_{factor}$$

$$t_{2'} = TTBP - t_{1'}$$

where $t_{1'}$ is a first amount of time from the first position in time (i.e., a time where a first shutter blade no longer obstructs light to an imaging portion of a sensor of the camera) to the point in time of the desired location, ET is an exposure time of the camera, STT is a sensor travel time of the camera, $DL_{factor}$ is a factor based on the desired location, TTBP is the time to balance point from the time of light emission initiation, and $t_{2'}$ is a second amount of time prior to the first position in time, the second amount of time being used to determine a location in time for light emission initiation to take place such that the balance point occurs at the desired location within the image acquisition window.

An example with a desired location for a balance point at the center of an image acquisition window (i.e., $DL_{factor}$ of ½) is as follows:

$$t_{1'} = (ET - STT)/2$$

$$t_{2'} = TTBP - t_{1'}$$

where $t_{1'}$ is a first amount of time from the first position in time (i.e., a time where a first shutter blade no longer obstructs light to an imaging portion of a sensor of the camera) to the point in time of the desired location, ET is an exposure time of the camera, STT is a sensor travel time of the camera, TTBP is the time to balance point from the time of light emission initiation for the photographic lighting device, and $t_{2'}$ is a second amount of time prior to the first position in time, the second amount of time being used to determine a location in time for light emission initiation to take place such that the balance point occurs at the desired location within the image acquisition window.

As discussed above with respect to FIG. 51, using a process start occurrence (e.g., an occurrence of a predictor signal) as discussed in multiple examples and implementations above and a known or measured time between the process start occurrence and the time of an occurrence linked to the light emission initiation (e.g., a time at which the first shutter blade no longer obstructs light to the imaging portion of the sensor, a time of the start of an image acquisition window), an amount of time from the process start occurrence to the time for light emission initiation can be determined.

In one example, this can be expressed in one example as an equation as follows:

$$t_{1'} = (ET - STT) * DL_{factor}$$

$$t_{2'} = TTBP - t_{1'}$$

$$t_{4'} = t_{3'} - t_{2'}$$

where $t_{1'}$ is a first amount of time from the first position in time (i.e., a time where a first shutter blade no longer obstructs light to an imaging portion of a sensor of the camera) to the point in time of the desired location, ET is an exposure time of the camera, STT is a sensor travel time of the camera, $DL_{factor}$ is a factor based on the desired location, TTBP is the time to balance point from the time of light emission initiation, $t_{2'}$ is a second amount of time prior to the first position in time, $t_{3'}$ is a third amount of time from the process start occurrence to the first position in time, and $t_{4'}$ is a fourth amount of time from the process start occurrence to light emission initiation.

Those of ordinary skill in the art will be able to develop equations from the relationships set forth in FIG. 51 and other relationships to use in exemplary forms to determine the time for light emission initiation using light emission profile information (such as an energy balance point).

Referring to the specifics of the example in FIG. 48, an exemplary implementation of the determination of the time for light emission initiation 4890 can be made using the example calculations from FIG. 51. The example in FIG. 48 is a faster shutter speed (fast ET) example in which the center of the image acquisition window 4885 occurs prior to the time of the first shutter blade fully clearing the sensor at 4830. The time from the center of the IAW to the first shutter blade clearing the sensor 5130 in this example is calculated by subtracting the STT of 2.25 ms from the ET of 1 ms to obtain a value of negative 1.25 ms. This is the width of the negative fully open imaging window 4880. Dividing that in half gives the time 5130 of negative 0.625 ms. The TTBP in this example is 1.5 ms. Subtracting the TTBP from time 5130 gives a negative value of 2.125 ms for the time from the first shutter blade fully clearing the sensor at 4830 to the desired time for light emission initiation at 4890. This is the time offset value 5135. Using a known time of X ms from process start (e.g., an internal operation of a camera configured to directly initiate light emission according to a method herein and/or a predictor event/signal) for an example camera to first shutter blade full clearance, time value 5140 can be determined as X−2.125 ms. It is noted that certain delays may need to be factored into time value 5140 to account for delay such as for example, but not limited to, time of circuit signal transfer, a user offset, a time of wireless communication of information and/or time delays, and any combinations thereof.

Referring to the specifics of the example in FIG. 49, an exemplary implementation of the determination of time for light emission initiation 4990 can be made using the example calculations from FIG. 51. The example in FIG. 49 is a slow shutter speed (slow ET) example in which the center of the image acquisition window 4985 occurs after the time of the first shutter blade fully clearing the sensor at 4930. The time from the center of the IAW to the first shutter blade clearing the sensor 5110 in this example is calculated by subtracting the STT of 2.5 ms from the ET of 4 ms to obtain a value of 1.5 ms. This is the width of the fully open imaging window 4980. Dividing that in half gives the time 5110 of 0.75 ms. The TTBP in this example is 1.5 ms. Subtracting the TTBP from time 5110 gives a negative value of 0.75 ms for the time from the first shutter blade fully clearing the sensor at 4930 to the desired time for light emission initiation at 4990. This is the time offset value 5115. Using a known time of X ms from process start (e.g., an internal operation of a camera configured to directly initiate light emission according to a method herein and/or a predictor event/signal) for an example camera to first shutter blade full clearance, time value 5125 can be determined as X−0.75 ms. It is noted that certain delays may need to be factored into time value 5125 to account for delay such as for example, but not limited to, time of circuit signal transfer, a user offset, a time of wireless communication of information and/or time delays, and any combinations thereof.

Figure 52:
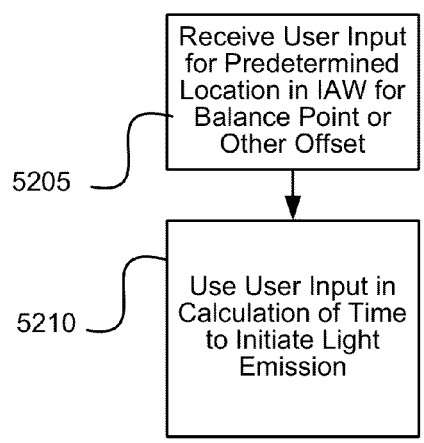
FIG. 52 illustrates an exemplary procedure for receiving a user input of an offset value.

FIG. 52 illustrates one example of a procedure for receiving a user input of a user offset. User input offset information can be used with any of the methods discussed above to modify one or more aspects of the method (e.g., a desired location position in an image acquisition window, a determination of a position of light emission initiation, and any combination thereof) At step 5205, a user input for an offset to positioning (e.g., a user desired offset) or a predetermined location in an image acquisition window for positioning a profile balancing point (e.g., a predetermined position that is not centered) is received. At step 5210, the information input by the user is utilized in calculating a time for light emission initiation according to one or more of the synchronization methods described herein (e.g., positioning a balance point of a profile at a predetermined location in an image acquisition window of a camera). A variety of user interfaces may be utilized by a user to input information that can be used in the calculation of step 5210. Example user interfaces include, but are not limited to, an actuation device (e.g., a button, switch, dial, etc.), a video display, an indicator lighting device (e.g., an LED an LCD), a touch screen video display, a keyboard, a pointing device (e.g., a mouse or other pointer element), a serial input port (e.g., a universal serial input port, such as a USB port), other types of input ports, and any combinations thereof. User information may be input into one or more elements of a photographic system. Example elements for receiving user input in a photographic system for synchronizing according to the methods described herein include, but are not limited to, a camera, a synchronizer element within a camera, an external synchronizer device associated with a camera, an external synchronizer device associated with a lighting element, a synchronizer element within a lighting device, a lighting device, a computer connected wired and/or wirelessly to a camera, a computer connected wired and/or wirelessly to a synchronizer device, a computer connected wired and/or wirelessly to a lighting device, and any combinations thereof. In one example a user interface for use in step 5205 is a user interface designed to receive the information from the user. In another example, a user interface for use in step 5205 is a user interface of an existing device that is modified (e.g., with firmware or other machine executable instructions that will operate on the existing device) to be capable of receiving the information (e.g., an offset, a predetermined location).

Figure 53:
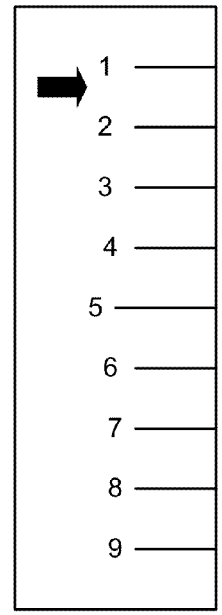
FIG. 53 illustrates an exemplary user interface.

FIG. 53 illustrates one exemplary implementation of a user interface. The user interface is divided into ten segments. In one example, each segment represents spatially a segment of a corresponding image acquisition window. In such an example, a user can position the pointer (e.g., with a pointer device, with a button, etc.) to indicate where within the image acquisition window to offset the balance point of the profile. In another example, each segment represents an incremental offset value (e.g., "1" being a small offset and "9" being a large offset).

Figure 54:
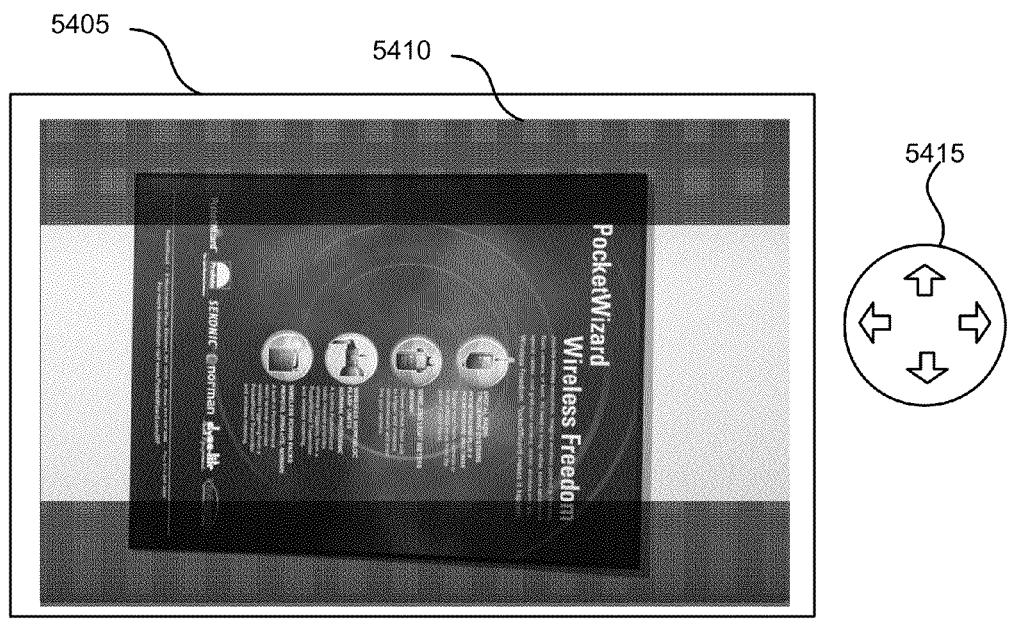
FIG. 54 illustrates another exemplary user interface.

FIG. 54 illustrates another exemplary implementation of a user interface. The user interface includes a display screen 5405 for displaying an image 5410 acquired via an image acquisition as described herein. The image includes areas at the top and bottom of the image that are not ideally illuminated by a lighting device such that they are darkened in relation to the center of the image (vertically). In one example, image 5410 is an image that has been previously acquired using a given setting for balance point and location within the image acquisition window for the balance point for the camera. In another example, image 5410 is a "live view" of an image scene in real time. In such an example, the shaded areas at the top and bottom of the image may be estimated based on information about the light emission profile and camera information (e.g., shutter information). The interface includes a user input 5415 (i.e., a button pad). In one example a user can utilize input 5415 to move the location of the brighter portion of the image up and down on the display (i.e., setting an offset to the location of the profile balance point with respect to the center of the image acquisition window). In another example, a user can manipulate input 5415 to set data (e.g., using the up arrow to move an offset in one direction from center of IAW and the down arrow to move an offset in another direction from center of IAW) that can be used to offset the brightness portion of the image.

Figure 55:
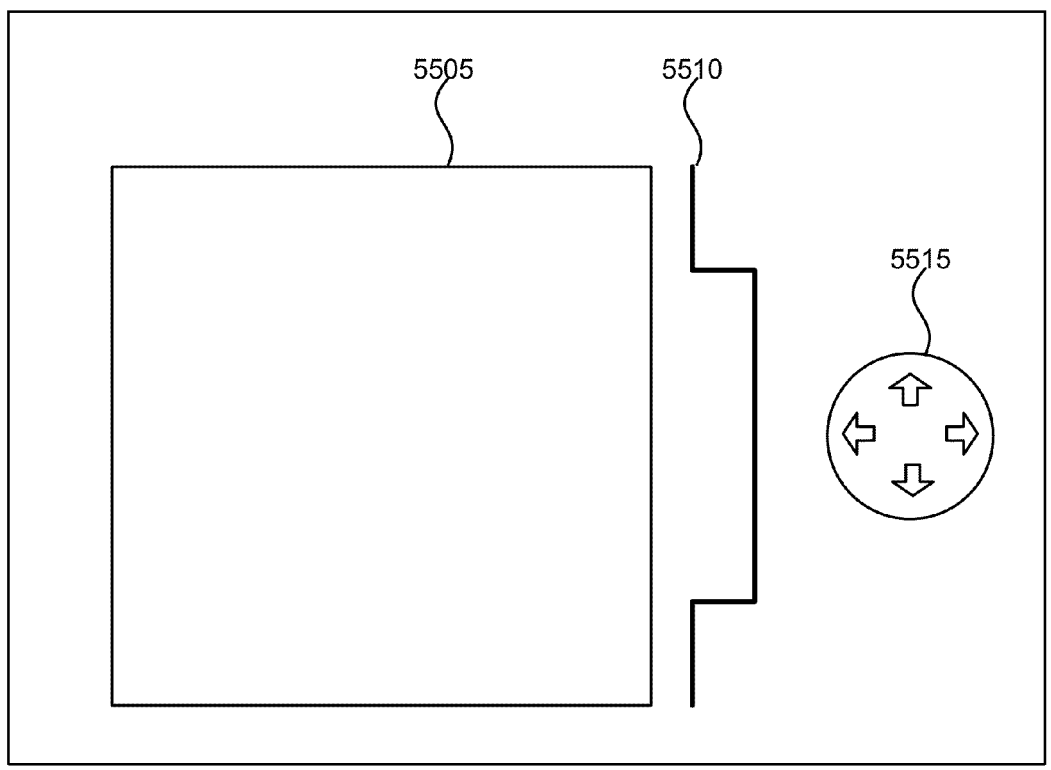
FIG. 55 illustrates yet another exemplary user interface.

FIG. 55 illustrates yet another exemplary implementation of a user interface. The user interface includes a display screen 5505 for displaying a region corresponding to the imaging range (related to the image acquisition window) for the camera at the current settings (e.g., shutter settings). The user interface also includes a graphical light emission profile indicator 5510 that represents low points of light energy and/or brightness to the left and higher points of light energy and/or brightness in the levels on the right of the graphical depiction such that in the vertical center of display 5505 there is a corresponding higher amount of energy/brightness that would be expected given the current balance point and IAW positioning. A user may manipulate the user input 5515 to move the concave portion of graphic 5510 that extends to the right up and down. Repositioning the location of the indicator of higher brightness/energy corresponds to a setting of an offset that repositions the balance point in the IAW (and, thus, the time of the initiation of light emission).

It is noted that the present disclosure includes a method of synchronizing a photographic lighting device to an image acquisition of a camera using an image brightness alignment offset value. An image brightness alignment offset value may be received from a user of the camera, the image brightness alignment offset value representing a desired location of brightness from the photographic lighting device within an image to be acquired by the camera (e.g., providing information for offsetting the desired location of brightness within the image from center). The image brightness alignment offset value can be used to calculate the time for light emission initiation by the photographic lighting device (e.g., by altering the desired location and/or the calculation used to determine the time for light emission initiation using a balance point). Light emission initiation of the photographic lighting device can then occur such that brightness from the photographic lighting device is at the desired location within an image acquired by the camera.

The image brightness alignment offset value may be received from a user interface (e.g., user interfaces discussed with respect to FIGS. 52 to 55). Examples of locations for a user interface include, but are not limited to, a user interface on a camera, a user interface on a wireless communication device associated with the camera, a user interface on a photographic lighting device, a user interface on a wireless communication device associated with a photographic lighting device, and any combinations thereof.

A camera may be positioned remote from one or more lighting device. In such a situation, wireless communication can be utilized by the camera to communicate to and/or from the one or more lighting devices. A camera and one or more remote lighting devices may each have wireless communication functionality (e.g., a wireless communication device and/or internal circuitry) associated with the camera and/or one or more lighting devices. A wireless communication functionality may be associated with a camera and/or a lighting device in a variety of ways. Examples of ways to associate a wireless communication functionality to a camera and/or lighting device include, but are not limited to, wireless circuitry internal to a camera, wireless circuitry external to a camera (e.g., an external wireless communication device), wireless circuitry internal to a lighting device, wireless circuitry external to a lighting device (e.g., an external wireless communication device), and any combinations thereof. Example ways to connect an external wireless communication device to a camera and/or lighting device include, but are not limited to, a wired connection, a connection to a hot shoe connector, a connection to a port of a camera that can communicate from the camera information for determining a time for light emission initiation using a light emission profile (e.g., shutter information, a camera model, a power output setting), a connection to a port of a lighting device that can receive a communication instructing the lighting device to initiate light emission, a connection to a port of a lighting device that can communicate information for determining a flash profile information from the lighting device, a connection to a port of a lighting device that can communicate information for determining a model of the flash, and any combinations thereof.

As discussed above with respect to the method of FIG. 39 and implementations discussed thereafter, determining a light emission initiation time using a light emission profile information can use information from the camera involved in the image acquisition. Camera information, such as a BTT and STT, can be stored for one or more cameras. Light emission profile information, such as a time from a light emission initiation to a balance point, can be stored for one or more lighting devices. For example, stored information may be in a memory connected to a wireless functionality associated with a camera, a lighting device, or any combinations thereof. In one example, STT for one or more cameras is stored in a memory element of an external wireless communication device. In such an example, a signal (e.g., sent via a hot shoe connector of the camera) from a camera associated with the wireless communication device may indicate the model of the camera such that the appropriate STT can be obtained. A camera may also provide (e.g., internally via circuitry, externally via a hot shoe connection to a wireless communication device, or other process) an information containing the shutter speed and/or exposure time value for the camera settings. The wireless communication device in this example may also include stored in a memory light emission profile information for one or more lighting devices. In another example, a memory associated with a camera side of a wireless communication environment may include information for determining the time for light emission initiation. Such information may include, but is not limited to, shutter information for one or more cameras (e.g., BTT, STT), a current setting of a shutter speed/exposure time for a camera, light emission profile information for one or more lighting devices (e.g., wirelessly received from one or more remote lighting devices), a stored information identifying a lighting device wirelessly connected to the camera, a current power output setting for a lighting device wirelessly connected to the camera, a timing information calculated from an STT and an exposure time for one or more camera model and exposure time combinations, another timing delay value, a user offset timing value, a default light emission profile information for use when an actual light emission profile information for a connected lighting device is not known, and any combinations thereof. In one example, such information may be used at the camera side to determine one or more timing values for completing all or a part of the calculations necessary to set the time of light emission initiation based on a light emission profile information as described herein. In another example, such information may be wirelessly transmitted to one or more remote lighting devices at which location the information may be utilized in whole or in part (possibly with other information stored in a memory stored at the lighting device side) to determine a time for light emission initiation based on a light emission profile information as described herein. A memory associated with a lighting device side of a wireless communication environment may include information for determining the time for light emission initiation. Such information may include, but is not limited to, shutter information for one or more cameras (e.g., BTT, STT), a current setting of a shutter speed/exposure time for a camera, light emission profile information for one or more lighting devices, a stored information identifying a lighting device currently in the system, a current power output setting for a lighting device wirelessly connected to the camera, a timing information calculated from an STT and an exposure time for one or more camera models and exposure time combinations, another timing delay value, a user offset timing value, a default light emission profile information for use when an actual light emission profile information for a connected lighting device is not known, and any combinations thereof. Any one or more of such information may have been received from a camera wirelessly connected to the lighting device.

Figure 56:
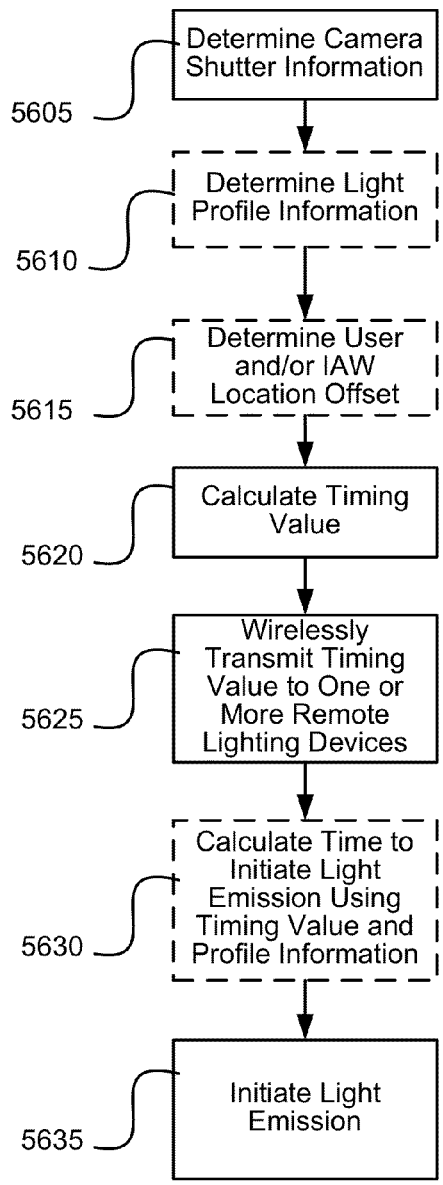
FIG. 56 illustrates an example of use of light emission profile information using wireless communication.

FIG. 56 illustrates one exemplary process for wirelessly communicating information from a camera to one or more lighting devices for determining a time for light emission initiation based on a light emission profile information. At step 5605, camera shutter (e.g., an STT and a shutter speed) information is determined. In one example, an STT value may be determined from stored information and a known value of the camera model. Optionally at step 5610, light profile information for an associated lighting device may be obtained. In one example, a remote lighting device may wirelessly transmit such information to the camera side. In another example, light emission profile information for a plurality of lighting devices may be stored at the camera side and an associated lighting device wirelessly transmits to the camera side an indication of the model of the lighting device connected for determining appropriate light emission profile information from the stored information. Optionally at step 5615, a user data, such as a user offset and/or a user setting related to a predetermined location in an IAW (e.g., an offset from center), is obtained (e.g., from a user interface, from a memory storing a user data, etc.). At step 5620 a timing value is calculated at the camera side. In one example, the timing value includes a portion of the information needed at the lighting device side to determine the time of light emission initiation. In another example, the timing value includes a time value that can be used directly by a lighting device to initiate light emission at a determined time. At step 5625, a timing value and/or information for calculating a timing value is transmitted wirelessly to one or more remote lighting devices. At step 5630, if the lighting device side did not receive a direct timing value, the lighting device side calculates a time to light emission initiation using timing value and other needed information (e.g., light emission profile information or other information for determining the time of light emission initiation known at the lighting device side). At step 5635, light emission is initiated at the determined time.

Figure 57:
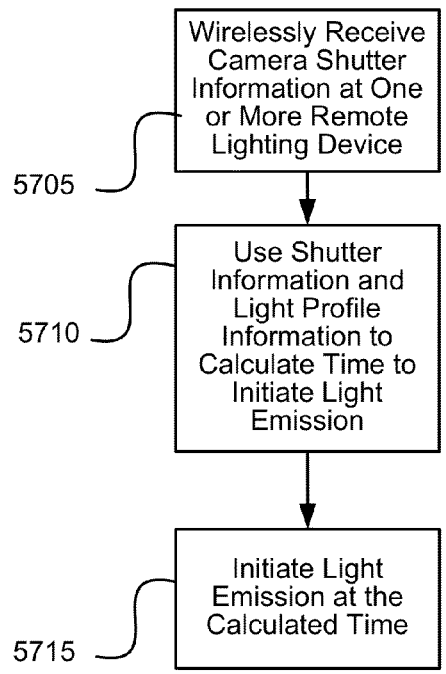
FIG. 57 illustrates an exemplary process of receiving information at a lighting device.

FIG. 57 illustrates one exemplary process for wirelessly receiving information from a camera at a lighting device and determining a time for light emission initiation based on camera information (e.g., shutter information) and a light emission profile. At step 5705, camera shutter information (e.g., STT and ET) is received at one or more remote lighting devices. Additional information (e.g., power output setting, camera model). The camera information is used with light emission profile information (e.g., for the connected lighting device) to determine a time for light emission initiation. At step 5715, light emission is initiated at the calculated time. One potential benefit to receiver side calculation of at least the portion of the calculation involving light emission profile information is that each remote lighting device (e.g., that knows its own light profile information) can utilize its own light profile information to determine appropriate offsets and timing for initiation of light emission (which may not be the same for all remote lighting devices) to achieve the positioning of the light emission profile as desired (e.g., having a profile balance point located at a predetermined position within the IAW for the camera being used).

Figure 58:
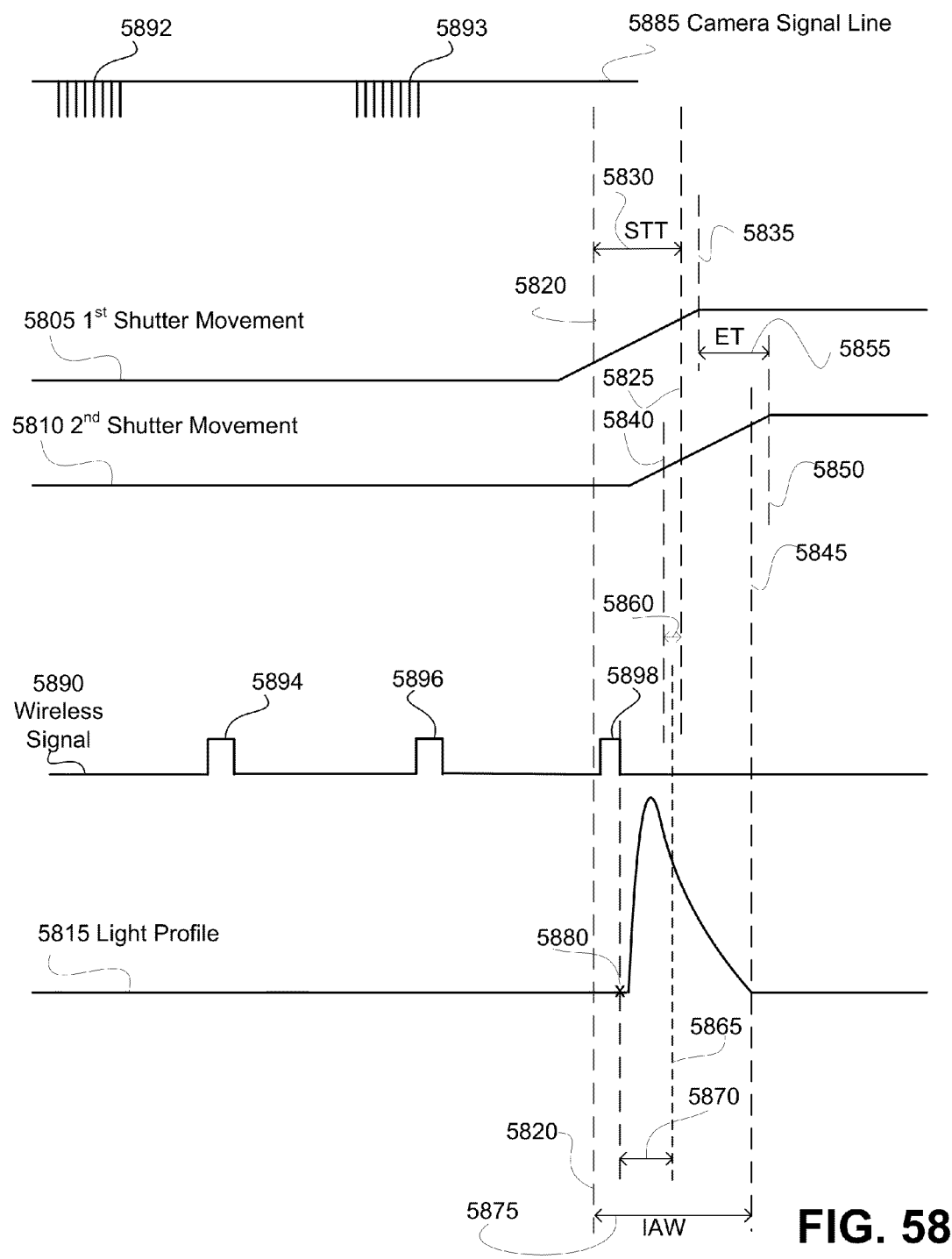
FIG. 58 illustrates exemplary timing plots for an exemplary wireless communication using light emission profile information.

FIG. 58 illustrates a set of exemplary timing plots for one implementation of a wireless communication in a process of synchronizing light emission using a light emission profile information to determine the starting time for light emission initiation as described by any one of the aspects of the implementation discussed above. FIG. 58 includes a timing plot for a first shutter movement 5805, a timing plot for a second shutter movement 5810, and a light emission profile for a lighting device 5815. First shutter blade starts to allow light to pass to a sensor at time 5820 and fully clears the sensor such that it does not obstruct light to the sensor at time 5825 with a sensor travel time (STT) 5830. The first shutter blade stops movement at time 5835. The second shutter blade starts to obstruct light passing to the sensor at time 5840 and moves to a position that fully blocks light from passing to the sensor at time 5845. At time 5850, the second shutter blade stops movement. An exposure time (ET) is shown as time 5855. A negative fully open imaging window is shown as time 5860 (the time between the first shutter blade fully clearing the sensor and the second shutter blade starting to obstruct light passing to the sensor).

Light profile 5815 is positioned such that a light energy balance point 5865 (having a time from light emission initiation 5880 to balance point of 5870) is located in the center (predetermined location) of the negative fully open imaging window 5860 and the image acquisition window (IAW) 5875. The associated camera includes a signal line 5885 that provides a first signal 5892. In this example, first signal 5892 includes power control information. A second signal 5893 in this example acts as a process start signal (e.g., an internal process start signal and/or a predictor signal). In this example, the time between the end of signal 5893 and the time 5825 of the first shutter blade fully clearing the sensor is a known predictable value. Using this known value, the shutter information (e.g., wirelessly transmitted from the camera), and the light emission profile information, the timing information for initiating light emission at the appropriate time can be calculated (see discussion above with respect to FIG. 51).

A wireless transmission signal line 5890 is shown for a wireless communication from a camera side to one or more remote lighting devices. Wireless transmission line 5890 includes a first wireless communication packet 5894. In one example, packet 5894 includes camera information, including in this example, power setting information (e.g., which can be utilized by a lighting device side to select the appropriate light emission profile information), an STT value for the camera, and a shutter speed and/or exposure time value. A time from signal 5893 to time 5825 may also be sent at this time. A second wireless communication packet 5896 is transmitted after signal 5893 to provide the receiver side with a process start point for calculating the appropriate time for light emission initiation 5880 such that balance point 5865 is positioned at the center of IAW 5875.

This example illustrates a receiver side calculation. Any portion of the timing information may also be calculated at the camera side with the appropriate information as discussed above. An optional wireless communication packet 5898 may be utilized and timed (e.g., factoring in the a camera side light emission initiation time and time for wireless communication) to have a direct initiation command such that upon receipt at the lighting device side, light emission initiation occurs.

Figure 59:
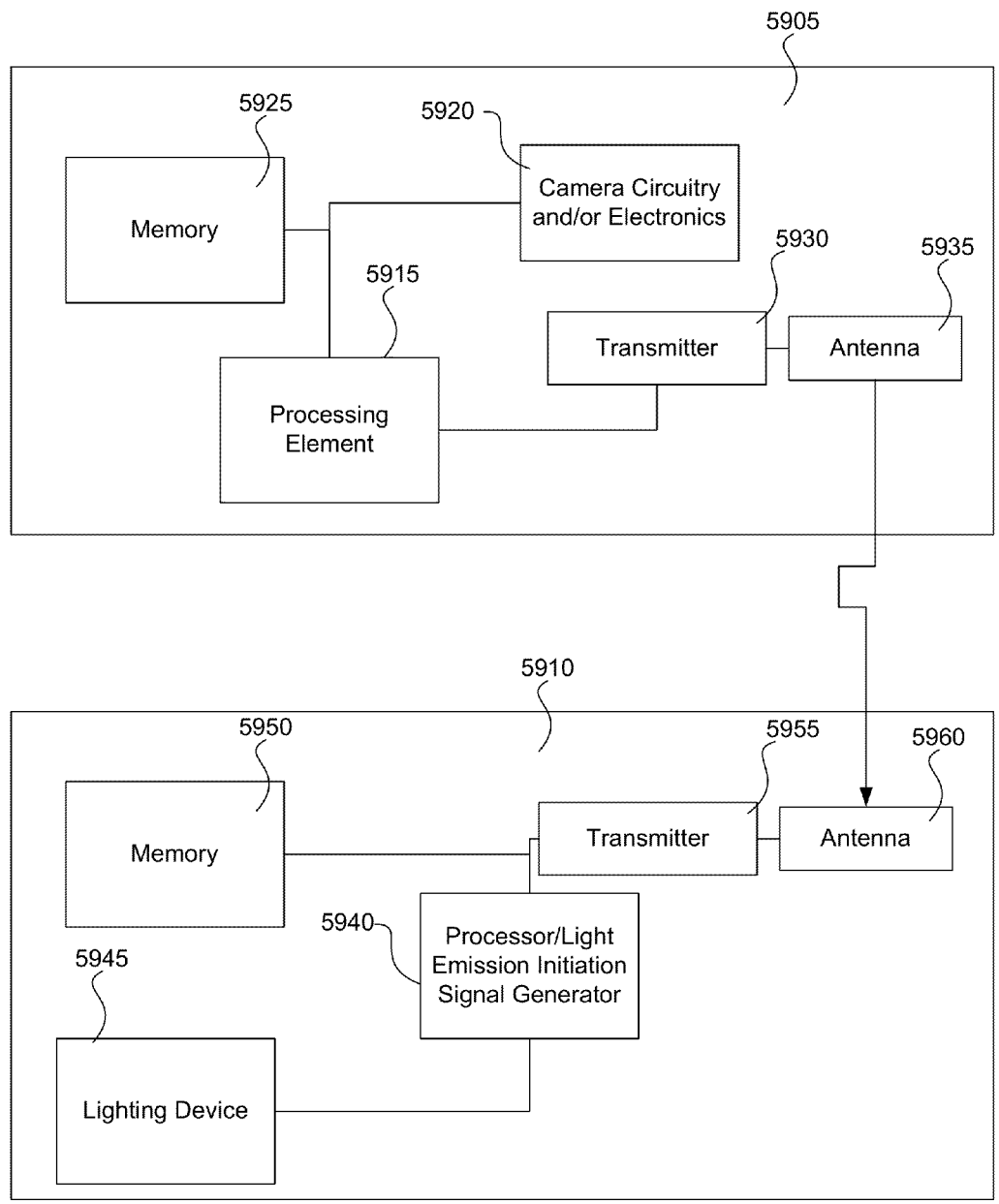
FIG. 59 illustrates an exemplary implementation of a wireless communication system.

FIG. 59 illustrates an exemplary implementation of a wireless communication system for synchronizing light emission initiation such that light emission profile is positioned in a predetermined desired location of an image acquisition window according to any one or more of the aspects and/or embodiments discussed above. Camera-side electronics 5905 are shown for wirelessly communicating with one or more lighting device-side electronics 5910. Camera-side electronics 5905 include a processing element 5915 connected to camera circuitry and/or electronics 5920. A memory 5925 is connected to processing element 5915. Memory 5925 may include camera information and/or flash profile information. Processing element 5915 is connected to a transmitter 5930 for wirelessly communicating information via antenna 5935 to lighting device-side electronics 5910. Processing element 5915 may receive camera information via connection to camera circuitry 5920. In one example, one or more of the received camera information is stored in memory 5925. In another example, one or more of the received camera information is wirelessly transmitted to lighting device-side electronics 5910. Processing element 5915 may utilize information from camera circuitry 5920 and/or memory 5925 as discussed above for calculating all or a portion of timing information needed to determine a time for light emission initiation by lighting device-side electronics. Such a calculated information may be wirelessly communicated to lighting device-side electronics via transmitter 5930 and antenna 5935. In one example, all or a portion of the elements of camera-side electronics 5905 may be a part of (e.g., internal to) a camera associated with circuitry 5920.

Lighting device-side electronics 5910 include a processor/light emission initiation signal generator 5940 connected to a lighting device 5945 for providing a light emission initiation signal to lighting device 5945 based on camera information received wirelessly (e.g., raw camera information and/or timing values) and/or light emission profile information (e.g., for lighting device 5945). A memory 5950 is connected to processing element 5940. Memory 5950 may include stored information as discussed above for use in determining a time for light emission initiation. A transmitter 5955 and antenna 5960 are also connected to processing element 5940 for wirelessly receiving information from camera-side electronics 5905. In one example, all or a portion of the elements of lighting device-side electronics 5910 may be a part of (e.g., internal to) lighting device 5945.

It is noted that in the embodiments discussed above with respect to using light emission profile information (e.g., a light emission profile balance point), such as those discussed in relation to FIGS. 39 to 59, light emission initiation may occur at a variety of points in time of the image acquisition process in relation to a first shutter blade movement. Example positions in time for a light emission initiation in relation to first shutter blade movement include, but are not limited to, a time prior to a first shutter blade moving to a position at which it starts to allow light to pass to an imaging portion of a sensor of the camera, a time after a first shutter blade moves to a position at which it starts to allow light to pass to an imaging portion of a sensor of the camera and prior to the first shutter blade moving to a position at which it no longer obstructs light from passing to the imaging portion of the sensor of the camera, a time prior to a first shutter blade moving to a position at which it no longer obstructs light from passing to the imaging portion of the sensor of the camera, a time after a first shutter blade moves to a position at which it no longer obstructs light from passing to the imaging portion of the sensor of the camera, a time after a first shutter blade stops after moving across a sensor of the camera.

It is also noted that the aspects and embodiments described herein may be conveniently implemented using one or more circuit elements as described above and/or included in one or more of a camera, a wireless communication device, and a lighting device programmed according to the teachings of the present specification. Appropriate software coding for combination with appropriate circuitry and other electronic components can readily be prepared by skilled programmers based on the teachings of the present disclosure, as will be apparent to those of ordinary skill in the software art.

Such software may be a computer program product that employs a physical machine-readable medium (e.g., as part of a memory element, such as a memory of a synchronizer (external or internal to a lighting device or a camera)). A machine-readable medium may be any physical medium that is capable of storing and/or encoding a sequence of instructions for execution by a machine (e.g., a processor and other electrical components of a camera, a wireless communication device, a flash device) and that causes the machine to perform any one of the methodologies and/or embodiments described herein. Examples of a machine-readable medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as the possibility of including a collection of physically separate media, such as, for example, a collection of compact disks or one or more hard disk drives in combination with a computer memory. A machine-readable medium, as used herein, does not include a signal.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for synchronizing a photographic lighting device to image acquisition by a camera, the method comprising:

identifying a balance point of a light emission profile for a photographic lighting device associated with a camera;

determining a desired location for the balance point within an image acquisition window of the camera; and determining a starting time of light emission initiation for the photographic lighting device, said determining a starting time of light emission initiation using the balance point to position the balance point at the desired location, wherein said determining the starting time of light emission initiation includes using the following relationship:

$$t_2 = TTBP - t_1$$

where $t_1$ is a first amount of time from the start of the image acquisition window to the desired location and is based on values that include $t_{IAW}$ and $DL_{factor}$, $t_{IAW}$ is the time of the image acquisition window, $DL_{factor}$ is a factor based on the desired location, TTBP is the time to balance point from the time of light emission initiation, and $t_2$ is a second amount of time prior to the start of the image acquisition window, the second amount of the time being used to determine a location in time for light emission initiation to take place such that the balance point occurs at the desired location within the image acquisition window.

2. A method according to claim 1, wherein the desired location is about in the center of the image acquisition window.

3. A method according to claim 1, wherein the desired location is at a location in the image acquisition window that other than the center of the image acquisition window.

4. A method according to claim 1, wherein the balance point is a light energy balance point.

5. A method according to claim 1, wherein the balance point is a lateral light energy balance point.

6. A method according to claim 5, wherein the balance point is a 1/x energy balance point.

7. A method according to claim 1, wherein the balance point is a vertical light energy balance point.

8. A method according to claim 7, wherein the balance point is a T0.x energy balance point.

9. A method according to claim 1, wherein said determining a desired location includes using a user input.

10. A method according to claim 1, wherein said determining a starting time of light emission initiation includes using an offset value to modify the desired location.

11. A method according to claim 10, wherein the offset value is a user entered offset value.

12. A method according to claim 1, wherein the photographic lighting device is remote from the camera, the camera is associated with a first wireless communication functionality, and the photographic lighting device is associated with a second wireless communication functionality, such that the camera and the first wireless communication functionality represent a camera side of a wireless communication and the photographic lighting device and the second wireless communication functionality represent a lighting device side of the wireless communication.

13. A method according to claim 12, wherein said determining a starting time for light emission initiation is performed at the camera side.

14. A method according to claim 12, wherein said determining a starting time for light emission initiation is performed at the lighting device side.

15. A method according to claim 1, further comprising:
determining camera shutter information;
wirelessly communicating the camera shutter information to one or more remote lighting devices, wherein said determining a starting time for light emission initiation includes determining a starting time for light emission initiation for each of the one or more remote lighting devices after wirelessly communicating the camera shutter information using the camera shutter information and corresponding light emission profile information for each of the one or more remote lighting devices; and
initiating light emission of the one or more remote lighting devices at the starting time for light emission initiation for each of the one or more remote lighting devices.

16. A method according to claim 1, further comprising:
determining camera shutter information;
determining light emission profile information for one or more remote lighting devices, wherein said determining a starting time for light emission initiation includes calculating a timing value based on the shutter information and the light emission profile information;
wirelessly communicating the timing value to the one or more remote lighting devices; and
using the timing value to initiate light emission of each of the one or more remote lighting devices.

17. A method according to claim 1, further comprising:
wirelessly receiving shutter information related to the camera at one or more remote lighting devices, wherein said determining a starting time for light emission initiation includes determining a starting time for light emission initiation for each of the one or more remote lighting devices after wirelessly receiving the camera shutter information using the camera shutter information and corresponding light emission profile information for each of the one or more remote lighting devices; and
initiating light emission of the one or more remote lighting devices at the starting time for light emission initiation for each of the one or more remote lighting devices.

18. A method for synchronizing a photographic lighting device to image acquisition by a camera, the method comprising:
identifying a light energy balance point of a light emission profile for a photographic lighting device associated with a camera;
determining shutter information of the camera;
determining a desired location for the light energy balance point within an image acquisition window of the camera;
wirelessly communicating a timing value based on the shutter information to one or more remote photographic lighting devices; and
determining a starting time of light emission initiation for each of the one or more remote photographic lighting devices, said determining a starting time of light emission initiation using the light energy balance point and shutter information to position the light energy balance point at the desired location in the image acquisition, wherein said determining the starting time of light emission initiation includes using the following relationship:

$$t_2 = TTBP - t_1$$

where $t_1$ is a first amount of time from the start of the image acquisition window to the desired location and is based on values that include $t_{IAW}$ and $DL_{factor}$, $t_{IAW}$ is the time of the image acquisition window, $DL_{factor}$ is a factor based on the desired location, TTBP is the time to balance point from the time of light emission initiation, and $t_2$ is a second amount of time prior to the start of the image acquisition window, the second amount of the time being used to determine a location in time for light emission initiation to take place such that the balance point occurs at the desired location within the image acquisition window.

19. A system for wirelessly synchronizing a photographic lighting device to an image acquisition by a camera, the system comprising:
   one or more processing elements; and
   one or more memory elements, said one or more memory elements configured with information for instructing the one or more processing elements to:
      identify a balance point of a light emission profile for a photographic lighting device associated with a camera;
      determine a desired location for the balance point within an image acquisition window of the camera; and
      determine a starting time of light emission initiation for a photographic lighting device using the balance point to position the balance point at the desired location in the image acquisition, wherein said determining the starting time of light emission initiation includes using the following relationship:

$$t_2 = TTBP - t_1$$

where $t_1$ is a first amount of time from the start of the image acquisition window to the desired location and is based on values that include $t_{IAW}$ and $DL_{factor}$, $t_{IAW}$ is the time of the image acquisition window, $DL_{factor}$ is a factor based on the desired location, TTBP is the time to balance point from the time of light emission initiation, and $t_2$ is a second amount of time prior to the start of the image acquisition window, the second amount of the time being used to determine a location in time for light emission initiation to take place such that the balance point occurs at the desired location within the image acquisition window.

20. A system according to claim 19, wherein the desired location is about in the center of the image acquisition window.

21. A system according to claim 19, wherein the desired location is at a location in the image acquisition window that other than the center of the image acquisition window.

22. A system according to claim 19, wherein the balance point is a light energy balance point.

23. A system according to claim 19, wherein the balance point is a lateral light energy balance point.

24. A system according to claim 23, wherein the balance point is a 1/x energy balance point.

25. A system according to claim 19, wherein the balance point is a vertical light energy balance point.

26. A system according to claim 25, wherein the balance point is a T0.x energy balance point.

27. A system according to claim 19, further comprising a user input configured to receive information to be used to determine a desired location.

28. A system according to claim 19, wherein the one or more memory elements is configured with information for instructing the one or more processing elements to determine the starting time of light emission initiation also using an offset value to modify the desired location.

29. A system according to claim 28, further comprising a user input and wherein the offset value is a user offset value entered via the user input.

30. A system according to claim 19, wherein the photographic lighting device is remote from the camera, the camera is associated with a first wireless communication functionality, and the photographic lighting device is associated with a second wireless communication functionality, such that the camera and the first wireless communication functionality represent a camera side of a wireless communication and the photographic lighting device and the second wireless communication functionality represent a lighting device side of the wireless communication.

31. A system according to claim 30, wherein the camera and/or the first wireless communication functionality include at least one of the one or more processing elements configured for determining a starting time of light emission initiation at the camera side.

32. A system according to claim 30, wherein the photographic lighting device and/or the second wireless communication functionality include at least one of the one or more processing elements configured for determining a starting time of light emission initiation at the lighting device side.

33. A system according to claim 19, further comprising a transmitter for wirelessly communicating a camera shutter information to one or more remote lighting devices, wherein at least one of the one or more processors and at least one of the one or more memory elements are part of a wireless functionality associated with one or more remote lighting devices and are configured to determine a starting time for light emission initiation including using the camera shutter information and corresponding light emission profile information for each of the one or more remote lighting devices, wherein the at least one of the one or more processors and at least one of the one or more memory elements are also configured to initiate light emission of the one or more remote lighting devices at the starting time for light emission initiation for each of the one or more remote lighting devices.

34. A system according to claim 19, wherein at least one of the one or more processors and at least one of the one or more memory elements are part of the camera or one or more wireless functionalities associated with the camera, the at least one of the one or more memory elements and at least one of the one or more processors are configured to determine a starting time for light emission initiation including calculating a timing value based on light emission profile information for one or more remote lighting devices and a camera shutter information, the system further comprising a transmitter configured with the at least one of the one or more processors to wirelessly communicate the timing value to the one or more remote lighting devices for use in initiating light emission based on the timing value.

* * * * *